June 6, 1950 S. I. HAYES ET AL 2,510,500
GROUNDED PILOT TRAINING APPARATUS
Filed Dec. 12, 1945 17 Sheets-Sheet 1

STANLEY I. HAYES
MILTON S. WADE
INVENTORS

BY Donald T. Hillier
Philip S. Hopkins
ATTORNEYS

GROUNDED PILOT TRAINING APPARATUS

Filed Dec. 12, 1945 17 Sheets-Sheet 2

STANLEY I. HAYES
MILTON S. WADE
INVENTORS

BY Donald T. Hellier
Philip S. Hopkins
ATTORNEYS

GROUNDED PILOT TRAINING APPARATUS

Filed Dec. 12, 1945 17 Sheets-Sheet 3

STANLEY I. HAYES
MILTON S. WADE
INVENTORS

BY
ATTORNEYS

GROUNDED PILOT TRAINING APPARATUS

Filed Dec. 12, 1945 17 Sheets-Sheet 4

STANLEY I. HAYES
MILTON S. WADE
INVENTORS

BY Donald T. Hillier
Philip S. Hopkins
ATTORNEYS

GROUNDED PILOT TRAINING APPARATUS

STANLEY I. HAYES
MILTON S. WADE
*INVENTORS*

BY Donald T. Hillier
Philip S. Hopkins
ATTORNEYS

GROUNDED PILOT TRAINING APPARATUS

Filed Dec. 12, 1945 17 Sheets-Sheet 6

STANLEY I. HAYES
MILTON S. WADE
INVENTORS

BY Donald J. Hillier
Philip L. Hopkins
ATTORNEYS

STANLEY I. HAYES
MILTON S. WADE
INVENTORS
BY Donald V. Hillier
Philip S. Hopkins
ATTORNEYS

STANLEY I. HAYES
MILTON S. WADE
INVENTORS

BY Donald T. Hellier
Philip S. Hopkins
ATTORNEYS

GROUNDED PILOT TRAINING APPARATUS

Filed Dec. 12, 1945 17 Sheets-Sheet 9

STANLEY I. HAYES
MILTON S. WADE
INVENTORS

BY Donald T. Hiller
Philip S. Hopkins
ATTORNEYS

June 6, 1950 S. I. HAYES ET AL 2,510,500

GROUNDED PILOT TRAINING APPARATUS

Filed Dec. 12, 1945 17 Sheets-Sheet 10

STANLEY I. HAYES
MILTON S. WADE
INVENTORS

BY Donald N. Hiller
Philip S. Hopkins
ATTORNEYS

STANLEY I. HAYES
MILTON S. WADE
INVENTORS

BY Donald T. Hibner
Philip S. Hopkins
ATTORNEYS

STANLEY I. HAYES
MILTON S. WADE
INVENTORS
BY Donald T. Hillier
Philip d. Hopkins
ATTORNEYS June 6, 1950 S. I. HAYES ET AL 2,510,500

GROUNDED PILOT TRAINING APPARATUS

Filed Dec. 12, 1945 17 Sheets-Sheet 13

STANLEY I. HAYES
MILTON S. WADE
INVENTORS

BY Donald K. Hillier
Philip D. Hopkins
ATTORNEYS

STANLEY I. HAYES
MILTON S. WADE
INVENTORS

BY Donald T. Hellier
Philip L. Hopkins
ATTORNEYS

STANLEY I. HAYES
MILTON S. WADE
INVENTORS
BY Donald T. Hilliar
Philip S. Hopkins
ATTORNEYS STANLEY I. HAYES
MILTON S. WADE
INVENTORS
BY Donald T. Hellier
Philip S. Hopkins
ATTORNEYS

GROUNDED PILOT TRAINING APPARATUS

Filed Dec. 12, 1945 17 Sheets-Sheet 17

STANLEY I. HAYES
MILTON S. WADE
INVENTORS

BY Donald T. Hellier
Philip S. Hopkins
ATTORNEYS

Patented June 6, 1950

2,510,500

UNITED STATES PATENT OFFICE 2,510,500

GROUNDED PILOT TRAINING APPARATUS

Stanley I. Hayes and Milton S. Wade, Binghamton, N. Y., assignors to Link Aviation, Inc., a corporation of New York Application December 12, 1945, Serial No. 634,492

5 Claims. (Cl. 35—12)

This invention relates to grounded pilot training apparatus, and will be disclosed in conjunction with grounded pilot training apparatus of the type covered by U. S. Patents 1,825,462 and 2,099,857, issued to Edwin A. Link.

Trainers of the type covered by the two above mentioned U. S. patents have been widely adopted by the Army, Navy, civilian agencies and others for instructing students, upon the ground, in the art of flying an aircraft by reference to the instruments carried therein. As is well known to those acquainted with the prior art, these trainers have long included such basic instruments as an air speed indicator, an altimeter, a vertical speed indicator, a magnetic compass, a directional gyro, an artificial horizon, a radio compass, and many other instruments such as a manifold pressure gauge, tachometer, etc. All of the instruments carried by these trainers are properly responsive to such factors as throttle lever setting, tachometer lever setting, turning motions of the fuselage as well as pitching and banking movements of the fuselage, so that the various instrument indications are responsive to the basic controlling factors in a manner similar to the responses of the corresponding instruments in a real aircraft to the corresponding controlling factors.

It is a general object of this invention to provide in grounded aviation trainers novel means for causing the air speed indicator, altimeter and vertical speed indicator to operate in response to the settings of the throttle control lever, tachometer lever and the additionally provided supercharger lever, as well as to the pitching movements of the fuselage. The novel means for causing these instruments to be responsive to the mentioned controlling factors comprise an entirely different type of mechanical computing unit which computes the assumed power of an engine which is assumed to be connected to the levers in question. A novel mechanical-electrical flight unit is provided to combine the assumed engine power output given by the engine unit with the pitching position of the fuselage in order to establish the factor of assumed air speed. The factor of instant assumed air speed is then combined with the factor of pitch attitude to produce the factor of instant assumed vertical speed, and the vertical speed factor is combined with time in a novel manner to produce the factor of assumed altitude. Both the engine unit and the flight unit include many improved novel features which will be more particularly pointed out hereinafter.

Another object of this invention is to provide in trainers of the type being considered such indicators as a manifold pressure gauge, a cylinder head temperature gauge and oil temperature gauge, a tachometer, an oil pressure gauge, a fuel pressure gauge and a hydraulic pressure gauge, all actuated in a novel manner as will later be described in detail.

Also disclosed herein are means whereby the student, upon entering the fuselage, must go through the same steps in order to "start" the engine assumed to be in the trainer as he would have to go through to start the engine of an airplane of the type being simulated. An aural signal source is provided which will be energized when the engine is assumed to have been started, and the engine instruments such as the manifold pressure gauge, tachometer, etc., will be actuated upon an assumed starting of the engine in the same manner that the corresponding instruments in a real plane are actuated upon the starting of the engine in the plane.

Another object of this invention is to provide means whereby the takeoff run and the effects of an airplane becoming airborne may be simulated. These effects include generally the rendering effective of the flight controls as well as of the vertical speed indicator and altimeter.

This invention also provides novel means for simulating the effects of engine power upon gas consumption, and means are provided whereby the student will be forced to properly connect the gasoline tanks assumed to be in the trainer with the engine in order to prevent engine failure. Other factors may also produce engine failure, to simulate the causes of engine failure in real aircraft.

Still another object of this invention is to provide means whereby the operation and effects of the retractable landing gear, wing flaps and cowl flaps of a real plane may be simulated under normal as well as abnormal operating conditions.

Also means are provided whereby the effects of a landing of a real airplane may be properly reproduced.

Certain parts of the invention disclosed herein are provided in order that the taking off from and landing on an aircraft carrier may be simulated.

This invention also provides means for producing a vertical hunting of the fuselage in response to a change in assumed engine power output, as well as means for "starting" the engine, after engine failure has occurred, by "wind milling."

Other related objects will become apparent as the description proceeds. In order that the disclosed embodiment of this invention may be better understood, reference is made to accompanying drawings, wherein:

Figs. 14, 15, 15A, 16 and 17 show the mechanical portions of the fuel consumption system, while

Figure 26A is a detail view of parts of the apparatus shown in Figure 26.

*Main valve construction*

Figure 1:
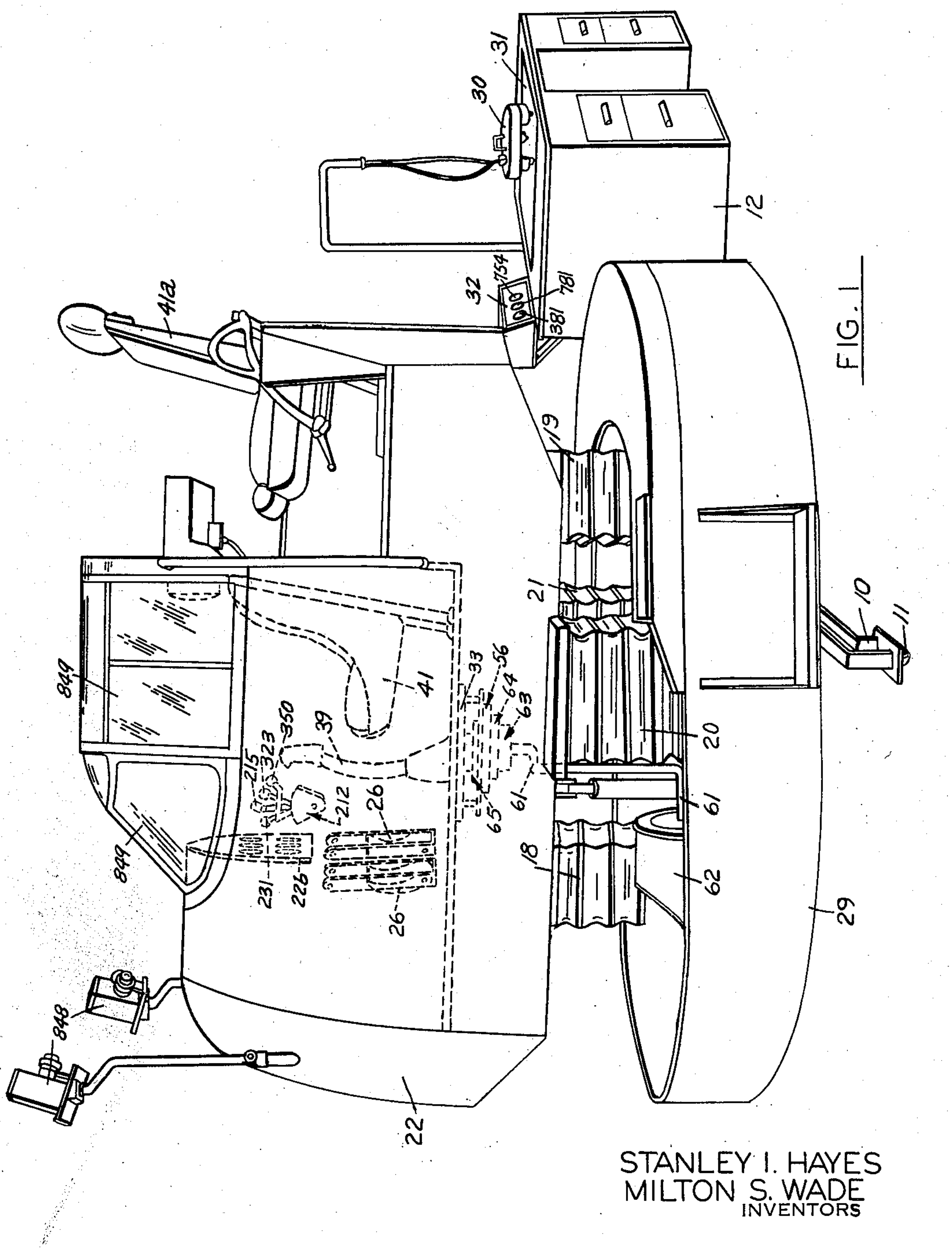
Fig. 1 is a general exterior view of trainers of the type being considered, showing the fuselage, pitching and banking bellows, the turning motors, turbine, desk and conventional flight recorder.
Figure 2:
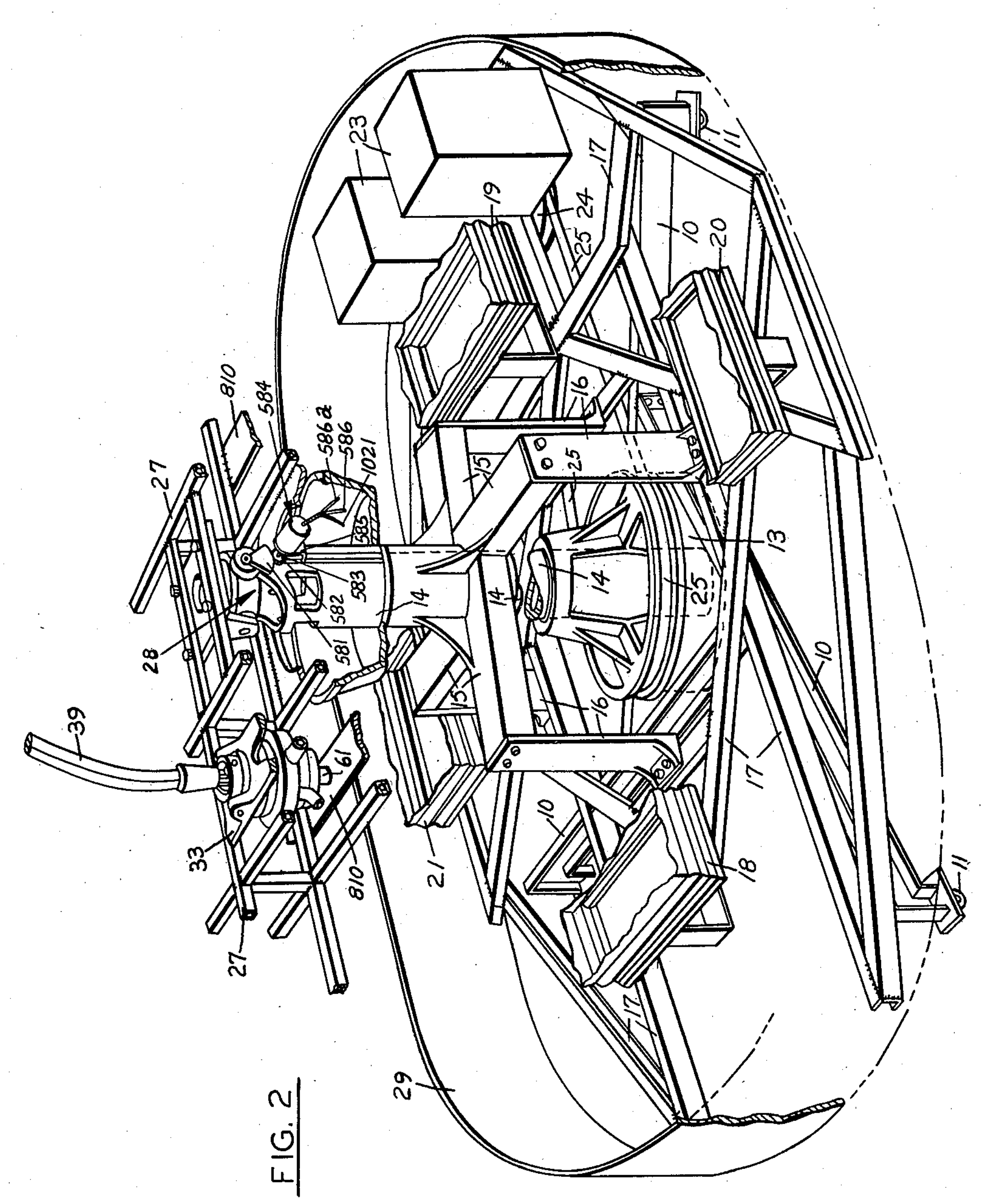
Fig. 2 is a perspective view showing the control stick, the location of the main valve assembly, the main universal joint, the stationary base, rotatable carriage, turning motors and the pitching and banking bellows.

Referring now to Figs. 1 and 2, the normally stationary base of the trainer is designated 10 and comprises a plurality of beams suitably fixedly attached to one another, as by bolts. A plurality of rollers 11 are provided in order that the entire training unit with the exception of the desk 12 and its associated elements may be manually moved from position to position. However, during operation of the training device the base 10 remains stationary. Fixedly attached to the base members 10 is the main hub 13 in which the main spindle 14 is rotatably mounted. Affixed to the main spindle 14 for rotation therewith are the horizontal cross arms 15 and affixed to the outer end of each of these cross arms is the upper end of one of the depending members 16, the lower ends of which support the carriage 17. Carriage 17 in turn supports the forward pitching bellows 18, the rear pitching bellows 19, the left banking bellows 20 and the right banking bellows 21. The lower end of each of these four bellows is affixed to the carriage 17 while the upper end of each of these bellows is affixed to the floor or bottom side of the fuselage 22. Carriage 17 also supports the two schematically shown turning motors 23 which drive the pulley 24. Pulley 24, by means of the turning belt 25 which encircles the main hub 13, may rotate the carriage 17, the four bellows, the fuselage 22 and all associated elements, including the turning motors 23 themselves, indefinitely in either direction according to the positions of the rudder pedals, in a manner more fully described hereinafter. The turning motors 23 are of the pneumatic type such as are extremely well known in the art. The sub-frame of the fuselage 22 is designated 27 and it will be seen that this frame is supported by the universal joint which in turn is held by the spindle 14, the universal joint 28 being provided in order that the fuselage 22 may be dived, climbed and banked to the left or right with respect to the stationary base 10. Diving and climbing movements of the fuselage 12 are sometimes hereinafter referred to as "pitching."

It will therefore be appreciated that the fuselage 22 is mounted in a manner to permit indefinite rotation in either direction relative to the stationary base 10 in order that the turning to the left or right of a plane in actual flight may be simulated; and further, that the fuselage may be pitched and banked relative to the stationary base 10 within the limits of the apparatus, in order to simulate the pitching and banking of a plane in actual flight.

An oval enclosing member 29 is affixed to the rotatable carriage 17 in order to improve the exterior appearance of the training device.

Upon the desk 12 is the recorder 30 which travels over the chart 31 in a direction dependent upon the assumed track of the fuselage 22 and at a speed dependent upon the assumed ground speed of the fuselage, in order that a permanent record of the assumed course of flight of the fuselage 22 may be made. This recorder is well known to the prior art and is completely described in U. S. Patent 2,179,663, issued to Edwin A. Link. Also carried by the desk 12 is the instructor's instrument panel 32 having a plurality of instruments to which the instructor may refer in order to ascertain the assumed air speed, assumed vertical speed, assumed altitude, and other assumed conditions of "flight" of the fuselage 22.

Figure 3:
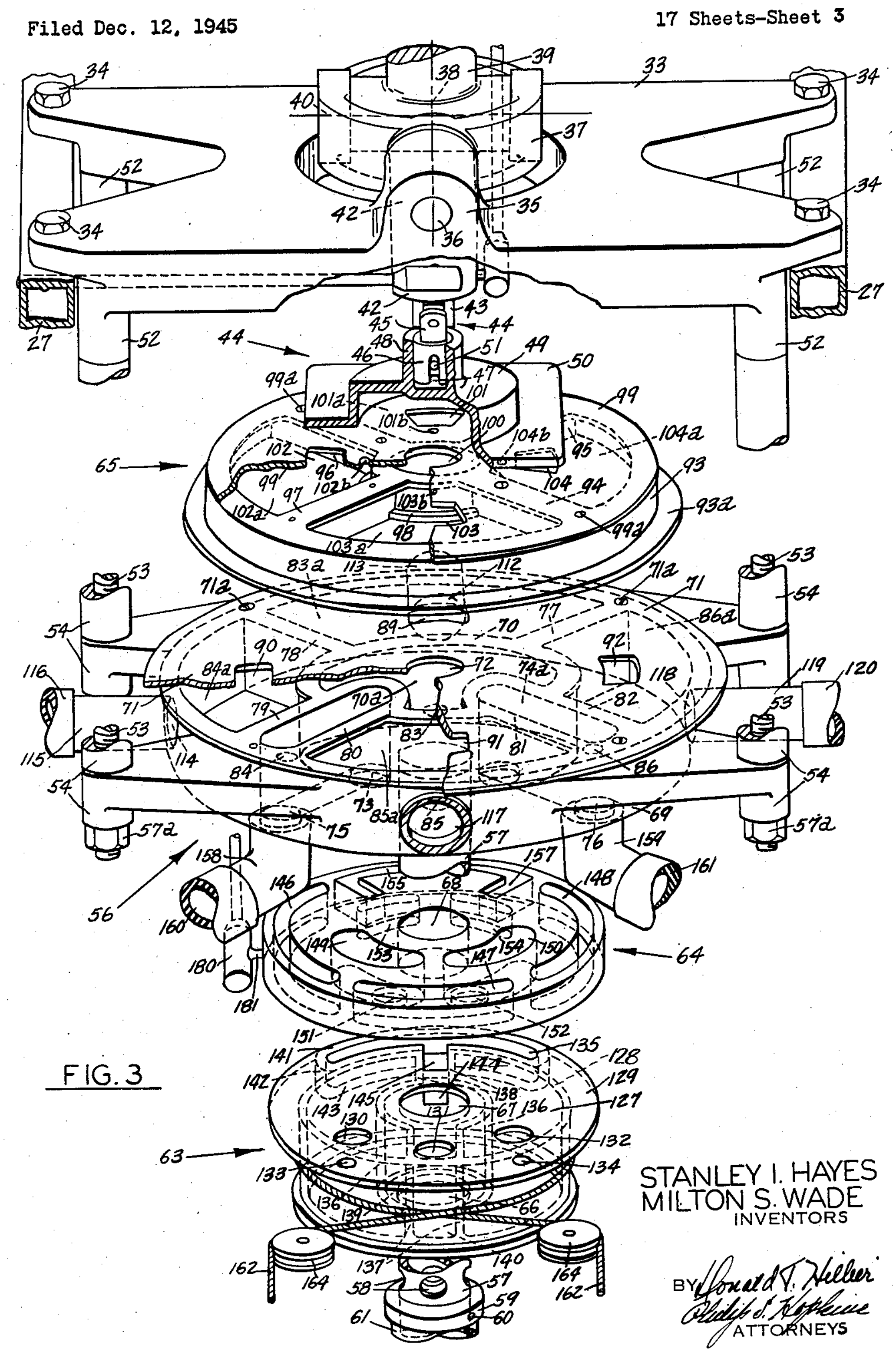
Fig. 3 is an exploded sectional view of the main valve assembly.

Reference is now made to Fig. 3 which is an exploded perspective view of the fuselage pitching, banking and turning control valves.

In Fig. 3 portions of the fuselage sub-frame 27 are shown and it will be seen that the casting 33 is affixed to frame 27 by means of the bolts 34. Integral with casting 33 are the two ears 35 (only one shown), and each of these ears has rotatably mounted therein a stud 36, the axes 38 of studs 36 extending longitudinally of the fuselage 22. The ear 35 and stud 36 shown in Fig. 3 are upon the foremost side of casting 33 as it is oriented within fuselage 22, i. e., toward the head of the fuselage. Each of the studs 36 is affixed in the gimbal ring 37 so that this gimbal ring can pivot about the longitudinal axis 38. The lower end of the control stick 39 in turn is pivotally held by the gimbal ring 37 for movement about the transverse axis 40. It will therefore be appreciated that the control stick 39 may be universally moved with respect to the casting 33. In Fig. 1 it will be seen that the control stick 39 is mounted directly ahead of the student's seat 41 and the instructor's seat is designated 41a.

Still referring to Fig. 3 it will be seen that the member 42 is provided, this member being integral with the lower end of the control stick 39. Integral with the member 42 is the upper portion 43 of the universal joint designated generally by 44, the lower portion of this universal joint being numbered 45. The lower enlarged portion of member 45 is designated 46, is slotted at 47, and is movably mounted within the hub 48 integral with the circular cap 49 which in turn is integral with the square plate 50. A pin 51 passes through the hub 48 as well as the slot 47 in order to prevent rotation of the hub 48, cap 49 and plate 50. However, portions 45 and 46 of the universal joint are vertically movable with respect to the hub 48.

Still referring to Fig. 3, it will be seen that integral with the lower side of casting 33 are four depending members 52, each of which is interiorly threaded for the reception of one of the four studs 53. Each of the studs 53 passes through the extensions 54 of the main valve section designated generally by 56 and a nut 57a is placed upon the lower end of each of the studs 53. Accordingly, the main valve section 56 is supported by the casting 33 in fixed relationship at all times.

In the lower portion of Fig. 3 a metal tube 57 having a plurality of holes 58 therein is provided, and affixed upon the lower end of tube 57 is the collar 59 by means of set screw 60. Tube 57 extends through collar 59, the portion of tube 57 below this collar being solid walled, and the upper end of the flexible hose 61 encircles the lower end of tube 57. Tube 61 connects with the conventional turbine 62 seen in Fig. 1. This turbine is mounted upon the rotatable carriage 17 seen in Fig. 2 and provides, as is well known, a source of vacuum.

The collar 59 is vertically adjusted upon the tube 57 so that it supports the rudder valve section designated generally 63 which in turn supports the auxiliary effect valve section designated generally by 64 so that the upper surface of valve section 64 bears against the lower surface of the main valve section 56. The nuts 57a in turn are adjusted so that the upper surface of the main valve section 56 lies against the lower surface of the attitude valve 65.

Tube 57 passes through the close-fitting central openings 66 and 67 of the rudder valve section 63, through the central opening 68 of the auxiliary effect valve section 64, the upper end of tube 57 being integral with the main casting 69 of the main valve section 56.

Figures 3A, 3B, 3C, 4:
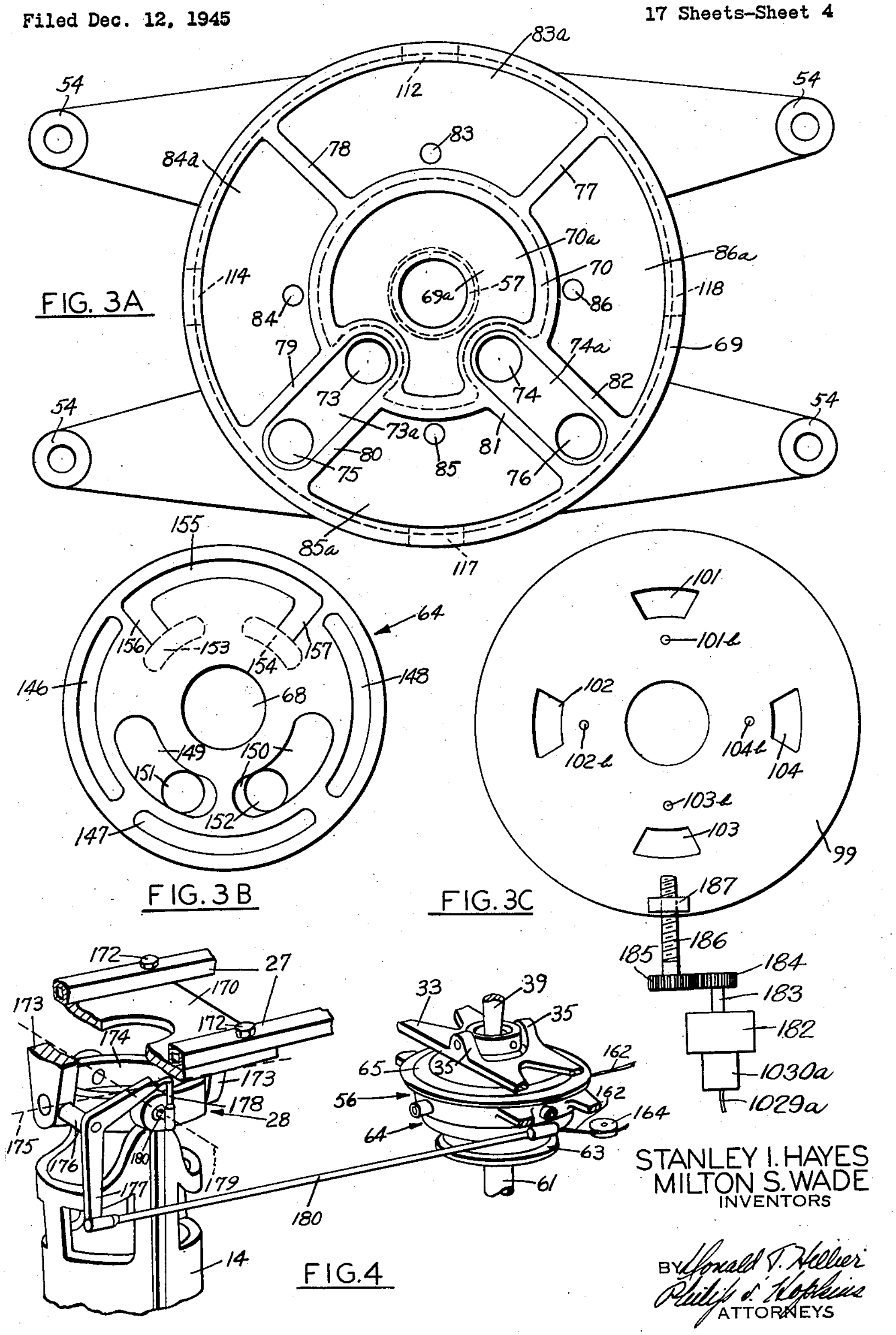
Fig. 3A is a top view of the main valve section, showing the six circumferentially spaced chambers.
Fig. 3B is a top view of the auxiliary effect valve section.
Fig. 3C is a top view of the plate placed on the top of the attitude valve section, together with the means for moving this plate in accordance with the instant assumed air speed.
Fig. 4 is a perspective view showing the linkage interconnecting the auxiliary effect valve section with the universal joint.

Referring to Figs. 3 and 3A, the hollow upper end of tube 57 communicates with the chamber 70a formed in casting 69 by the generally circular wall 70 and the bottom 69a of the casting. A plate 71 is fixedly attached to the top of casting 69 by means of the countersunk screws 71a and a central hole 72 is present in the center of plate 71. The bottom 69a of casting 69 is flat and solid with the exception of the ports 73, 74, 75 and 76, 83, 84, 85 and 86, the functions of which will be later described. Integral with the central generally circular wall 70 of the casting 69 are the radially extending walls 77, 78, 79, 80, 81 and 82. Consequently, the various parts of casting 69 and the plate 71 form the chambers 83a, 84a, 73a, 85a, 74a and 86a. The plate 71 has four openings 89, 90, 91 and 92, each of which opens into one of the respective chambers 83a, 84a, 85a and 86a. Ports 83, 84, 85 and 86 also open into the respective chambers 83a, 84a, 85a and 86a.

The flange 93a, integral with the casting 93 of the attitude valve section 65 is slightly less in diameter than the diameter of plate 71 upon which it rests. Flange 93a is centered, when valve section 65 is in its neutral fore and aft position, with respect to plate 71. Integral with casting 93 are the four radial members 94, 95, 96 and 97 which support the hollow central hub 98. The radial members 94, 95, 96 and 97 form four chambers 101a, 102a, 103a and 104a in the attitude valve section 65. A plate 99 is affixed to the top of casting 93 by means of the countersunk screws 99a and this plate is solid except for the central opening 100, the four openings 101, 102, 103 and 104 placed therein, and the four smaller openings 101b, 102b, 103b and 104b. It will be noted that each of the openings 101, 102, 103 and 104 is placed above one of the chambers 101a, 102a, 103a and 104a formed by the radial partitions 94, 95, 96 and 97 and plate 99. The bottom of each of these chambers is open.

In view of the described structure, it will be appreciated that the main central chamber 70a formed in the main valve section 56 by the casting 69 and associated parts is at all times evacuated by the turbine 62 by a predetermined amount less than the prevailing atmospheric pressure. Vacuum flows (to achieve simplicity of expression vacuum will be spoken of as a positive rather than a negative phenomenon) through the central port 72 in the plate 71 and through the central port 100 in the attitude valve section 65. The plate 50 rests at all times upon the circular plate 99 affixed to the top of casting 93 and the cup 49 together with plate 50 forms a chamber in which vacuum is present at all times.

When the control stick 39 is in its neutral fore and aft as well as neutral lateral positions, the plate 50 is centered with respect to the plate 99 upon the top of casting 93 of the attitude valve section. In this position the plate 50 covers the main ports 101, 102, 103 and 104 in plate 99, but the four auxiliary ports 101b, 102b, 103b and 104b are not covered by this plate. Accordingly, a limited amount of vacuum is, in the neutral position of stick 39, admitted to the chambers 101a, 102a, 103a and 104a. This same amount of vacuum passes through the ports 89, 90, 91 and 92 of plate 71 into the chambers 83a, 84a, 85a and 86a of the main valve section 56. The vacuum within chamber 83a passes through the port 112 in the side of casting 69, and through the connector 113 and a suitable flexible connection (not shown) to the front pitching bellows 18; the vacuum within chamber 84a passes through the port 114, connector 115 and the flexible hose 116 to the left banking bellows 20; the vacuum within chamber 85a passes through the port 117 and a suitable connector and flexible hose (not shown) to the rear pitching bellows 19; while the vacuum within chamber 86a passes through the port 118, connector 119 and flexible hose 120 to the right banking bellows 21.

Accordingly whenever the plate 50 is in its neutral position by virtue of the control stick 39 being placed in its neutral position, an equal amount of vacuum is present in all four of the main bellows 18, 19, 20 and 21, and the fuselage 22 is positioned in the "cruising" position, the fore end of the fuselage being slightly raised, as shown.

However, whenever the student within the fuselage 22 pushes the control stick 39 ahead, to simulate the movement which he would impart to the control stick to cause the nose of the plane to drop, it will be appreciated that the upper end of the control stick 39 would move to the front in Fig. 3, causing the universal joint 44 to move to the rear. Plate 50 similarly moves, to the rear, and it will uncover the port 101 in plate 99 by an amount dependent upon the angular movement of the control stick 39 ahead of its neutral position. At the same time, the plate 50 will uncover the port 103 by an amount dependent upon the same factor. Consequently, an increased amount of vacuum will be applied to the port 101, to the chamber 101a and port 89 to the chamber 83a in the main valve section 56. This increased amount of vacuum will be applied through the port 112, connector 113 and flexible hose to the front pitching bellows 18, causing this bellows to collapse proportionately. At the same time, the movement of plate 50 will cover the port 103b in plate 99 so that vacuum will no longer be applied to the chamber 103a. Instead, the movement of plate 50 will simultaneously uncover the port 103, admitting atmosphere to chamber 103a which is transmitted through the port 91 in plate 71 to the chamber 85a, from whence it passes through the port 117, the provided connector and flexible hose to the rear pitching bellows 19. This bellows will consequently be expanded accordingly. Hence the contraction of bellows 18 and expansion of bellows 19 as a result of a forward movement of the upper end of control stick 39 will result in a lowering of the nose of the fuselage 22.

On the other hand should the control stick 39 be moved to the rear, it will be appreciated that the plate 50 moves ahead in Fig 3, opening the port 103 in plate 99 and admitting an increased amount of vacuum through the previously described chambers to the port 117 which connects with the rear pitching bellows 19. At the same time the port 101b is covered and port 101 is uncovered. Accordingly, atmosphere is admitted through the port 101 and the intermediate ports and chambers to the connector 113 which connects with the front pitching bellows 18. Accordingly, bellows 18 is expanded while bellows 19 is contracted, and the nose of fuselage 22 is raised.

It will therefore be appreciated that the pitching attitude of the fuselage 22 may be controlled by the student in the trainer to place the fuselage in any pitching attitude, within the limitations of the apparatus, by fore and aft movement of the control stick 39.

The plate 50 and cap 49 are designed so that whenever the control stick 39 is moved directly fore or aft, the plate 50 does not cover either of the ports 102b or 104b or uncover either of the ports 102 or 104, and accordingly the lateral banking position of fuselage 22 is unaffected.

Assuming that the student moves the upper end of control stick 39 to the left of its neutral lateral position, it will be appreciated that the plate 50 is moved to the right of the fuselage, thereby uncovering the port 102 in plate 99 by an amount dependent upon the angular displacement of the control stick 39. An increased amount of vacuum will therefore be passed through the port 102 and the port 90 in plate 71 of the main valve section 56. This increased vacuum will manifest itself within chamber 84a and will pass through the port 114, connector 115 and the flexible connector 116 to the left banking bellows 20, causing this bellows to contract proportionately. Simultaneously therewith, the plate 50 will cover the auxiliary port 104b in plate 99, preventing the application of vacuum to the chamber 104a in the attitude valve section 65, but at the same time the movement of plate 50 will uncover the port 104 proportionately and atmosphere will enter the chamber 104a through this port and will enter the chamber 86a through the port 92 in plate 71. Atmosphere then passes through the port 118 in casting 69 of the main valve section as well as through the intermediate connector 119 and flexible connection 120 to the right banking bellows 21. Accordingly, when the control stick 39 is moved to the left the left banking bellows 20 is collapsed proportionately and the right banking bellows 21 is expanded proportionately, causing the fuselage 22 to bank to the left.

If on the other hand, the student moves the upper end of control stick 39 to the right, the plate 50 moves toward the left side of the fuselage covering the port 102b and opening the port 102 to the atmosphere. Atmosphere passes through the port 90 into chamber 84a and thence through the port 114, connector 115 and connection 116 to the left banking bellows 20. Simultaneous therewith the movement of plate 50 opens port 104 and vacuum passes through this port and port 92 to the chamber 86a in the main valve section 56. This increased vacuum passes through the port 118 and intermediate connecting elements to the right banking bellows 21. Accordingly left banking bellows 20 is expanded by the atmosphere admitted thereto and right banking bellows 21 is collapsed by the increased amount of vacuum applied thereto, resulting in a banking of fuselage 22 to the right.

Again, it should be particularly noted that plate 50 and cap 49 are designed so that whenever the control stick 39 is moved directly to the left or right, the movement of plate 50 does not affect in any manner the ports 101, 101b, 103 or 103b, and consequently the pitching attitude of fuselage 22 is not affected.

Without a detailed explanation it should be understood that whenever the control stick 39 is moved ahead or to the rear of its neutral fore and aft position and is simultaneously displaced to the right or left of its neutral lateral position, the plate 50 will properly be moved relative to the plate 99 so that the main ports 101, 102, 103, 104 and the auxiliary ports 101b, 102b, 103b and 104b are covered or uncovered to properly place the fuselage 22 in a combined pitching and banking position, simulating the position in which a real airplane would be placed were its control stick moved accordingly.

Reference is now made to Fig. 3 where the rudder valve section 63 is seen to comprise a top 127 integral with the depending vertical cylindrical wall 128 which is of lesser diameter than the top 127, forming the flange 129. The top 127 is flat and solid with the exception of the ports 130, 131, 132, 133 and 134, and the channel 135. Integral with the top 127 and the cylindrical wall 128 is the vertical, cylindrically shaped wall 136 which is slightly larger in diameter than the hole 67 in the top 127 and which extends around the hole 67, except for the provision of the two vertical walls 137 and two vertical walls 138. An interior flange 139 is integral with the lower edges of the vertical walls 136 in order to form the hole 66, and integral with the flange 139 is the extension 140 which merges with the vertical members 137 as well as with the vertical side wall 128. The vertical members 137 extend from the cylindrical wall 136 to the outer cylindrical wall 128.

The outer wall of channel 135 depends vertically from the outer edge of flange 129 and is designated 141, it has two curved vertical end walls 142 integral with the outer wall while its inner wall is formed by the vertical cylindrical wall 128 which is integral with the end walls. The bottom of channel 135 is solid and designated 143, this bottom being integral with the walls of the chamber. The vertical walls 138 are integral with the top 127 and with the cylindrical wall 128, as well as with the inner cylindrical wall 136, a notch 144 being cut in the inner cylindrical wall 136 so as to form a duct leading from within cylinder 136 to the channel 135. Integrally formed with the walls 138 and with the cylinder 136 is a suitable bottom (not shown) so as to render the passage from cylinder 136 to channel 135 airtight. A notch 145 is cut in the top of plate 127 so as to extend the top of channel 135 back toward the hole 67.

Inasmuch as tube 57 is inserted through the hole 66 and hole 67 in the rudder valve section 63, it will be appreciated that vacuum leaks through the holes 58 in tube 57 at all times so as to be present within cylinder 136. This vacuum is also present at all times within the port 131 which is in the top 127 between the vertical walls 137, and is at all times present within the channel 135 and notch 145 in the top 127. At the same time atmosphere is always present within the ports 130, 132, 133 and 134.

Turning now to a detailed description of the auxiliary effect valve section 64, as shown in Figs. 3 and 3B, it will be recalled that this valve section has a central hole 68 which extends completely therethrough for the reception of the metal shaft 57.

It will be noted that the leaf 64 has three arcuate slots 146, 147 and 148 extending completely therethrough, these slots being located and separated as shown. Also placed in the top surface of section 64 are the two counterbores 149 and 150, these counterbores extending only a portion of the way through the section 64, with the exception of the circular ports 151 and 152 which extend completely through section 64.

In the lower surface of leaf 64 are the two arcuate counterbores 153 and 154 which extend upwardly part way through the section 64 and communicate with the arcuate counterbore 155 placed in the top of section 64 by means of the two counterbores 156 and 157. Counterbores 155, 156 and 157 do not extend completely through leaf 64.

When the lower surface of the auxiliary effect valve section 64 lies against the upper surface of the rudder valve section 63, and the two sections are in their neutral operative positions, the vacuum-filled port 131 of section 63 lies between the two ports 151 and 152 of the section 64 and slightly overlaps these two ports so that a limited amount of vacuum is introduced into the counterbores 149 and 150 in the upper surface of section 64. At the same time the port 73 in the lower surface of the main valve section 56 is directly above the middle portion of counterbore 149 and port 74 is directly above the center portion of counterbore 150. In the central positions the atmosphere ports 130 and 132 are slightly displaced from the lower ends of the ports 151 and 152 which extend completely through the section 64.

Accordingly, when the sections 63, 64 and 56 are in their neutral operative positions, a limited amount of vacuum passes from the vacuum port 131 through the ports 151 and 152 and counterbores 149 and 150 through the ports 73 and 74 into the chambers 73*a* and 74*a*, and thence through the ports 75 and 76, the connectors 158 and 159 and flexible tubings 160 and 161 to the turning motors 23. Accordingly an equal amount of vacuum is introduced to the turning motors through the lines 160 and 161 and these motors do not operate to rotate the fuselage 22.

In Fig. 3 it will be seen that the cable 162 encircles the section 63, as shown, and is fastened thereto by suitable means to prevent slippage, this cable also running upon the pulleys 164 and having its forward left and right ends selectively connected to the left and right rudder pedals 26. Whenever the rudder valve section 63 is rotated clockwise in response to a pressing forward of the right rudder pedal, it will be appreciated that the vacuum port 131 in section 63 will move out of engagement with the port 152 in the section 64 and that the atmosphere port 132 will register with the port 152. Accordingly, atmosphere will pass through the ports 132, 152, and counterbore 150 to the port 74 and chamber 74*a* in the main valve section 56. Atmosphere then passes from chamber 74*a* through the port 76, connector 159, and flexible hose 161 to the turning motors 23. At the same time the vacuum port 131 will overlap the port 151 in section 64 to an increasing extent, and an increased amount of vacuum will be passed through port 151, counterbore 149, and port 73 in the main valve section 56 to the chamber 73*a*, from which it passes to the turning motors through the port 75, connector 158, and flexible hose 160. The increased amount of vacuum passing through the flexible hose 160 and the passing of atmosphere through the flexible hose 161 to the turning motors results in an operation of these motors such as to turn the fuselage 22 to the right.

On the other hand, assuming that the rudder valve section 63 is rotated counterclockwise from its neutral position in response to a pressing forward of the left rudder pedal, the vacuum port 131 in section 63 will move away from the port 151 in section 64 and will come into an increasingly overlapping position with respect to the port 152 in section 64. Accordingly, more vacuum will be introduced into the chamber 74*a* and to the turning motors 22 through the port 76, connector 159 and flexible hose 161. Simultaneously therewith, the vacuum port 131 will move out of engagement with the port 151 and the atmosphere port 139 will move into engagement with port 151, whereupon atmosphere will be introduced to the chamber 73a and to the turning motors 23 through the port 75, connector 158 and hose 160. The introduction of atmosphere to the turning motors 23 through the flexible hose 160 and the introduction of vacuum to turning motors through the hose 161 in response to a counterclockwise rotation of the rudder valve section 63, caused by a pressing forward of the left rudder pedal, will result in a rotation of the fuselage 22 to the left.

It will be appreciated that the rate of rotation of fuselage 22 will depend upon the angular displacement of the rudder valve section 63 from its neutral position, this displacement in turn being in accordance with the magnitude of the displacement of the rudder pedals 26 from their neutral position.

As is well known to those skilled in the art, whenever a plane in actual flight is turned in either direction the plane automatically banks in the direction of the turn. The previously described valve arrangement is such that whenever the fuselage 22 is turned in either direction, vacuum and atmosphere are introduced into the banking bellows 20 and 21 to automatically cause the fuselage 22 to bank in the direction of the turn.

When the two valve sections 63 and 64 are in their neutral operative positions, the port 133 in section 63 lies immediately below and between the adjacent ends of the two counterbores 146 and 147 which extend completely through section 64, and the atmosphere port 134 is similarly positioned with respect to the adjacent ends of the counterbores 147 and 148. Also the vacuum filled counterbore 135 in section 63 is below and slightly off-set from the clockwise end of counterbore 146 and the counterclockwise end of counterbore 148 in section 64. Also, when section 64 is neutrally positioned, the port 84 in section 56 lies immediately above the center of counterbore 146 and port 86 in section 56 lies immediately above counterbore 148.

Consequently, when the rudder valve section 63 is rotated clockwise in response to a pressing forward of the right rudder pedal—which movement results in a rotation of the fuselage 22 to the right—the atmosphere port 133 overlaps the counterbore 146 and atmosphere passes through port 133, counterbore 146 and port 84 into the chamber 84a in the main valve section 56. It has previously been explained that this chamber is connected to the left banking bellows 20, and so atmosphere will be admitted to this bellows resulting in an expansion thereof. Simultaneously, the clockwise rotation of rudder valve section 63 will result in the clockwise end of the vacuum filled counterbore 135 overlapping the counterclockwise end of the counterbore 148 in the section 64. Vacuum will pass through counterbore 148 and the port 86 into the chamber 86a in the main valve section 56. It has previously been explained that this chamber is connected to the right banking bellows 21, and so vacuum will be introduced into that bellows, resulting in a contraction thereof. The expansion of the left banking bellows 20 and simultaneous contraction of the right banking bellows 21 will result in a banking of fuselage 22 toward the right. The turning of the fuselage to the right also results in a banking to the right.

On the other hand, should the rudder valve section 63 be rotated counterclockwise in response to a pressing forward of the left rudder pedal—which movement results in a rotation of the fuselage 22 to the left—the atmosphere port 134 will come into an overlapping position with respect to the clockwise end of counterbore 148 in the section 64, and atmosphere will be fed through this counterbore and the port 86 into the chamber 86a in the main valve section 56. From this chamber the atmosphere will be introduced into the right banking bellows 21. Simultaneously therewith the counterclockwise end of the vacuum filled counterbore 135 will overlap the clockwise end of counterbore 146 and vacuum will pass through this counterbore and the port 84 into the chamber 84a in the main valve section. Vacuum will pass from this chamber into the left banking bellows 20. The introduction of vacuum into the left banking bellows 20 and the introduction of atmosphere into the right banking bellows 21 will result in a banking of the fuselage 22 to the left. Consequently, whenever the fuselage 22 is turned to the left it also banks to the left.

It has been explained that the rate of rotation of the fuselage 22 depends upon the angular displacement of the rudder valve section 63 from its neutral position. At the same time it will be appreciated that the banking movement imparted to the fuselage 22 by a rotation of the rudder valve section 63 will also be proportional to the angular displacement of the rudder valve section from its neutral position. Therefore the fuselage 22 not only properly banks in the direction of the turn, but the angle of the bank is proportional to the rate of turning, accurately simulating the banking of a plane in actual flight caused by the turning thereof.

Referring again to the case of a plane in actual flight for purposes of comparison, whenever the plane is turning the nose of the plane tends to drop. This is commonly referred to in the art as "automatic nose down with turn." The previously described valve arrangement also operates to lower the nose of the fuselage 22 whenever it is turning.

Referring to Fig. 3, the counterbore 135 and notch 145 are always filled with vacuum, and when the valve sections are in their neutral operative positions, the notch 145 lies immediately below and slightly off-set from the adjacent ends of the counterbores 153 and 154 placed in the lower surface of section 64, and the port 83 in section 56 lies immediately above the center of counterbore 155 which is connected with counterbores 153 and 154. Also the atmosphere ports 133 and 134 lie below and are slightly off-set from the ends of counterbore 147 which passes through section 64, while port 85 in section 56 lies immediately above the center of counterbore 147. Whenever valve section 63 is moved in either direction from its neutral position, one of the ports 133 or 134 will come into overlapping relation with the counterbore 147 in section 64. Atmosphere will pass through counterbore 147 and port 85 into the chamber 85a in the main valve section 56. It has been previously shown that this chamber is connected to the rear banking bellows 19, and accordingly atmosphere will be introduced into that bellows. Simultaneously therewith whenever the rudder valve section 64 is rotated in either direction from its neutral position, the vacuum filled notch 145 will come into overlapping position with one of the counterbores 153 and 154 placed in the bottom of the auxiliary effect of section 64. Accordingly vacuum will pass from the counterbore in question along the counterbore 156 or 157 into the counterbore 155 which engages the port 83 in the bottom of section 56. Vacuum will be introduced into the chamber 83a, and inasmuch as this chamber is connected to the front pitching bellows 18, vacuum will be introduced into that bellows. The simultaneous introduction of the vacuum into the front pitching bellows 18 and atmosphere into the rear pitching bellows 19 will result in a lowering of the nose of fuselage 22.

Accordingly the valve arrangement disclosed herein is such that the nose of the fuselage 22 is lowered whenever the fuselage 22 is turning to the left or right.

Also in the case of a plane in actual flight whenever the plane is banked to the left or right, the plane automatically turns in the direction of the bank. The previously described valve arrangement, together with the apparatus now to be described, operates to cause the fuselage 22 to automatically turn in the direction of the bank when the fuselage is banked.

Referring now to Fig. 4, the main spindle 14 and the main universal joint 28 are shown as well as the sub-frame members 27 of the fuselage 22. The sub-frame members 27 are affixed by means of bolts 172 to the plate 170 which is directly above the universal joint 28. The ears 173 which form a part of the universal joint 28 are integral with the plate 170 and are pivotally mounted on the gimbal ring 174 for pivoting about the axis 175 which extends longitudinally of the fuselage 22. Affixed to the rear ear 173 is the integral extension 176, upon the outer end of which is pivotally mounted the bell crank 177, the fore end of which is pivotally attached to the link 178. The gimbal ring 174 is pivotally mounted in the upper end of the main spindle 14 for pivoting about the transverse axis 179 and the lower end of member 178 is pivotally attached to the stud 180, at a point on the transverse axis 179. The lower end of crank 177 has pivotally attached thereto the rear end of link 180, the forward end of which is pivotally attached to the auxiliary effect valve section 64 by means of the pin 181, seen in Fig. 3.

In Fig. 4 it will be appreciated that whenever the fuselage 22 is banked toward the left, the ears 173 integral with plate 170 are rotated counterclockwise as seen from the rear of the trainer. The right end of stud 178 will move upwardly and inasmuch as the lower end of link 178 does not move, the lower arm of bell crank 177 will move towards the rear pulling link 180 in the same direction and causing the auxiliary effect valve section 64 to be rotated clockwise as seen from above.

Referring now to Fig. 3, and assuming that before the banking to the left of fuselage 22 occurred the valve sections were in their neutral positions, the clockwise rotation of the auxiliary effect valve section 64 will cause the port 152 to overlap the vacuum port 131 in the rudder valve section 63 by a greater amount dependent upon the angle of bank. Accordingly, increased vacuum will be passed through the port 152, counterbore 150 and the port 74 in the main valve section 56 into the chamber 74a, and through the port 76, connector 159 and flexible connection 161 to the turning motors 23. Simultaneously therewith, the clockwise rotation of the section 64 will cause the port 151 in section 64 to overlap the atmosphere port 130 by a proportionate amount and the correct amount of atmosphere will be introduced from port 130 through port 151, counterbore 149 and port 73 into the chamber 73a in the main valve section 56. From this chamber the atmosphere passes through port 75, connector 158 and the flexible hose 160 to the turning motors 23.

It has previously been shown that a passing of vacuum through the flexible hose 161 to the turning motors and a passage of atmosphere through the flexible connection 160 results in a rotation of the trainer fuselage 22 to the left.

Accordingly, whenever fuselage 22 is banked toward the left, it automatically turns to the left, and it will be appreciated that the rate of automatic turning will be dependent upon the angle of bank.

On the other hand, referring to Fig. 4, when the fuselage 22 is banked toward the right it will be appreciated that the central pivot of bell crank 177 moves downwardly and that the link 180 is moved toward the head of the fuselage, resulting in a counterclockwise rotation of the auxiliary effect valve section 64, as seen from above.

Referring to Fig. 3, and assuming that before the banking to the right of fuselage 22 occurred the valve sections were in their neutral position, it will be appreciated that the counterclockwise rotation of the auxiliary effect valve section will cause the port 151 in section 64 to overlap the vacuum port 131 to a greater extent. Accordingly, increased vacuum will be introduced through the port 131, port 151, counterbore 149 and port 73 to the chamber 73a, from whence it passes through the port 75, connector 158 and flexible hose 160 to the turning motors 23. Simultaneously therewith, the port 152 in section 64 will overlap the atmosphere port 132 in the rudder valve section 63 and atmosphere will pass through port 132, port 152, counterbore 150, and port 74 into the chamber 74a, and from that chamber it passes through the port 76, connector 159, and flexible connection 161 to the turning motors. It has previously been stated that a passage of atmosphere to the turning motors through the hose 161 accompanied by a passage of vacuum to the turning motors through the hose 160 results in a rotation of the fuselage 22 toward the right. It will therefore be appreciated that whenever the fuselage 22 is banked to the right, it is automatically turned to the right and, of course, the rate of automatic turning caused by the banking of the fuselage depends upon the angle of bank of the fuselage.

One of the stated objects of this invention was to provide a novel system for use in grounded aviation trainers whereby the valve arrangement could be made responsive to the assumed factor of air speed so that the pitch attitude of the fuselage would be dependent upon the assumed air speed. In the case of a plane in actual flight, it is well understood by those skilled in the art, an increase in air speed automatically results in a raising of the nose of the plane while a decrease in air speed has the opposite effect.

Referring now to Fig. 3C, there is shown in block form a motor 182, the output shaft of which is designated 183. The factors which are employed in order that the output shaft 183 will always be angularly positioned from a predetermined zero point according to the instant assumed air speed of the fuselage will later be explained. Accordingly, the gear 184 affixed upon the outer end of shaft 183 as well as the gear 185 driven by gear 184 are always similarly positioned. Gear 185 is affixed upon the outer end of the screw 186 which travels in the nut 187 affixed upon the upper surface of the plate 99 of the attitude valve section 65. Suitable means may be provided to prevent longitudinal movement of screw 186.

As assumed air speed increases, the air speed output unit 182 is operated in such a manner that the screw 186 moves the nut 187 and the entire valve section 65 moves toward the rear of fuselage 22.

Referring to Fig. 3, it will be appreciated that whenever the plate 99 moves to the rear, plate 50 remaining stationary, the port 103 in plate 99 moves out from under plate 50 and vacuum passes through this port into the chambers 103*a* and 85*a* and through the port 117 to the rear pitching bellows 19. Simultaneously therewith, the movement to the rear of plate 99 causes the auxiliary port 101*b* to be covered by the plate 50 and the port 101 moves out from under plate 50 so that atmosphere may pass through this port into the chamber 101*a* and chamber 83*a*, and then through the port 112, connector 113 and intermediate elements to the front pitching bellows 18. The admission of vacuum to the rear pitching bellows 19 and simultaneous admission of atmosphere to the front pitching bellows 18 results in a raising of the nose of the fuselage.

Of course this raising of the nose of the fuselage may be checked if desired by a forward movement of the control stick 39.

On the other hand, should the factor of assumed air speed be decreased, the operation of unit 182 in Fig. 3C will be reversed so as to move the disc 99 toward the head of the trainer an amount dependent upon the assumed decrease. Referring to Fig. 3 it will be appreciated that when disc 99 moves toward the head of the trainer, port 103*b* is covered and port 103 is opened to the atmosphere, admitting atmosphere to the rear pitching bellows 19 in the manner previously described. Simultaneous therewith, the port 101 will be opened to the vacuum within cap 49 and vacuum will be admitted to the front pitching bellows 18.

The consequent collapsing of the front bellows 18 and expansion of the rear bellows 19 will result in a lowering of the nose of the fuselage. Accordingly, the improved valve structure of my invention is adapted for use to affect the attitude of the fuselage according to the instant assumed air speed.

*Engine simulator*

It is well understood that the power output of an aircraft engine depends upon the basic factors of manifold pressure and engine speed—an increase in either resulting in an increase in engine power output. Manifold pressure depends upon throttle lever setting, supercharger lever setting, altitude and engine performance. Engine speed depends upon the setting of the engine speed lever, and under certain circumstances, upon the throttle lever setting. Means for producing the factor of assumed manifold pressure, dependent upon the four corresponding assumed factors will first be explained.

Figure 5:
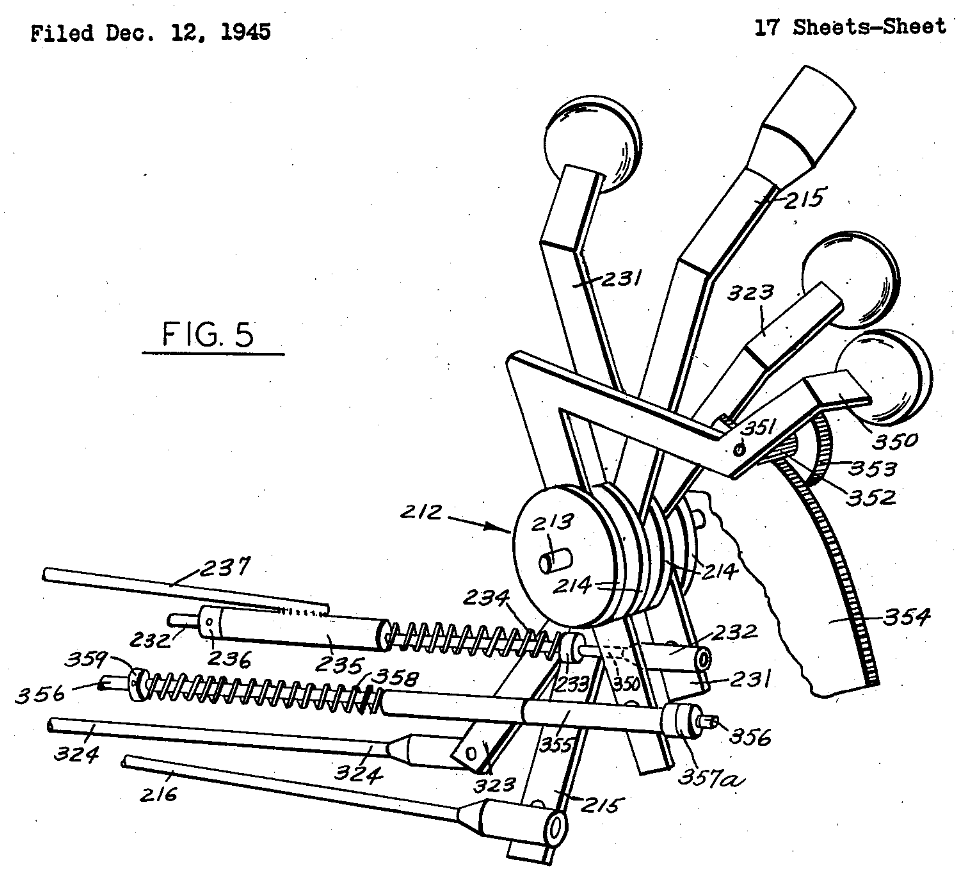
Fig. 5 is a perspective view of the quadrant assembly showing the throttle, mixture, governor control and supercharger levers.

Reference is now made to Fig. 5 where the quadrant assembly, the location of which is also shown in Fig. 1, is designated generally by 212. There is provided the shaft 213 which is affixed inside the fuselage 22 as well as a plurality of friction discs 214 which are fixedly mounted upon shaft 213. A lever 215 is provided, this lever simulating the throttle control lever of an actual aircraft, and this lever is rotatably mounted upon the fixed shaft 213 as well as being gripped upon either side by the two adjacent friction discs 214. The rear end of link 216 is pivotally attached to the lower end of lever 215.

Figures 6, 6A:
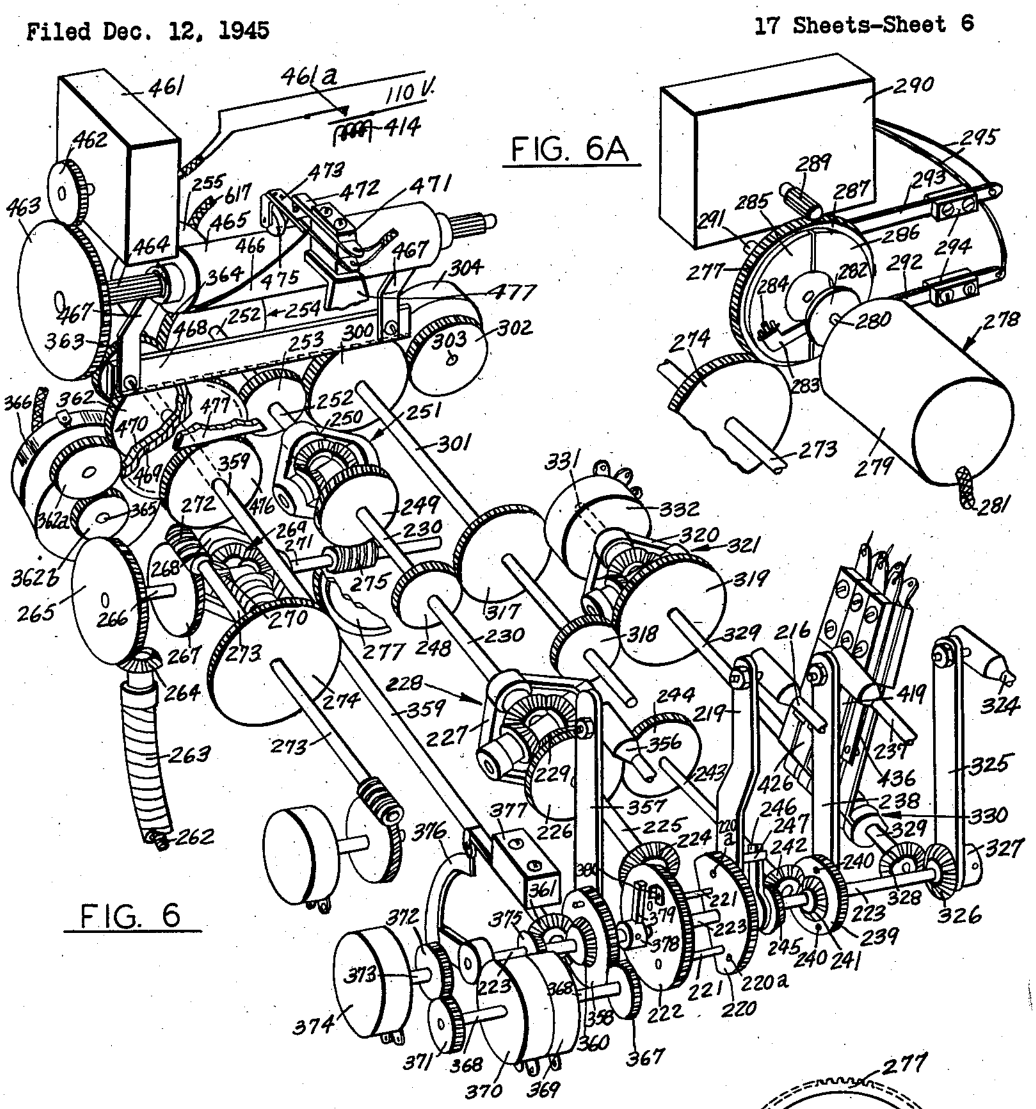
Fig. 6 is a perspective view of the mechanical engine unit.
Figs. 6A, 6B and 6C are detailed views of portions of the apparatus associated with Fig. 6.

Referring now to Fig. 6, it will be seen that the forward end of link 216 is pivotally attached to the upper end of arm 219, the lower end of which is fixedly attached to the gear sector 220 by pins 220*a*. Gear sector 220 is freely mounted upon shaft 223 and is pinned to the gear 222 by means of the pins 221 so that gear 222 which is also freely mounted upon shaft 223 always rotates in the same direction and through the same angle as the sector 220. Insofar as the present disclosure is concerned, sector 220 merely transfers motion of arm 219 to gear 222. A shaft 223 is provided, this shaft being suitably rotatably mounted in the frame (not shown) of the unit shown in Fig. 6. Gear 222 drives the bevel gear 224 which is affixed upon the rear end of the longitudinally extending shaft 225 which also is rotatably mounted in the frame of the unit. The shaft 225 is rotatable with respect to the gear 226 which is affixed upon the frame 227 of the throttle-supercharger differential designated generally by 228. Gear 229 of this differential is affixed upon the forward end of shaft 225 so that this gear forms the primary input of differential 228. The output shaft of this differential is designated 230 and is rotatably mounted within the frame of the unit.

Referring back to Fig. 5, it will be appreciated that whenever the lever 215 is pushed ahead, or to the left in Fig. 5, to simulate the advancing of the throttle lever of a plane in actual flight, the lower end of lever 215 moves toward the rear as does the link 216. In Fig. 6 it will be seen that the upper end of lever 219 will move to the rear rotating the gear sector 220 and gear 222 clockwise as seen from the left. Accordingly, bevel gear 224 will be rotated clockwise as seen from the rear, as will the shaft 225 and gear 229. The output shaft 230 of the differential 228 will be rotated counterclockwise.

On the other hand, when the throttle lever 215 in Fig. 5 is moved to the rear to simulate the retarding of the throttle lever of a plane in actual flight, it will be appreciated that all of the just described parts move in the opposite direction so that the output shaft 230 of differential 228 is rotated clockwise.

In view of the above, the conclusion may be drawn that the shaft 230 is always rotatably positioned from a predetermined initial point in accordance with the instant position of the throttle lever 215, the farther ahead this throttle lever is positioned, the more counterclockwise will be the position of shaft 230, and the farther to the rear of the throttle lever 215, the more will be the clockwise position of shaft 230 from the predetermined neutral point.

Referring back to Fig. 5, it will be seen that a lever 231 simulating the supercharger control lever of a real aircraft is provided, this lever being rotatably mounted upon the fixed shaft 213 and being gripped by the adjacent friction washers 214. The rear end of link 232 is pivotally attached to the lower end of lever 231, and placed upon link 232, as shown, is the fixed stop 233 against which the rear end of the compression spring 234 bears, the forward end of spring 234 bearing against the rear end of sleeve 235 which also encircles link 232. A fixed stop 236 is affixed upon the forward end of link 232, and the rear end of link 237 is fixedly attached to sleeve 235, as shown.

Referring now to Fig. 6, it will be seen that the forward end of link 237 is pivotally attached to the upper end of arm 238, the lower end of which is affixed to the gear 239, by means of the pins 240. Gear 239 is freely mounted upon the shaft 223, and has integral therewith the bevel gear 241 which drives the gear 242 affixed upon the rear end of shaft 243. Shaft 243 is rotatably mounted in the frame of the unit and has affixed upon its forward end the spur gear 244 which meshes with the gear 226 which is affixed upon the frame 227 of the throttle-supercharger differential 228. Also freely mounted upon the shaft 223 is the bevel gear 245 which meshes with the bevel gear 242, and integral with the bevel gear 245 is the upstanding arm 246. A pin 247 is carried by the arm 219, which it will be recalled, is positioned by the throttle lever.

Referring back to Fig. 5, whenever the supercharger lever 231 is moved toward the rear of the fuselage, or to the right in Fig. 5, to simulate the advancing of the supercharger lever in a real plane, the link 232 and stop 233 will move ahead. If the throttle lever 215 is sufficiently far advanced that the pin 247 in Fig. 6 is positioned out of contact with the arm 246, the spring 234 in Fig. 5 will move the sleeve 235 and link 237 ahead. Accordingly, in Fig. 6 the upper end of arm 238 moves ahead, rotating the gear 239 counterclockwise as seen from the left. Inasmuch as pin 247 is not in engagement with arm 246, the gear 242 upon the rear end of shaft 243 will be rotated clockwise as seen from the rear and the gear 244 will be rotated in the same direction, resulting in a counterclockwise rotation of the gear 226 and frame 227 of the differential 228. At the same time the gear 245 and arm 246 integral therewith will be rotated clockwise as seen from the right.

If, on the other hand, the throttle lever 215 were positioned so that for the instant position of the supercharger lever 231 the arm 246 engages the pin 247, it will be appreciated that when the supercharger lever 231 is moved to the rear, the link 232 will move ahead. But the link 237, arm 238, gear 239 and gears 241, 242 and 245 will not move because the pin 247 prevents a clockwise movement of the gear 245 and arm 246. The friction between the throttle lever 215 and the friction discs 214 is sufficiently great that the link 232 merely moves ahead, compressing the spring 234. Accordingly, the supercharger lever 231 can produce a clockwise rotation of the shaft 243 and gear 244 to affect the secondary drive 226 of differential 228 only when the throttle lever is positioned sufficiently far ahead of the instant supercharger lever setting so as to permit a response to a further advancing of the supercharger lever. This accurately simulates the situation in a real aircraft where the supercharger lever may be used to further increase the engine power output only when the throttle lever is sufficiently far advanced.

On the other hand, should the supercharger lever 231 in Fig. 5 be moved towards the head of fuselage 22, or to the left in Fig. 5, to simulate the retarding of the supercharger lever of a real plane, the link 232 will move to the rear as will collar 236, sleeve 235 and link 237. In Fig. 6 it will be seen that the rearward movement of link 237 will result in a counterclockwise rotation of arm 238 and of the gears 239 and 241. Gear 242 upon shaft 243 will be rotated counterclockwise, as seen from the rear, while gear 245 and arm 246 will also be rotated counterclockwise as seen from the right. The counterclockwise rotation of gear 242 will result in a similar rotation of shaft 243 and gear 244, while the gear 226 which forms the secondary input of differential 228 will be rotated clockwise.

It should be noted that if the supercharger lever 231 is advanced beyond the point at which the arm 246 in Fig. 6 engages pin 247, a retarding of the supercharger lever 231 will have no effect upon gear 226 until the link 232 is moved sufficiently far to the rear so that the collar 236 engages the sleeve 235 in Fig. 5.

It has been shown, therefore, that, except for the limiting effect of throttle lever position, an advancing of the supercharger lever 231 in Fig. 5 results in a counterclockwise rotation of gear 226 in Fig. 6, while a retarding of the supercharger lever results in a clockwise rotation of gear 226. Whenever gear 226 is rotated counterclockwise, it will be appreciated that the output shaft 230 of differential 228 will be rotated counterclockwise—the same direction in which it is rotated whenever the throttle lever 215 is moved ahead. On the other hand, whenever the supercharger lever 231 is retarded, the clockwise rotation of gear 226 will result in a clockwise rotation of shaft 230—the same direction in which it is rotated whenever the throttle lever 215 is moved to the rear.

Accordingly, the rotatable position of the output shaft 230 of differential 228 is primarily dependent upon the setting of the throttle lever 215 but the rotatable position of this shaft is modified according to the setting of the supercharger lever 231. It will therefore be appreciated that the rotatable position of shaft 230 at any given instant may be used as a measure of assumed engine manifold pressure, insofar as manifold pressure is dependent upon the instant throttle lever and supercharger lever setting.

Still referring to Fig. 6, it will be seen that a spur gear 248 is affixed upon shaft 230, for purposes to be later described. Shaft 230 passes through the worm gear 249 which is affixed upon the frame 250 of the manifold pressure differential designated generally 251. The shaft 230 forms the primary input of this differential while the worm gear 249 forms the secondary input. The output shaft of differential 251 is designated 252, and has affixed thereupon the spur gear 253. Shaft 252 also forms the input shaft of the power output Selsyn type transmitter designated generally by 254, the housing of this transmitter being designated 255, and being rotatably mounted in a suitable frame member.

It is believed unnecessary to explain that the primary input of differential 251 will be in accordance with the combined throttle and supercharger lever positions.

Figure 7:
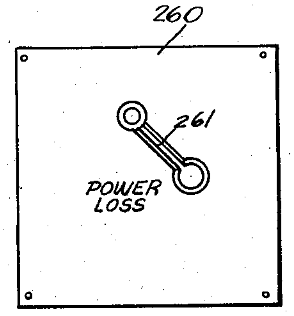
Fig. 7 shows the instructor's power loss control.

Reference is now made to Fig. 1 where it will be seen that the instructor's seat is numbered 41*a*, this seat being carried by the fuselage 22 so as to move therewith. In Fig. 7 it will be seen that a panel 260 is shown, and this panel is affixed alongside the seat so as to be visible to the instructor and so that the controls thereon may be operated by him. The crank 261 labeled "Power loss" is provided, and this crank is connected to the flexible shaft 262 seen in Fig. 6. The sheathing 263 surrounds the flexible shaft 262 and a gear 264 is affixed upon the end of flexible shaft 262 to be driven by crank 261.

Gear 264 drives the gear 265 which is affixed upon the left end of shaft 266, this shaft being rotatably mounted in the frame of the unit. Upon the inner end of shaft 266 is freely mounted the worm gear 267, this gear being affixed to the frame 268 of the power loss differential designated generally 269. The gear 270 of this differential is affixed upon the inner end of shaft 266 which forms the primary input thereof, the output shaft of differential 269 being designated 271, and having thereupon the form 275 which drives the worm gear 249.

Whenever the instructor who occupies the seat 41a affixed to the rear of fuselage 22 desires to simulate a loss of manifold pressure, which is primarily determined by the factors of throttle lever setting, supercharger lever setting, engine speed lever setting and assumed attitude, as will be later shown, the crank 261 in Fig. 7 is rotated by him in the clockwise direction and the bevel gear 264 in Fig. 6 is rotated counterclockwise as seen from above, resulting in a counterclockwise rotation of the gear 265, as seen from the left. The input shaft 266 of differential 269 is rotated in the same direction while the output shaft 271 is rotated clockwise as is the worm 275, resulting in a counterclockwise rotation of the worm gear 249 and the frame 250 of differential 251. The manifold pressure output shaft 252 will accordingly be rotated in the counterclockwise direction—the same direction in which it is rotated whenever the throttle lever is retarded or the supercharger lever is retarded.

On the other hand, should the instructor desire to simulate an increase in engine power which occurs as a result of changing factors in flight, the crank 261 in Fig. 7 is rotated counterclockwise and all of the just mentioned parts move in the opposite direction, including the manifold pressure output shaft 252 of differential 250 which will be rotated clockwise—the same direction in which it is rotated whenever the throttle lever is advanced or the supercharger lever is advanced.

Considering now the effect of assumed altitude upon assumed manifold pressure, reference is again made to Fig. 6.

The worm 272 which is affixed upon the forward end of shaft 273 is arranged to drive the worm gear 267, shaft 273 being suitably rotatably mounted within the frame of the unit. Gear 274 is affixed upon shaft 273, and arranged to drive this gear is the gear 277, shown also in Fig. 6A to which reference is now made.

Also in Fig. 6A is shown the altitude power loss Selsyn-type receiver 278, the housing of which is designated 279 and the output shaft of which is designated 280. The conductor 281 connects receiver 278 with a transmitter which is operated in such a manner that the output shaft 280 is always positioned relative to the housing 279 according to the factor of instant assumed altitude. Means will be later described herein for determining the factor of instant assumed altitude, it being sufficient at this point to state that the output shaft 280 is always positioned in accordance with that factor.

Affixed upon the output shaft 280 is the disc 282 carrying the arm 283 which rotatably holds the roller 284. Roller 284 is positioned so as to contact at all times one or both of the mutually insulated split contact segments 285 or 286, depending upon the relative rotational positions of the arm 283 and the split contact segments. The split contact segments are fixedly attached to the fibre gear 277 which is driven by the pinion 289 which is connected to the reversible motor 290, this motor being diagrammatically shown.

It will be seen in Fig. 6A that a pair of spring contacts 292 and 293 are provided, each of these contacts being mounted in one of the insulating blocks 294 and connected to the motor 290 through one of the conductors 295. Roller 284 and arm 283 are suitably grounded.

Figure 6B:
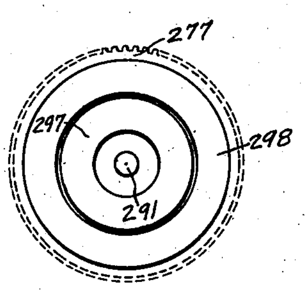

Referring to Fig. 6B it will be seen that the rear side of gear 277 carries two mutually insulated and concentric contact rings 297 and 298. The ring 297 is electrically connected to the contact segment 285 while the ring 298 is in electrical contact with the segment 286. The rings 297 and 298, gear 277, and contact segments 285 and 286 are mounted to rotate as a unit upon the fixed rod 291.

In view of the disclosures of Figs. 6A and 6B, it will be appreciated that the apparatus shown therein is the type of reversible follow-up system or power amplifying system such as is common in the art.

Normally roller 284 engages both of the contact segments 285 and 286 and accordingly, motor 290 is deenergized. However, assuming that an increase in the factor of assumed altitude occurs (an increase in assumed altitude resulting in a decrease in assumed engine manifold pressure), the output shaft 280 of the altitude receiver 278 is rotated clockwise through an angle proportional to the assumed increase in altitude. On the other hand, when a decrease in assumed altitude occurs, the shaft 280 is rotated counterclockwise through an angle proportional to the assumed decrease. Shaft 280 is consequently always positioned in rotation with respect to its fixed housing 279 according to the factor of instant assumed altitude.

Assuming that the roller 284 is in engagement with both of the contact segments 285 and 286, the motor 290 is de-energized. However, when an increase in assumed altitude occurs, the output shaft 280 is rotated clockwise and roller 284 is moved out of engagement with the segment 286, but it remains in engagement with segment 285, as shown in Fig. 6A. Accordingly, motor 290 is energized so that the output pinion 289 is rotated counterclockwise, rotating the gear 277, the slip rings 297 and 298, and the contact segments 285 and 286 clockwise, until both of the segments 285 and 286 are again in engagement with roller 284. At this instant motor 290 stops.

While the gear 277 is being rotated clockwise in response to an increase in assumed altitude, the gear 274 is rotated counterclockwise, imparting a similar rotation to the shaft 273 and worm 272, in Fig. 6, as seen from the rear. The counterclockwise rotation of worm 272 results in a clockwise rotation of the worm gear 267, as seen from the left. The frame 268 is accordingly rotated clockwise as is the output shaft 271 of differential 269 and the worm 275 affixed upon this shaft. The clockwise rotation of worm 275 results in a counterclockwise rotation of the worm gear 249, as seen from the rear. The frame 250 of differential 251 will rotate in the same direction as will the output shaft 252 of differential 251. Accordingly an increase in the factor of assumed altitude results in a counterclockwise rotation of manifold pressure shaft 252—the same direction in which this shaft is rotated when the throttle lever is retarded or when the supercharger lever is retarded, or when the instructor rotates the crank 261 in Fig. 7 to introduce a decrease in assumed manifold pressure.

On the other hand, should the output shaft 280 of the altitude receiver 278 be rotated counterclockwise in response to a decrease in the factor of assumed altitude, the roller 284 will move out of engagement with segment 285 but it will remain in engagement with segment 286, resulting in an energization of motor 290 such that the pinion 289 is rotated clockwise, resulting in a counterclockwise rotation of gear 277 and the elements carried thereby, this rotation continuing until both of the segments 285 and 286 again engage roller 284. At this instant motor 290 will stop.

While the gear 277 is being rotated counterclockwise in response to a decrease in the factor of assumed altitude, the gear 274 will be rotated clockwise as will the shaft 273 and worm 272. The worm gear 267 and frame 268 of differential 269 will be rotated counterclockwise as seen from the left, as will the output shaft 271 and worm 275. The counterclockwise rotation of worm 275 will result in a clockwise rotation of the worm gear 249 and the frame 250 to which it is attached. Accordingly, the output shaft 252 of differential 251 will be rotated in the same direction—the direction in which it is rotated whenever the throttle lever or supercharger lever are advanced, or when the instructor rotates the crank 261 in Fig. 7 to introduce an increase in the factor of assumed manifold pressure.

Accordingly, it will be appreciated that the input shaft 252 of the engine power output Selsyn transmitter 254 is rotated clockwise by an advancing of the throttle lever 215, by an advancing (actually a movement to the rear) of the supercharger lever 231, by a decrease in the factor of assumed altitude, and by a rotation of the instructor's crank 261 to introduce a higher assumed manifold pressure. This shaft is rotated counterclockwise in response to opposite changes in each of the four basic factors. The angular rotation of this shaft is, of course, proportional to the magnitude of the change in the four determining factors. Consequently, the rotatable position of shaft 252 from a predetermined initial position may be taken as the measure of the instant-assumed manifold pressure. The importance of the rotatable positioning of shaft 252 relative to the housing 255 of Selsyn transmitter 254 will later develop.

*Manifold pressure indication*

Those skilled in the art will appreciate that the manifold pressure indication given by the manifold pressure indicator in a plane in actual flight depends upon the factors of throttle lever setting, engine speed lever setting, supercharger lever setting, altitude as well as engine performance due to other miscellaneous factors. It has been shown that the shaft 252 in Fig. 6 is dependent upon the throttle lever setting, the supercharger lever setting, assumed altitude as well as the instructor's control crank 261 shown in Fig. 7, the instructor's control crank being positioned to introduce the effect of the miscellaneous factors affecting manifold pressure. Accordingly, the rotatable position of shaft 252 may be taken as a measure of the assumed manifold pressure of the engine assumed to be in the trainer.

In Fig. 6 it will be seen that the gear 253 which is affixed upon shaft 252 for rotation therewith drives the gear 300 which idles upon the shaft 301, shaft 301 being rotatably mounted in the frame of the unit. Gear 300 in turn drives the gear 302 which is affixed upon the rotor 303 of the potentiometer 304.

Figure 8A:
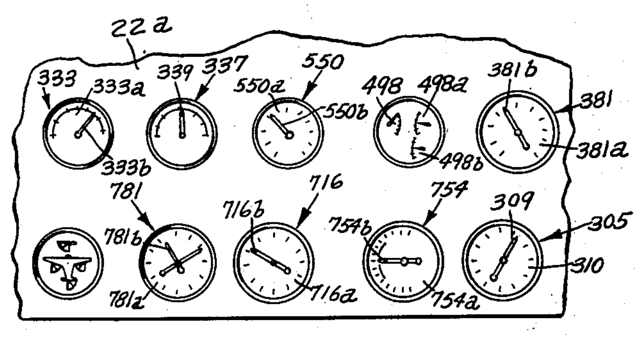
Fig. 8A is an elevation view of the student's instrument panel.
Figures 8, 9, 10:
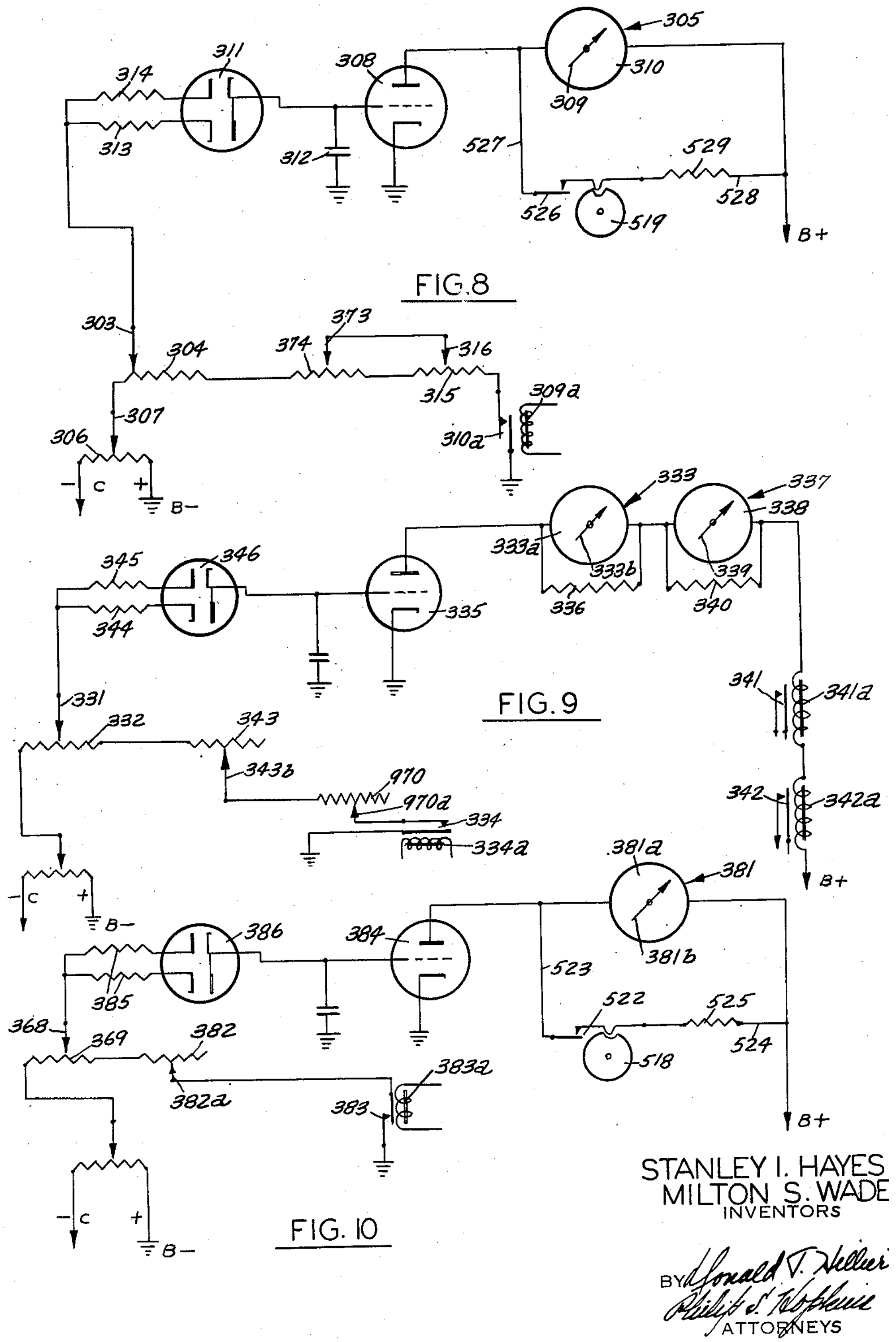
Fig. 8 shows the manifold pressure gauge regulating circuit.
Fig. 9 shows the cylinder head temperature gauge and oil temperature gauge regulating circuits.
Fig. 10 shows the tachometer regulating circuit.

Reference is now made to Fig. 8 which shows the electronic lag circuit including the potentiometer 304, rotor 303, and the manifold pressure indicator 305 which is placed upon the instrument panel 22*a* within fuselage 22 so as to be visible to the student within the seat 41 and to the instructor in seat 41*a*.

In Fig. 8 it will be seen that a potentiometer 306 is connected across the C voltage supply and that the rotor 307 of this potentiometer may be initially adjusted to bias the grid of tube 308 to cut off so that the manifold pressure indicator 305, which in reality is a voltmeter, will indicate an assumed manifold pressure of zero, when the shaft 252 and rotor 303 are in their zero positions. The manifold pressure indicator 305 is shown upon the student's instrument panel 22*a* in Fig. 8A. The position of rotor 303 during this initial adjustment is shown in Fig. 8, i. e., at the left end of potentiometer 304. Thereafter, as the shaft 252 in Fig. 6 is rotated clockwise in response to an increase in assumed manifold pressure, the rotor 303 of potentiometer 304 is rotated clockwise in Fig. 6—moved to the right in Fig. 8—the voltage upon the grid of tube 308 becomes less negative and accordingly a plate current flows through tube 308 causing the needle 309 to move clockwise over the dial 310 which is calibrated like the dial of a real manifold pressure gauge. Accordingly, a higher assumed manifold pressure is indicated. The double-diode 311, condenser 312 and resistor 314 are provided so that when the rotor 303 moves to the right in Fig. 8, the voltage across condenser 312 is gradually decreased, resulting in a gradual decrease of the voltage upon the grid of tube 308, the voltage upon the grid being equal to the voltage across the condenser. The plate current of tube 308 is gradually increased and the manifold pressure indicator 305 will show a gradual increase in assumed manifold pressure. It will be appreciated that the upper branch of tube 311 allows the discharging of condenser 312 in response to a movement to the right in Fig. 8 of rotor 303.

On the other hand assuming that the rotor 303 is positioned to the right of its position in Fig. 8 along potentiometer 304 to give an assumed manifold pressure indication of any amount, when the shaft 252 and the rotor 303 are rotated counterclockwise in Fig. 6 in response to a decrease in assumed manifold pressure, the rotor 303 of potentiometer 304 in Fig. 8 moves toward the left along potentiometer 304. The charge across condenser 312 is gradually increased through the resistor 313 and the lower branch of tube 311 so that the control voltage upon the grid of tube 308 is gradually increased, resulting in a gradual lowering of the plate current of this tube and a gradual counterclockwise movement of needle 309, thus indicating to the student a decrease in assumed manifold pressure.

It will be appreciated that the rate of clockwise movement of needle 309 for a given movement of rotor 303 depends upon the value of resistors 313 and 314, the larger this value, the slower the rate of movement. Also, the rate of counterclockwise movement of needle 309 depends upon the value of resistor 313—the larger this value, the slower the rate of movement. By employing different values for the resistors 314 and 313, together with employing the double-diode 311, the rate of change of the grid voltage of tube 308 when the voltage is increased in response to a movement to the right in Fig. 8 of arm 303 may be made to differ from the rate of change of grid voltage when the voltage is decreased by an opposite movement of arm 303. This is because the voltage upon the grid of tube 308 depends upon the voltage across condenser 312 which in turn finally depends upon the position of arm 303. When the condenser 312 is charged, its rate of charging is governed by the value of resistor 313, and when it is discharged its rate of discharge is governed by the value of resistor 314. Accordingly indicator 310 may be made to show a gradual increase in manifold pressure in response to any one of the four controlling elements, and it may be made to show a less gradual drop in assumed manifold pressure in response to opposite changes in any one of the four controlling elements which position arm 303.

Also in Fig. 8 the potentiometer 315 is provided, having an arm 316 which may be initially adjusted so as to limit the highest voltage which may be placed upon the grid of tube 308, thereby controlling the most clockwise position of the needle 309 of indicator 310. The function of arm 373 and potentiometer 374, of relay 309*a*, switch 310*a*, cam 519, conductor 527, switch 526, resistor 529 and conductor 528 will be later explained. In the normal operation of the circuit shown in Fig. 8, switches 310*a* and 526 are closed.

It will therefore be appreciated that this invention discloses a manifold pressure indicator properly responsive to settings of the throttle lever, supercharger lever, changes in assumed altitude as well as to the instructor's control so that the manifold pressure indication is dependent upon these four controlling elements. The indication properly lags behind a change in any one of the four controlling factors—both when the factors change so as to result in an increase in assumed manifold pressure as well as when they change to produce a decrease in assumed manifold pressure. Also the lag between a change in one of the four factors and an indicated assumed decrease may be shorter than the lag between a change in one of the factors and the resultant increased indication. The effect of engine speed lever setting on assumed manifold pressure will be later disclosed in detail.

*Cylinder head and oil temperatures*

It will be appreciated by those skilled in the art of aviation that aircraft of the type being simulated are provided with an indicator upon the pilot's instrument panel which indicates to the pilot the instant cylinder head temperature and with an indicator that indicates to the pilot the instant engine oil temperature. Cylinder head temperature and oil temperature are dependent upon the combined factors of throttle and supercharger lever settings and mixture control lever setting. Means for providing simulated indications dependent upon the corresponding factors will now be disclosed.

Referring again to Fig. 6, it will be recalled that the gear 248 is always rotatably positioned from an initial point in accordance with the instant throttle lever and supercharger lever positions. It will be seen that the gear 317 is affixed upon the shaft 301, which, it will be recalled is rotatably mounted in the frame of the unit. Gear 317 is arranged to be driven by gear 248, and affixed upon shaft 301 is the gear 318. Gear 318 in turn drives gear 319 which is affixed upon the frame 320 of the differential designated generally 321. The output of differential 321 positions the rotor 331 of the cylinder head and oil temperatures potentiometer 332.

Referring now to Fig. 5, the mixture control lever 323 is pivotally mounted upon the fixed rod 213 and each side of this lever is gripped by the adjacent friction discs 214. Pivotally attached to the lower end of lever 323 is the rear end of link 324, the forward end of which, as seen in Fig. 6, is pivotally attached to the upper end of arm 325, the lower end of this arm being affixed to the bevel gear 326. Bevel gear 326 and arm 325 are freely mounted upon shaft 233, a stop 327 being provided upon shaft 233 to position the lower end of arm 325 and gear 326. Gear 326 meshes with the bevel gear 328 which is affixed upon the rear end of the rotatably mounted shaft 329. A plurality of cams 330 are affixed upon shaft 329 to be rotated thereby, for a purpose to be later described, and the forward end of shaft 329 passes through the center of gear 319 which is freely mounted thereupon, shaft 329 forming the primary input of the cylinder head temperature and oil temperature differential 321.

It will be recalled that whenever the throttle lever or supercharger lever is advanced, the gear 248 is rotated counterclockwise as seen from the rear, and so gears 317 and 318 will be rotated in the opposite direction, resulting in a counterclockwise rotation of the gear 319 which forms the secondary input of differential 321 and in a counterclockwise rotation of the rotor 331 of potentiometer 332. Referring back to Fig. 5, whenever the mixture lever 323 is moved to the rear to provide a more lean mixture, the link 324 moves ahead, and as seen in Fig. 6, the upper end of arm 325 moves in the same direction, resulting in a counterclockwise movement of gear 326, as seen from the left, and the gear 328 rotates clockwise as seen from the rear. Shaft 329 rotates in the same direction while the rotor 331 rotates counterclockwise.

Accordingly, an advancing of the throttle lever, an advancing of the supercharger lever, and a movement of the mixture lever into a more lean position all result in a counterclockwise rotation of the rotor 331 of potentiometer 332, and this direction of rotation may be used to establish higher assumed cylinder head and oil temperature indications because corresponding changes in a real plane result in increased cylinder head and oil temperatures.

It will be understood without a detailed explanation that a retarding of the throttle lever, a retarding of the supercharger lever, and a movement of the mixture lever 323 into a more rich position (ahead) all will cause a clockwise rotation of the rotor 331 of potentiometer 332. Such a rotation may be used to decrease the assumed indications.

Accordingly, the rotatable position of the rotor 331 may be taken as a measure of the instant assumed cylinder head and oil temperatures, and is dependent upon the instant settings of the throttle, supercharger and mixture levers.

Reference is now made to Fig. 9 where the electronic lag circuit governing the cylinder head temperature and oil temperature indications is shown. In Fig. 9 the cylinder head temperature indicator is designated generally 333 and comprises a dial 333*a* calibrated in degrees in a manner corresponding to the cylinder head temperature gauge of a real plane. A needle 333*b* is mounted for movement over the dial 333*a*.

These indicators are also shown in Fig. 8A. The indicator 333 is in the plate circuit of the tube 335 and a shunt 336 is placed across this indicator. The oil temperature gauge is designated generally 337 and comprises a dial 338 graduated in terms of degrees in a manner corresponding to the graduations of the real temperature gauge of an actual aircraft. A needle 339 is mounted for movement over dial 338, and a shunt 340 is placed across this indicator. Both of these indicators are in reality voltmeters. A pair of switches 341 and 342 controlled respectively by relays 341a and 342a in the plate circuit are provided for a purpose to be later described. The potentiometer 332 which is responsive to the throttle, supercharger and mixture lever settings is shown in Fig. 9 as is the rotor 331 of this potentiometer. The system is initially adjusted as in the case of the circuit shown in Fig. 8, but the instructor's control potentiometer 343 may be used not only to establish the maximum voltage which may be applied to the grid of tube 335, but it may be used by the instructor to affect the indications of the two instruments. The switch 334 under the control of relay 334a is provided, for a purpose to be later described, it being sufficient at this point to state that in operation, switch 334 is closed.

As the rotor 331 of the potentiometer 332 in Fig. 6 is rotated counterclockwise in response to a higher assumed cylinder head and oil temperatures, it moves to the right in Fig. 9 and a larger plate current passes through tube 335, resulting in a clockwise rotation of the indicating needles 333b and 339, thus indicating to the student higher assumed cylinder head and oil temperatures. On the other hand, when the rotor 331 moves clockwise in response to a lower assumed cylinder head and oil temperature condition, the rotor 331 moves to the left in Fig. 9 and the plate current of tube 335 drops, causing the indicating needles 333b and 339 to move counterclockwise over their respective dials, thus indicating to the student lower assumed cylinder head and oil temperature readings. A pair of resistors 344 and 345 are provided in conjunction with the double-diode 346 in order to provide an appreciable lag between a movement of the potentiometer rotor 331 and the movements of the needles 333b and 339. Resistor 344 regulates the rate of clockwise movement of needle 334 while resistor 345 regulates the counterclockwise rate of movement of these needles. By employing different value resistors, the rate of movements of these needles in opposite directions may be made to vary.

The potentiometer 343 and rotor 343b are provided in Fig. 9 to limit the maximum plate current flow, and also so that the instructor may change the readings of the indicators 333 and 337.

Accordingly, this invention discloses means whereby a cylinder head temperature gauge and an oil temperature gauge is provided, and the indications of these gauges are dependent upon the combined factors of throttle lever position, supercharger lever position and mixture lever position, in the same manner that the cylinder head temperature and oil temperature of a real plane are dependent upon the setting of its three corresponding levers and also upon the setting of the instructor's control potentiometers 343b and 970a. Description of the latter control will be hereinafter made.

*Tachometer and oil pressure systems*

In the case of actual aircraft, an instrument is provided to indicate to the pilot the engine speed and the oil pressure. Planes equipped with constant speed propellers have an engine speed control lever which is set by the pilot to regulate the speed of the engine. Changes in throttle lever setting, in planes so equipped, do not affect the engine speed, except that when the engine speed lever is set for a given speed, if the throttle lever is retarded too far and manifold pressure drops below the required amount to maintain the speed of the engine at the speed for which the engine speed lever is set, the engine speed will fall off with a retarding of the throttle lever. In such planes, oil pressure increases with engine speed. Means for simulating the tachometer and oil pressure indications in such planes will now be explained.

Referring now to Fig. 5, it will be seen that the engine speed control lever is designated 350 and that this lever has rotatably mounted therein the shaft 351 integral with which is the pinion gear 352, and the knurled knob 353 is mounted upon the outer end of shaft 351. Pinion 352 engages the gear sector 354 which is suitably fixed within fuselage 22. Lever 350 is pivotally mounted upon the fixed rod 213 and is grasped by the adjacent friction discs 214. Pivotally attached to the lower end of lever 350 is the sleeve 355 which encircles the link 356, a stop 357a being provided upon the rear end of link 356. A spring 358 encircles link 356 ahead of sleeve 355, and a stop 359 is placed upon the forward end of link 356 to engage the forward end of spring 358.

Referring to Fig. 6, it will be seen that the forward end of link 356 is pivotally attached to the upper end of arm 357, the lower end of which is freely mounted upon the shaft 223 and affixed to the gear 358. Gear 358 is freely mounted upon shaft 223, and has integral therewith the bevel gear 360 which is arranged to drive the gear 361 affixed upon the rear end of the shaft 359, this shaft being rotatably mounted in the frame of the unit. Affixed upon and near the forward end of shaft 359 is the gear 362 which drives the gear 362a which in turn drives gear 362b. Gear 362b is affixed upon the shaft 365 which forms the rotor of the variac 366.

Also affixed upon the forward end of shaft 359 is the gear 363 which drives the gear 364 affixed upon the rotatable housing 255 of the Selsyn transmitter 254.

Meshing with gear 358 is the gear 367 which is affixed upon the right end of shaft 368, this shaft forming the rotor of the tachometer potentiometer 369 and of the oil pressure potentiometer 370. Affixed upon the left end of the rotor shaft 368 is the gear 371 which drives gear 372 affixed upon the right end of the rotor 373 of the engine-speed-effect-on-manifold-pressure potentiometer 374.

A bevel gear 375 is pinned upon the shaft 223 to rotate the same, gear 375 being driven by the gear 361, and affixed upon the left end of shaft 223 is the arm 376 which operates the micro-switch 377 which is suitably affixed upon the frame of the unit.

Also affixed upon shaft 223 to be driven thereby is the hub 378 carrying the arm 379 which is adapted to engage the ear 380 affixed upon the left side of gear 222.

Referring now to Fig. 5, and disregarding the position of the throttle lever 215, when the engine speed lever 350 is pushed ahead—either by grasping of the upper end of lever 350 which is generally done when it is desired to move the lever a substantial distance, or by a rotation of the knurled knob 353 to obtain a fine adjustment—in order to decrease assumed engine speed, the link 356 will be moved to the rear. Referring to Fig. 6, when link 356 moves to the rear, the upper end of arm 357 moves in the same direction and gears 358 and 360 are rotated clockwise as seen from the left, resulting in a counterclockwise rotation, as seen from the rear, of gear 361, shaft 359 and gear 362. The counterclockwise rotation of gear 362 results in a counterclockwise rotation of the gear 362*b*, through the medium of gear 362*a*, and the rotor 365 of the variac 366 will also be rotated counterclockwise.

At the same time the clockwise rotation of gear 358 results in a counterclockwise rotation of the gear 367 and rotor 368, as seen from the left. The counterclockwise rotation of gear 371 affixed upon the left end of shaft 368 results in a clockwise rotation of the gear 372 and of the rotor 373 of the engine-speed-effect-on-manifold-pressure potentiometer 374. Also the counterclockwise rotation of gear 361 results in a counterclockwise rotation of gear 375 and the arm 376 carried by shaft 223 will move away from the micro-switch 377, resulting in an opening of switch 377 if the engine speed lever 350 is moved ahead of a predetermined position to produce a sufficiently low engine speed. The counterclockwise rotation of gear 375 also results in a similar rotation of shaft 223 and the hub 378 and arm 379 are rotated counterclockwise away from the ear 380 carried by gear 222.

On the other hand should the engine speed control lever 350 be moved toward the rear—in the higher speed direction—it will be appreciated that all of the just described parts move in the opposite directions.

Assuming now that the engine speed control lever 350 is positioned to the rear in the high speed position and that the throttle control lever 215 is positioned ahead in an advanced position, if the throttle control lever 215 is then moved to the rear, to simulate the retarding of the throttle of a plane in actual flight, in Fig. 6 the upper end of arm 219 moves ahead and the gears 220 and 222 are rotated counterclockwise as seen from the left. The ear 380 engages the arm 379 affixed upon hub 378 which in turn is affixed upon shaft 223, causing the arm 379, hub 378 and shaft 223 to be rotated counterclockwise as seen from the left. The counterclockwise rotation of shaft 223 results in a similar movement of arm 376 and the micro-switch 377 is opened if the rearward movement of the throttle lever 215 is sufficiently far. At the same time the counterclockwise rotation of shaft 223 results in a similar rotation of the gear 375, as seen from the left, as well as a counterclockwise rotation, as seen from the rear, of the gear 361 affixed upon the rear end of shaft 359. The gear 362 upon the fore end of shaft 326 is rotated counterclockwise, the idler gear 362*a* is rotated clockwise, and the gear 362*b* and rotor 365 of variac 366 are also rotated counterclockwise—the same direction in which they are rotated by a forward movement of the engine speed control lever 350 in the low speed direction. At the same time, the counterclockwise rotation of gear 361 results in a clockwise rotation of the gears 360 and 358, as seen from the left. Accordingly, gear 367 and rotor 368 are rotated counterclockwise as seen from the left—again in the same direction in which they are rotated when the engine speed control lever 350 is moved in the lower speed direction. Also, the clockwise rotation of gear 358 results in a movement toward the rear of the upper end of arm 357, and the link 356 also moves to the rear. Referring to Fig. 5, it will be seen that the rearward movement of link 356 will compress the spring 358, but the engine speed control lever 350 will not move because of the gripping action of the friction discs 214.

It has therefore been shown that the shaft 368 which forms the rotor of the tachometer potentiometer 369 and of the oil pressure potentiometer 370 is rotated clockwise as seen from the left in response to a rearward movement of the engine speed control lever 350; it is rotated counterclockwise by a forward movement of the engine speed control lever; and it is rotated counterclockwise by a rearward movement of the throttle control lever provided the engine speed lever is positioned sufficiently far to the rear.

Reference is now made to Fig. 10 which shows the electronic lag circuit regulating the reading of the tachometer indicator 381, also shown in Fig. 8A. This indicator comprises a dial 381*a* graduated in a manner corresponding to the graduations of the tachometer of a real plane, as well as a needle 381*b* mounted for movement over this dial. The tachometer potentiometer 369 and rotor 368 are shown in Fig. 10 as are the potentiometer 382 and rotor 382*a* which may be used to limit the maximum plate current as well as to provide the instructor with a control to affect the reading of instrument 381. Also in Fig. 10 are shown the switch 383 and relay 383*a*, the purpose of which will be later described, it being sufficient at this point to state that during operation switch 383 is closed. The rest of the circuit is so similar to the circuit shown in Fig. 8 that its operation need not be described. It is believed sufficient to point out that as the shaft 368 in Fig. 6 is rotated clockwise as seen from the left, the rotor 368 moves to the right along the potentiometer 369 in Fig. 10, allowing a greater plate current to flow through the tube 384 and resulting in a clockwise movement of needle 381*b*, thereby indicating a higher assumed engine speed.

On the other hand, whenever the rotor 368 is rotated counterclockwise as seen from the left in Fig. 6, the rotor 368 is moved to the left in Fig. 10, resulting in a decrease in the plate current of tube 384 and so the needle 381*b* is moved counterclockwise, thereby indicating to the student a lower assumed engine speed. It will be noted therefore that the engine speed as indicated by the instrument 381 is dependent primarily upon the setting of the engine speed control lever 350—the farther to the rear this lever is placed the more clockwise is positioned the needle 381*b* thus indicating to the student a higher assumed engine speed. However, if the engine speed control lever 350 is positioned to the rear of a certain point and the throttle control lever 215 is then retarded, the ear 380 in Fig. 6 picks up the arm 379 rotating it counterclockwise, and resulting in a lower indicated assumed engine speed. This arrangement simulates the corresponding response in a real aircraft where, as outlined above, the retarding of the throttle lever in a plane equipped with a constant speed propeller will reduce the engine speed of the plane if the engine speed control lever is set to produce a higher engine speed than the fuel introduced into the engine as a result of the throttle lever setting can produce.

In the case of a plane equipped with a constant speed propeller, the engine speed has a limited effect upon the manifold pressure—in the case being considered, the higher the engine speed the lower becomes the manifold pressure. In Fig. 6 it has been shown that as the assumed engine speed increases, the rotor 373 of the potentiometer 374 is rotated counterclockwise as seen from the left, and that as engine speed decreases, this rotor is moved in the opposite direction. Referring to Fig. 8, the potentiometer 374 and rotor 373 are shown. It will be appreciated that when the rotor 373 is rotated counterclockwise, in Fig. 8 rotor 373 moves to the right, making the grid of tube 308 more negative, and resulting in a decreased assumed manifold pressure indication. On the other hand, as assumed engine speed decreases, rotor 373 moves to the left in Fig. 8, resulting in a less negative voltage upon the grid of tube 308, and a higher assumed manifold pressure indication results.

Figure 11:
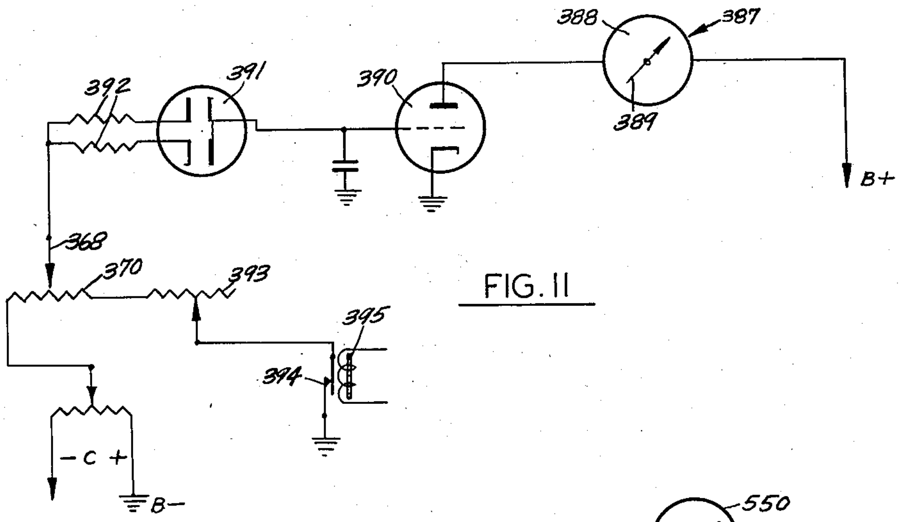
Fig. 11 shows the oil pressure gauge regulating circuit.

Insofar as oil pressure is concerned, it has been stated the higher the engine speed the higher becomes the oil pressure. In Fig. 6 it has been explained that shaft 368 is rotated clockwise as seen from the left in response to a higher assumed engine speed, and counterclockwise in response to a lower assumed engine speed. Reference is now made to Fig. 11 which shows the electronic lag system for actuating the oil pressure indicator 387. The oil pressure indicator 387 includes also a needle 389 arranged to move over the dial 388 which is calibrated in a manner corresponding to the oil pressure gauge of an actual aircraft. The potentiometer 370 as well a its rotor 368 is shown in Fig. 11 together with the tubes 390 and 391 as well as the resistors 392. This circuit, being highly similar to the previously described circuit shown in Fig. 8, need not be described in detail. It is sufficient to know that as the rotor 373 of potentiometer 374 in Fig. 6 is moved clockwise, the rotor 368 in Fig. 11 is moved to the right, increasing the plate current of tube 390 and causing the needle 389 to move clockwise, thus indicating to the student a higher assumed oil pressure. Rotation of the rotor 373 in the opposite direction will, of course, produce the oppostie result. This circuit also includes the instructor control potentiometer 393 which may be used to establish the maximum plate current, as well as to give the instructor control over the reading of the gauge 387, as will be later more fully described. Also, the circuit includes the switch 394 under the control of the relay 395. It is sufficient at this point to state that switch 394 is normally closed.

Accordingly, as the assumed engine speed increases, the indication given by the oil pressure gauge 387 increases, and a lower assumed engine speed will result in a lower indicated assumed oil pressure.

It will be later shown that the variac 366 is used to control a loud speaker to produce a noise varying with different assumed engine speeds, to simulate the sound of an engine running at various speeds, and it will also be shown that the micro-switch 377 is employed to change the engine speed noise according to the assumed engine speed. It should be borne in mind that when the engine speed control lever 350 is positioned ahead of a predetermined point, the micros-switch 377 is opened—otherwise it is closed.

*Fuel pressure*

Aircraft of the type being simulated are provided with a gauge which indicates to the pilot at all times the instant fuel pressure. When the engine is not running the engine fuel pump is idle and normally the fuel pressure gauge indicates a fuel pressure of zero pounds. However, before the engine is started it is necessary that fuel pressure be present and accordingly there is provided an emergency fuel pump switch which may be placed in the "on" position in order to provide the normal fuel pressure to the engine for starting. After the take-off, the emergency fuel switch is placed in the "off" position, because the engine fuel pump will then maintain the requisite fuel pressure. In the flight of the plane as the plane increases its altitude with the emergency fuel pump switch in the "off" position, the fuel pressure falls off slightly. By turning "on" the emergency fuel pump switch the pilot may bring the fuel pressure up to normal. By the automatic controls on the emergency fuel pump, the fuel pressure is held constant during flight at higher altitudes.

This invention also provides means for simulating the previously described functioning of the fuel pressure gauge of a real aircraft.

Figure 12:
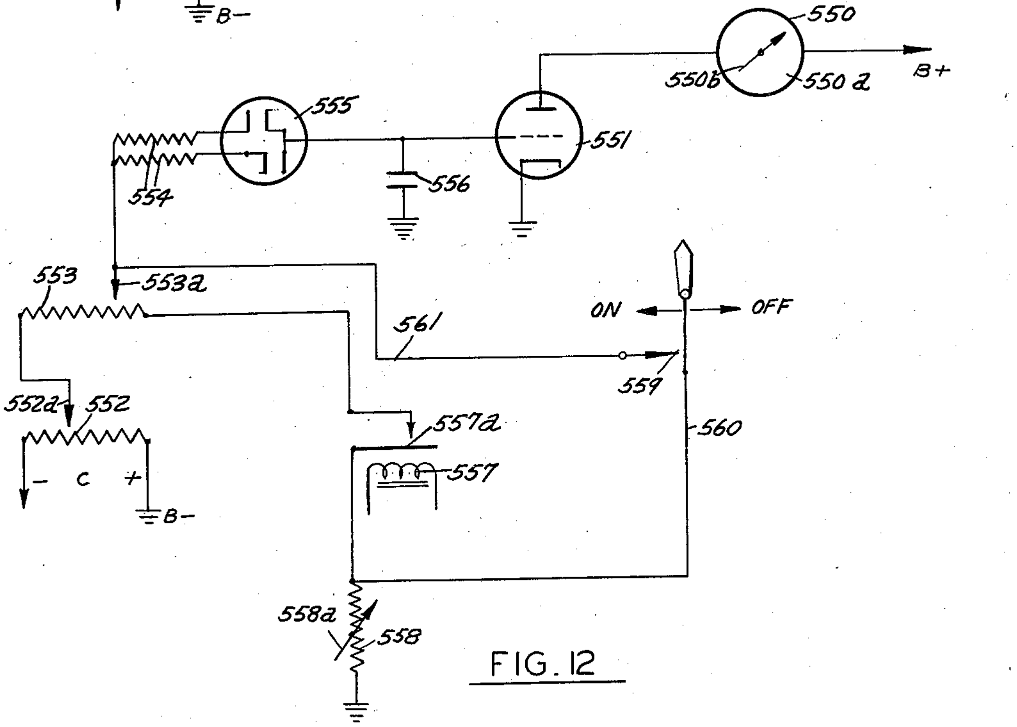
Fig. 12 shows the fuel pressure gauge regulatin circuit.

Reference is now made to Fig. 12 which shows the fuel pressure gauge 550 and the electrical circuit which operates the same. Gauge 550 comprises a dial **550*a* graduated in a manner corresponding to the graduations upon the corresponding real aircraft instrument, as well as a needle 550*b* arranged to move over the dial to indicate to the student the instant assumed fuel pressure. The gauge 550 is in reality a voltmeter and its reading is dependent upon the plate current of the tube 551. The potentiometer 552 and rotor 552*a* are provided, as are the altitude potentiometer 553, rotor 553*a* which is responsive to assumed altitude as will later appear, resistors 554, double-diode 555 and condenser 556. Potentiometer 558 and the instructor controlled rotor 558*a* are also shown. All of these elements form a circuit much like the circuit shown in Fig. 8, and it is therefore believed that a detailed description of the same is unnecessary. The switch 557*a* under the control of relay 557 is connected to the potentiometers 553 and 558 as shown. The emergency fuel pump switch 559 is connected to the upper end of potentiometer 558 through the conductor 560, and to the rotor 553*a* through the conductor 561**.

In the initial adjustment of the circuit shown in Fig. 12, the switches **557*a* and 559 are opened. The rotor 553*a* is placed at the right end of the altitude potentiometer 553 and the rotor 552*a* is positioned along potentiometer 552 until the fuel pressure gauge 550 indicates an assumed fuel pressure of zero. Then with either the switch 557*a* or the switch 559 closed, the rotor 558*a* is adjusted so that the needle 550*b* indicates an assumed fuel pressure of predetermined amount, as 17 pounds. Rotor 558*a* is adjusted so that it cannot be moved to give an indication of greater than 17 pounds, but it is free to be moved to cut down the indication of gauge 550**.

Figures 13, 13A:
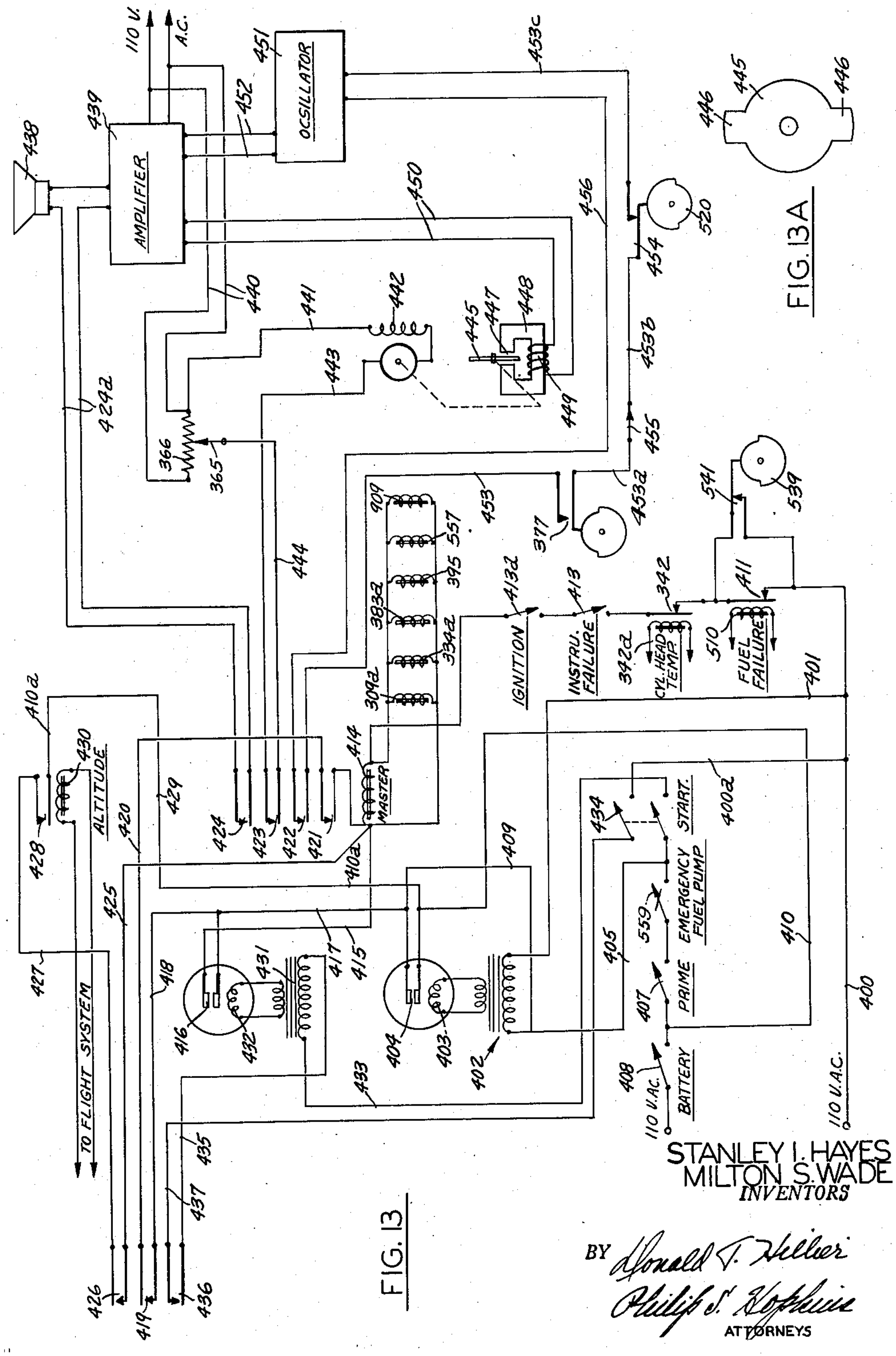
Fig. 13 shows the engine starting circuit.
Fig. 13A is a detail of part of the mechanism shown in Fig. 13.

When the student enters the fuselage 22 in order to start a "flight" in the trainer, the potentiometer arm **553*a* in Fig. 12 will be at the right end of potentiometer 553 and the gauge 550 will indicate a fuel pressure of zero. Relay 557 which is in parallel with the master relay 414, as shown in Fig. 13, will be de-energized and switch 557*a* will be open, and switch 559 will also be open. The instructor's control 558*a* should be set so that when either of the switches 557*a* or 559** is closed, the gauge 550 will indicate an assumed fuel pressure of 17 pounds.

Before starting the "engine" of the trainer, the student places the emergency fuel switch 559 in the "on" position and the gauge 550 will indicate an assumed fuel pressure of 17 pounds. The emergency fuel switch 559 is left in the "on" position until the "engine" of the trainer has been started, as will now be explained.

*Starting system*

Means will now be disclosed whereby the student, having obtained the required fuel pressure, may go through the same operations in order to get the "engine" of the trainer started that he would have to go through were he starting the engine of an aircraft of the type being simulated.

In Fig. 13 it will be seen that the common side of the 110 volt A. C. line is designated 400 and that this line connects through the conductor 401 with the right side of the primary of the transformer 402, and that in series with the secondary of this transformer is the heating coil 403 adjacent the amperite contacts 404. The other side of the primary of transformer 402 is connected through the conductor 405, the emergency fuel pump switch 559, the prime switch 407, and the battery switch 408 with the other side of the 110 volt line. The left side of the primary of transformer 402 is also connected to the upper amperite contact 404 through the conductor 409, and the lower amperite contact 404 is connected through the conductor 410 and battery switch 408 with the upper side of the 110 volt line. The common side 400 of the 110 volt line is connected through the fuel cutoff switch 411, the cylinder head temperature cutoff switch 342, the instructor's engine failure switch 413, and the ignition switch 413*a* with the right side of the master relay 414. The left side of the master relay 414 is connected through the conductor 415 with the upper contact of the prime-run amperite contacts 416. The lower amperite contact 416 is connected through the conductor 417 with the upper amperite contact 404, and is also connected through the conductor 418, switch 419, the conductor 420 and the switch 421 with the left side of the master relay 414. It will be seen that the electronic lag relays 309*a*, 334*a*, 383*a*, 395 and 557 are in parallel with the master relay 414 and that the contacts 421, 422, 423 and 424 are controlled by the master relay 414.

The left side of the master relay 414 is also connected through the conductor 425, switch 426, conductor 427, switch 428 and conductor 429 with the lower amperite contact 404. Switch 428 is under the control of the altitude relay 430 and the purpose of this switch will be later described. The prime-run transformer is designated 431, the secondary of this transformer has in series therewith the heater coil 432 which is placed adjacent the amperite contacts 416, and the primary of this transformer is connected through conductor 433 with the lower contact of the double-pole starting switch 434. The right side of the prime run transformer is connected through conductor 435, switch 436 and the conductor 437 with the upper contact of the starting switch 434.

It will be seen that the switch 424 of the master relay 414 connects the conventional loudspeaker 438 with the amplifier 439 through conductors 424*a*; and that 110 volts A. C. is introduced into the amplifier 439. Also the 110 volt source is connected through the conductors 440 across the variac 366, also shown in Fig. 6. One side of variac 366 is connected through the conductor 441 with the series wound motor 442, the other side of this motor being connected through the conductor 443, switch 423 and conductor 444 with the rotor 365 of variac 366. Affixed upon the output shaft of the rotor of motor 442 is the chopper disc 445. This disc, a detail of which is shown in Fig. 13A, is made of metal and includes two projections 446 which, when, rotated by motor 442, pass through the slot 447 in the electromagnet 448 to change the inductance of the coil 449. This coil being connected through the conductors 450 with the amplifier 439. A reaction oscillator 451 is connected to the amplifier 439 through the conductors 452, and one side of this oscillator is connected through the conductor 453*c*, through the switch 454, conductor 453*b*, the instructor switch 455, conductor 453*a*, and the switch 377, shown in Fig. 6 to be under the control of the engine speed lever 359, with the switch 422. The other side of switch 422 in turn is connected through the conductor 456 with the other side of oscillator 451. A cam 520 operates the switch 454, which is normally closed.

Bearing in mind the circuit diagram shown in Fig. 13, when the student enters the fuselage 22 and desires to start the "engine" of the trainer, the mixture control lever 323 is placed in the idle cutoff position—that is to the rear in Fig. 5. In Fig. 6 the cams 330 are rotated so as to close the switch 436 and to open the switches 419 and 426. The student also closes the battery switch 408 and the emergency fuel pump switch 559. The instructor, of course, closes his switch 413. The cylinder head temperature cutoff switch 342 and the fuel cutoff switch 411 will be closed, as is normally the case. The switches having thus been positioned, the student then closes for 3 to 5 seconds the spring-biased prime switch 407, and 110 volts will appear across the primary of transformer 402, heating the coil 403. The transfer of heat from coil 403 to the amperite contacts 404 results in a closing of these contacts within the three to five second interval.

The student then releases the spring biased prime switch 407 and the conductor 405 becomes dead. However the closing of the amperite contacts 404 continues to impress 110 volts across the primary of transformer 402 to continue heating the coil 403 through the conductors 400 and 401 connected with the right side of the primary of transformer 402, and through the conductor 410, amperite contacts 404, and conductor 409 connected with the left side of the primary. Accordingly, the contacts 404 remain closed. The student then closes the ignition switch 413*a*, connecting the common side of the 110 v. line to the right side of the master relay 414. The student then presses the spring biased starting switch 434 and 110 volts is impressed across the primary of the prime-run transformer 431 through the battery switch 408, conductor 410, amperite contacts 404, conductor 409, conductor 405, the lower contact of starting switch 434, and the conductor 433 which connects with the left side of the prime run transformer 431, and through the conductor 400, conductor 400*a*, the upper contact of switch 434, conductor 437, the switch 436 and the conductor 435 which connects with the right side of the primary of transformer 431. The starting switch is held closed for a period of from 1 to 2 seconds resulting in a heating of the coil 432 and of the upper amperite contacts 416. Accordingly, within this interval the contacts 416 are closed and upon this closing the left side of the master relay 414 is connected to one side of the 110 volt line through the conductor 415, contacts 416, conductor 417, the closed contacts 404, and the conductor 410, battery switch 408 remaining closed. The other side of master relay 414 is connected to the other side of the 110 volt line through the conductor 400 and switches 411, 342, 413 and 413*a*. The master relay 414 is consequently energized, as are the electronic lag circuit relays 309*a*, 334*a*, 383*a*, 395 and 557, and accordingly the switch 310*a*, in Fig. 8, switch 334 in Fig. 9, switch 383 in Fig. 10, switch 394 in Fig. 11 and switch 557 in Fig. 12 are closed, so that the manifold pressure gauge, cylinder head and oil temperature gauges, tachometer oil pressure gauge and fuel pressure gauge are actuated to indicate the assumed engine conditions dependent upon the previously described factors. The emergency fuel pump switch 559 may at any time after the engine is started be placed in the "off" position, and the gauge will continue to indicate the normal fuel pressure.

Also the energization of the master relay 414 closes the contacts 421, 422, 423 and 424, and referring to Fig. 13, it will be seen that the closing of contact 424 connects the speaker 438 with the amplifier 439. As the contacts 424 close, the completing of the circuit from the amplifier 439 to the coil within the speaker 438 causes a momentary arcing between these contacts. This causes a sharp report to be emitted from the speaker which properly simulates the explosion of a cartridge type starter found on actual airplanes. In Fig. 13, 110 volts is impressed at all times across variac 366 and the rotor 365 of this variac is positioned in accordance with the instant assumed engine speed. Accordingly, the closing of contact 423 by the energization of the master relay 414 will result in the impression of a voltage across the motor 442 dependent upon the assumed engine speed as indicated by the tachometer in Fig. 10. The motor will therefore run at a proportional rate, changing the inductance of coil 449 and this voltage is fed into the amplifier to create an output fed into the speaker 438 of a frequency dependent upon the assumed engine speed. The student will hear the speaker 438 which is positioned within the fuselage 22 and he will know that the "engine" has started to run.

As will later appear, the switch 454 is normally closed, and if the switch 377, also shown in Fig. 6, which is under the control of the engine speed lever 350 is open, as when the engine speed lever or throttle lever is positioned to give a tachometer indication of less than a predetermined amount, as 1000 R. P. M., the oscillator 451 is energized and feeds a beat into the amplifier 439 which is impressed upon the beat caused by the chopper wheel 445. Accordingly, an irregular noise will be heard from the speaker 438, simulating the running of an engine at a speed of less than 1000 R. P. M. On the other hand, if the engine speed control lever 350 is positioned ahead of the 1000 R. P. M. position, and the throttle control lever 215 is sufficiently far ahead, switch 377 will be closed and oscillator 451 will not feed any signal into amplifier 439. Accordingly, a noise simulating the smooth running of an engine will emanate from speaker 438.

After the student hears the speaker 438, thereby knowing that the "engine" has been started, the spring-biased starting switch 434 is released and thereby opened. The voltage across the prime-run transformer 431 disappears and the amperite contact 416 will begin to cool. If nothing further is done by the student, these contacts will open within a period of about five seconds, master relay 414 will become de-energized, and the contacts 421, 422, 423 and 444 will open, resulting in a stopping of the simulated engine noise from speaker 438. Also, the relays 309*a*, 334*a*, 383*a*, 395 and 557 will become de-energized, and the engine instruments will return to a zero indication. The student will know the "engine" has stopped. The starting process will thereupon have to be recommenced.

If, on the other hand, the student properly moves the mixture control lever 323 ahead to provide a richer mixture, the contact 436 in Fig. 13 will open and at the same time the contacts 419 and 426 will close. These three contacts are shown in Fig. 6. If these two contacts are properly closed before the amperite contacts 416 open, the right side of the master relay 414 will be connected to the conductor 400 as previously explained, and the left side of master relay 414 will be connected to the other side of the 110 volt line through the contact 421, conductor 420, switch 419, conductors 418 and 417, amperite contacts 404, conductor 410 and the battery switch 408. Accordingly, the relay 414 and the instrument control relays in parallel therewith will remain energized indefinitely, and the "engine" will continue to run.

*Fuel consumption*

It will be appreciated by those skilled in the art that aircraft of the type being simulated are provided with a plurality of gasoline tanks and that a gauge is associated with each tank to indicate to the pilot the amount of gasoline in the tank. A selector valve is provided so that the pilot may select the tank from which the engine will be supplied. The rate of consumption of gasoline depends upon the power output, which in turn depends upon the manifold pressure and engine speed, and after exhaustion of the gasoline in one tank, the pilot must select another tank in order to prevent an engine failure.

This invention provides apparatus whereby the operation of the gasoline gauges in a real plane may be simulated, and whereby the "engine" of the trainer will fail unless proper selection of the "tanks" is made.

Referring now to Fig. 6 it will be seen that a constant speed motor 461 is provided to drive the gear 462 at all times when the master relay 414 is energized to close the switch 461*a*. Gear 462 in turn drives gear 463 which is affixed upon the left end of the splined shaft 464. A cylinder 465 having an interior spline complementary with the spline of shaft 464 is mounted upon shaft 464 to rotate therewith, and placed upon cylinder 465 is the circular cam 466. The position of cylinder 465 and cam 466 along the spline 464, which may be suitably rotatably held by a frame member, is determined by the two arms 467, the lower ends of which are affixed to the rack 468 in turn driven by the gear 469 which is rotatably mounted upon the shaft 359. Pinned to gear 469 and also rotatably mounted upon shaft 359 is the gear 470 which is driven by the gear 253, the position of which is, with the exception of the assumed engine speed effect, at all times in accordance with the instant assumed manifold pressure. In the construction of that part of the apparatus presently being discussed, the position of gear 253 is taken as the measure of assumed manifold pressure.

Fixedly carried by the rack 477 are the insulating blocks 471 which in turn carry the spring contacts 472 and 473 which comprise the switch 474. Contact 473 in turn carries the roller 475 which at all times engages either the cylinder 465 or the cam 466, depending upon the rotational position of the cylinder and cam as well as the longitudinal position of the cylinder and cam along the splined shaft 464.

It will be appreciated that as assumed manifold pressure increases the gear 253 in Fig. 6 is rotated clockwise and the gears 470 and 469 are rotated counterclockwise, gear 469 moving the rack 468, brackets 467, cam 466 and cylinder 465 to the left, and as the cam and cylinder are rotated, the roller 475 causes intermittent contact between making and breaking of switch 474, the proportion of time during which such contact is made increasing as the cylinder and cam are moved to the left.

On the other hand should a decrease in assumed manifold pressure occur, gear 253 is rotated counterclockwise, the gears 469 and 470 are rotated clockwise, and through the rack 468 and brackets 467, the cam 466 and cylinder 465 are moved to the right, thus decreasing the proportion of time during which the switch 474 is closed. It will therefore be appreciated that the higher becomes the assumed manifold pressure, the higher is the proportion of time during which the switch 474 is closed.

Figure 6C:
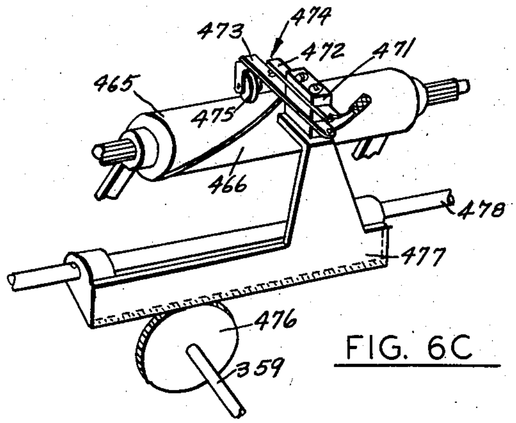

Reference is now made to Fig. 6C where the shaft 359 is shown, and affixed upon this shaft is the gear 476 which drives the rack 477 which is slidably mounted upon the fixed transverse rod 478. Rack 477 carries the insulating members 471 which in turn carry the switch members 472 and 473 of switch 474. As assumed engine speed increases, shaft 359 rotates clockwise, moving rack 477 and switch 474 to the right so that the switch remains closed a greater proportion of the time. On the other hand, as assumed engine speed decreases, shaft 359 and gear 426 rotate counterclockwise, moving rack 477 and switch 474 to the left, and the switch is closed a lesser proportion of the time.

Consequently, switch 474 and cam 466 are positioned relative to one another dependent upon the factors of instant assumed manifold pressure and instant assumed engine speed—which factors when combined produce instant assumed power. Therefore, switch 474 is closed for a proportion of time dependent upon instant assumed power—the higher this factor, the greater the proportion of time this switch is closed.

Figure 14:
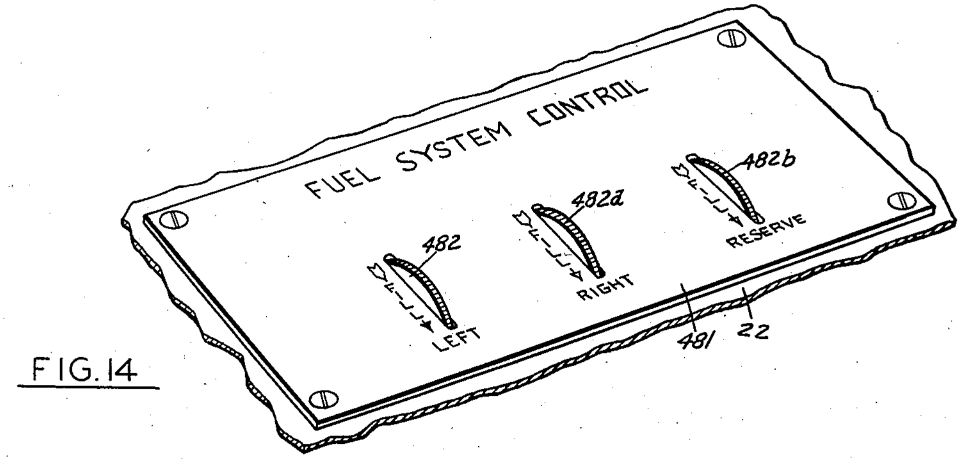

Reference is now made to Fig. 14 where the plate 481 is shown to be attached to a portion of fuselage 22, this plate being marked "Fuel system control" and having three knurled knobs 482, 482a and 482b projecting through the plate 481.

Figure 15:
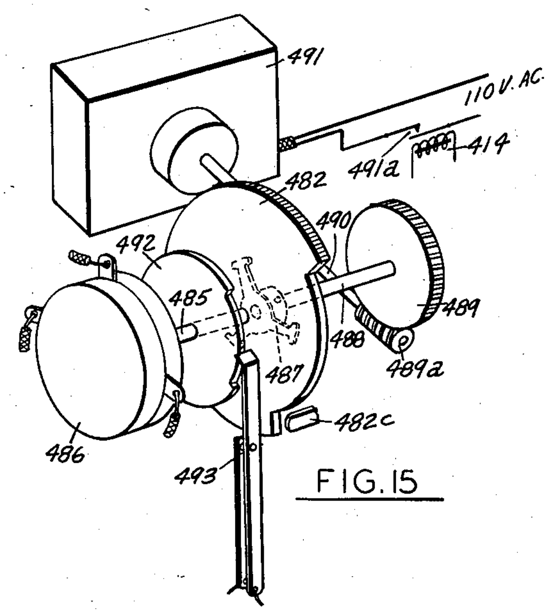

These knobs are labeled "Left," "Right," and "Reserve." In Fig. 15 the knurled knob 482 is shown to be fixed upon the shaft 485, this shaft being suitably rotatably mounted in a frame member and forming the rotor of the potentiometer 486. A spring clutch member 487 is shown to be affixed upon the left end of shaft 488, this clutch member being arranged to bear against the knurled knob 482, and upon the right end of shaft 488 is the worm gear 489 driven by the worm 489a which in turn is affixed upon the output shaft 490 of the telechron motor 491. This motor is controlled by the master relay 414, running whenever the master relay is energized and closing switch 491a. The cam 492 is affixed upon shaft 485 and is arranged to make or break the contacts 493, depending upon its rotational position.

A unit exactly like that shown in Fig. 15 is associated with the knurled knob 482a and another similar but slightly different unit, as will later appear, is associated with the knurled knob 482b.

Figure 16:
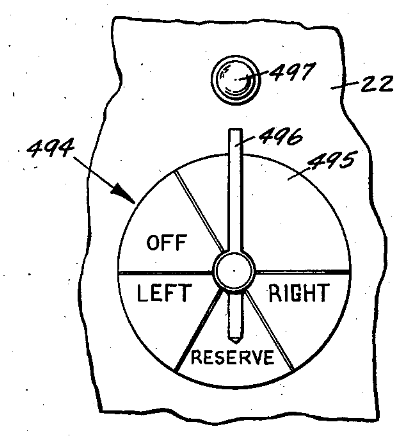

Referring to Fig. 16 it will be seen that the student's fuel tank selector switch designated generally by 494 comprises a plate 495 marked "Off," "Left," "Right" and "Reserve." The manually operable member 496 is provided, as is a neon light 497.

Figure 17:
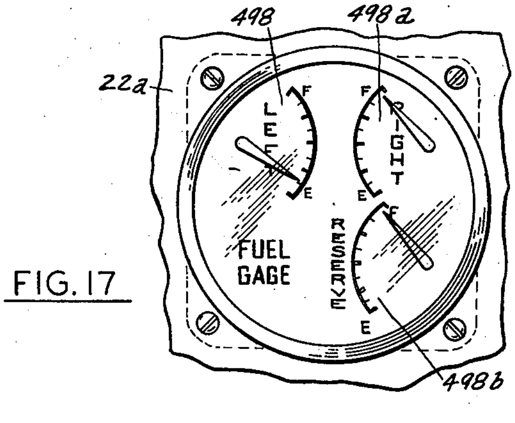

Referring now to Fig. 17, the fuel gauges are provided, being affixed upon the instrument panel 306, and comprising three gauges marked "Left," "Right," and "Reserve," and being numbered 498, 498a and 498b. These gauges may be of a conventional aircraft type, well known to those skilled in the art.

Figures 18, 19:
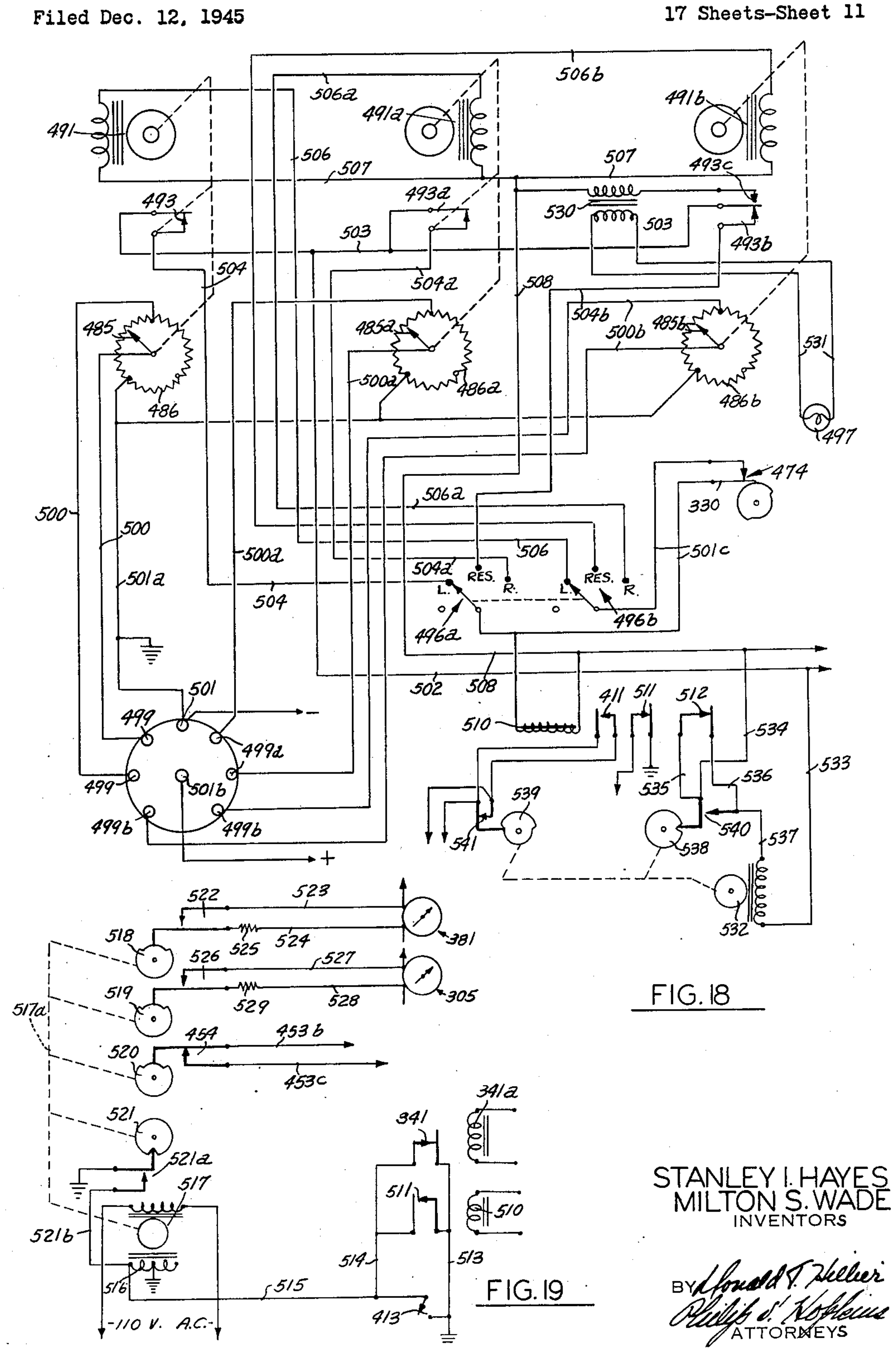
Fig. 18 shows the electrical diagram of the fuel consumption circuit.
Fig. 19 shows the impending engine failure mechanism.

Referring to Figs. 14–18 inclusive, before the problem is started, the instructor will rotate the fuel system controls 482, 482a and 482b in order to set the indicators 498, 498a and 498b as desired. In Fig. 15 it will be seen that when the control knob 482 is rotated clockwise, the cam 492 and the rotor 485 of potentiometer 486 will be similarly moved. Referring to Fig. 18 it will be seen that this rotor is connected by means of the right conductor 500 with the clockwise terminal 499 and that the potentiometer 486 is connected to the counterclockwise terminal 499 through the left conductor 500. Also, the potentiometer 486 is connected to the common terminal 501 through the conductor 501a, and a suitable D. C. potential is applied across the terminal 501 and the other common terminal 501b.

The terminals 499 are associated with the left tank indicator 498 in Fig. 17, and as the potentiometer rotor 485 moves clockwise, it applies a lesser voltage across the terminals 499, and the gauge 498 indicates an increasing amount of fuel in the left tank. The instructor can, of course, by knob 482, have indicator 498 show any desired amount. When knob 482 is rotated to engage the stop 482c, the rotor 485 in Fig. 18 engages the terminal of conductor left 500 and the needle of indicator 498 is in its most counterclockwise position, thus indicating that the left tank is assumed to be full. It will be noted that under these circumstances the switch 493 in Figs. 15 and 18 will be closed.

In Fig. 18 it will be seen that the tank selector switch 496 is a gang switch having two sections 496a and 496b, and that the rotor of each of these switches is connected to the other through the conductors 501c and the switch 474 which is governed by the cam 466 shown in Fig. 6, this switch being previously described as being open a proportion of the time depending upon instant assumed engine power output.

Assuming that the student has started the "engine," as previously described, that the instructor has "filled" the tanks, and that the student has placed the selector control 496 in the "Left" position in Fig. 16, the rotors of the switches 496a and 496b in Fig. 18 will be upon their respective contacts marked "L." Current will flow from the 110 volt line 502 along the conductor 503 through the switch 493 to conductor 504, through the left switch 496a along the conductor 501c, through switch 474, along the second conductor 501c, through the switch 496b along conductor 506 through motor 491, along conductor 507 and then along conductor 508 to the other side of the 110 volt source. At the same time the fuel failure relay 510 will be energized, closing the switch 411, also shown in Fig. 13, and opening the switches 511 and 512.

The telechron motor 491 in Figs. 15 and 18 will be energized, resulting in a counterclockwise rotation of the cam 482. Motor 491 will be intermittently energized for a proportion of time dependent upon the proportion of time that switch 474 is closed, this proportion being dependent upon the instant assumed engine power output. Cams 482 and 492 in Fig. 15 will be rotated counterclockwise at a rate dependent upon the assumed engine power output, and the rotor 485 will be similarly rotated. In Fig. 18 it will be seen that the rotation of rotor 485 will result in an ever increasing voltage being applied to the terminals 499, and the indicator 498 in Fig. 17 will indicate a progressive exhaustion of the left tank. When cam 482 is rotated counterclockwise sufficiently far to engage the stop 482c, the cam 492 will open the switch 493 shown in Figs. 15 and 18. When this point is reached, the indicator 498 in Fig. 17 will indicate that the left tank is empty because rotor 485 will engage the terminal of conductor 501a in Fig. 18. Upon the opening of switch 493 telechron motor 491 will stop, and the fuel failure relay 510 will become de-energized, resulting in an opening of switch 411 and a closing of switch 511.

Referring now to Fig. 19, the closing of switch 511 in response to a de-energization of the fuel failure relay 510 will result in a connection being established from ground through conductor 513, switch 511, conductors 514 and 515 and coil 516 of motor 517 to ground. The shorting out of coil 516 will result in a starting of motor 517 and the cams 518, 519, 520 and 521 upon the output shaft 517a of this motor will be rotated. As shown in Figs. 10 and 19, the circuit comprising switch 522, conductors 523 and 524 and resistor 525 is in parallel with the tachometer 381, and it will be appreciated that when the fuel failure relay 510 is de-energized, resulting in a closing of switch 511 and a rotation of motor 517 and cam 518, the intermittent breaking and making of the switch 522 will result in an oscillating deflection of the needle 381b of tachometer 381, thus indicating to the student impending engine failure.

Again referring to Figs. 8 and 19, it will be appreciated that the rotation of cam 519 will cause the switch 526 to intermittently make and break, and that by means of the circuit comprising switch 526, conductors 527 and 528 and resistor 529, the manifold pressure indicator 305 will also have its needle 309 oscillated, thus indicating to the student impending engine failure.

The resistors 529 and 525 are provided in order that the closing of the switches 526 and 522 will not result in a deflection of the manifold pressure needle 309 or tachometer needle 381b back to the zero position. By employment of these two resistors, the deflection may be limited to simulate the deflection of the corresponding needles of real aircraft under corresponding conditions.

Also referring now to Fig. 13 in conjunction with Fig. 19, it will be appreciated that the rotation of cam 520 will result in an intermittent making and breaking of the switch 454 which is connected in series with the reaction oscillator 451. This oscillator, it will be recalled, is used to generate a signal fed into the amplifier 439 and impressed upon the basic signal of the amplifier caused by the rotation of the chopper wheel 445 so as to aurally indicate a low engine speed. The intermittent making and breaking of switch 454 will feed a signal from oscillator 451 into amplifier 439, and thus indicate to the student impending engine failure.

The student having been warned of the impending engine failure as a result of the exhaustion of the left tank will ordinarily switch the selector control 496 to the right tank position in Fig. 16. The circuit diagram for the right tank is identical with the previously described circuit for the left tank, and the same numbers have been used to designate the corresponding elements of the two circuits, the suffix "a" being added to indicate an element of the right tank circuit. Assuming that the instructor has "filled" the right tank through a rotation of the knurled knob 482a in Fig. 14, it will be appreciated that the right tank indicator 498a in Fig. 17 will indicate full.

When the student places the selector 496 in the position to draw upon the right tank, the fuel failure relay 510 will become energized, as will later be explained in detail, and switch 411 will be closed while switch 511 will be opened. The opening of switch 511 would terminate the shorting of coil 516 of motor 517, in Fig. 19, except for the fact that the cam 521 closes switch 521a and shorts out the coil 516 through conductor 521b, until cam 521 reaches the position shown in Fig. 19, at which instant the switch 521a opens, coil 516 is no longer shorted, and motor 517 stops. Accordingly, all the cams in Fig. 19 stop, and the impending engine failure signals cease.

When the student places the selector 496 in the position to draw upon the right tank, the two selector arms of switches 496a and 496b shown in Fig. 18 will be on the "R" terminals. Accordingly current will flow from the conductor 502 connected to the 110 volt source along the conductor 503 through the switch 493a, along conductor 504a through the left switch 496a, along lower conductor 501c and through the switch 474—this switch being intermittently closed for a proportion of time depending upon the instant assumed engine power. Current then flows along the other conductor 501c to the terminal "R" of the switch 496b, and thence along conductor 506a through the motor 491a, to the right along conductor 507 and then down conductor 508 to the other side of the 110 volt source. Accordingly motor 491a will run at a rate dependent upon the assumed engine power, rotating the potentiometer arm 485a in Fig. 18 so as to increase the voltage across the terminals 499a, and causing the needle of indicator 498a to be rotated counterclockwise, thus indicating to the student a gradual exhaustion of the fuel supply in the right tank.

When the indicator 498a indicates "empty," the apparatus associated with the right fuel system and being like that shown in Fig. 15 will cause the fuel failure relay 510 to become de-energized, resulting in the warning signals previously described as being given by the manifold pressure gauge, tachometer and engine noise simulator when the fuel tank which is being used reaches the empty condition.

Having received the warning signal that the right tank is empty, and having previously exhausted the left tank, the student will place the selector 496 in position to draw upon the reserve tank.

Referring now to Fig. 18 which also shows the circuit diagram for the reserve fuel system, it will be noted that the same numbers have been employed to describe the elements of this system as were employed to describe the corresponding elements of the left and right fuel systems, the only distinction being that the suffix "b" has been added to distinguish the elements of the reserve system from the left and right tank systems.

Assuming that the instructor has "filled" the reserve tank, and the student having placed the selector 496 in the "reserve" position the fuel failure relay becomes energized, and the engine failure warning signals cease. In Fig. 18 it will be appreciated that current will flow from the 110 volt source along conductor 502, conductor 503 through switch 493b, along conductor 504b, to the terminal "Res." of switch 496a. Current flows along the lower conductor 501c through the switch 474—this switch being intermittently operated so that it is closed for a proportional amount of time depending upon the assumed engine power. After passing through this switch current flows along the upper conductor 501c to the terminal "Res." of the switch 496b, and thence along conductor 506b through the motor 491b and along conductors 507 and 508 to the other side of the 110 volt source. Accordingly, motor 491b will run at a rate dependent upon the assumed engine power which depends upon the combined factors of assumed manifold pressure and assumed engine speed, so that the arm 485b of potentiometer 486b causes the needle of the reserve tank indicator 498b in Fig. 17 to move counterclockwise, thus indicating to the student a gradual exhaustion of the gas supply in the reserve tank.

Figure 15A:
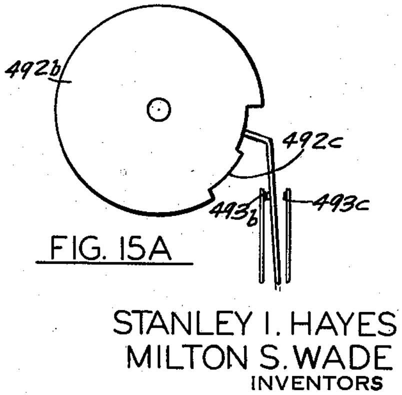

Reference is now made to Fig. 15A where the cam 492b of the reserve fuel system, corresponding to cam 492 in Fig. 15 of the left tank fuel system, is shown together with the switches 493b and 493c. Switch 493b corresponds to switch 493 in Fig. 15.

Cam 492b differs from cam 492 only in that it is provided with an additional step 492c. When the instructor has "filled" the reserve tank, the switch 493b is closed but the switch 493c is open, as shown in Fig. 15A. As the motor 491b runs to consume the reserve tank, the cam 492b is rotated counterclockwise and when the central common member of switches 493b and 493c engages the step 492c, the switch 493b remains closed and the switch 493c becomes closed. Accordingly, motor 491b will continue to run to exhaust the reserve tank, but the closing of switch 493c, as shown in Fig. 18, results in the impression of 110 volts A. C. across the primary of transformer 530. The secondary of this transformer is connected through the conductors 531 with the neon bulb 497, also shown in Fig. 16, and this bulb will become illuminated. The purpose of this arrangement is to signal to the student when the fuel in the reserve tank reaches a certain amount—for example, 40 gallons.

The motor 491b continues to run, moving the rotor 485b counterclockwise, and thus indicating to the student a steadily diminishing supply of gasoline. When the cam 492b has been rotated counterclockwise to the point where the movable member of switch 493b is raised upon the outside periphery of this cam, the switch 493b is opened, motor 491b stops, the fuel failure relay 510 becomes de-energized, opening the switch 411 and closing the switches 511 and 512.

Referring to Fig. 19, as previously explained the opening of switch 511 will result in an oscillating motion of the tachometer and manifold pressure indicating needles as well as producing from the loud speaker a noise simulating the firing of an engine receiving insufficient fuel.

Referring now to Fig. 18, the closing of switch 512 in response to the de-energization of relay 510, will result in the application of 110 volts across the motor 532 through the conductor 533 which connects with one side of the motor, and through the conductors 534 and 535, switch 512, and conductors 536 and 537 which connect with the other side of the main coil of this motor. Upon the output shaft of motor 532 are the two cams 538 and 539, shaped as shown, and the energization of motor 532 will result in a rotation of these cams, motor 532 rotating at the rate of one revolution per minute. As soon as cam 538 starts to rotate, the switch 540 is closed and will stay closed until this cam has made one complete revolution. The closing of switch 540 merely shorts the switch 512, and motor 532 continues to rotate. When cam 539 has rotated through one-half of a revolution, the switch 541 is opened, and inasmuch as this switch is in series with the master relay 414, referring to Fig. 13 it will be appreciated that the contacts 421, 422, 423 and 424 will be opened, resulting in a deadening of the loud speaker, and the relays 309a, 334a, 383a, 395 and 557a in Figs. 8, 9, 10, 11 and 12 will become de-energized opening the circuits to the manifold pressure indicator, cylinder head and oil temperature gauges, tachometer, oil pressure gauge and fuel pressure gauge. These responses simulate the failure of an engine in flight resulting from an exhaustion of the fuel supply.

Referring back to Fig. 18 and assuming that the relay 510 has become de-energized because of the emptying of the tank being used at the time, it will be appreciated that the closing of switch 511 causes the speaker, tachometer and manifold pressure gauge to indicate to the student that the engine is about to fail. At the same time the switch 512 will be closed, resulting in an energization of motor 532 and a rotation of cams 538 and 539 will commence. If nothing is done by the student, before cam 539 rotates through half a revolution, complete engine failure will result. Cam 539 is also shown in Fig. 13. However, if the student does select a tank having gas, the fuel failure relay 510 will become energized, closing the switch 411 and opening the switches 511 and 512. The closing of switch 411 will prevent a de-energization of the master relay, thus preventing complete engine failure, and the opening of switch 511 will restore the tachometer, manifold pressure indicator and loud speaker to their normal operating condition as soon as motor 517 rotates cam 521 into the position shown in Fig. 19, at which time motor 517 stops. However, the opening of switch 512 will not stop the motor 532 because the circuit is completed through the conductor 534, switch 540, conductor 537, main coil of motor 532 and conductor 533. Motor 532 will therefore continue to operate, rotating the cams 538 and 539 until they are returned to the point of beginning of rotation. When this point is reached, switch 540 is opened, and motor 532 stops.

*Flight system*

After the "engine" of the trainer has been started, as previously described, the student may make his take-off run in the usual manner, by checking to see that the "chocks" are removed and by increasing the assumed engine power output in the usual manner.

The engine instruments will properly reflect the changes responsive to the engine control lever settings, and the air speed indicator will show a gradual increase in assumed air speed. When the trainer obtains sufficient assumed air speed to become air borne, the vertical speed indicator and altimeter should begin to function, and it should be possible to pitch and bank the trainer. The following means accomplish the just mentioned functions in order to simulate actual aircraft performance.

In actual aircraft, the air speed indicator is provided to indicate to the pilot the air speed of the plane. Air speed depends upon the factors of engine power output and pitch attitude of the plane. Increased power and a diving of the plane produce a higher air speed, while decreased power and a climbing of the plane produce a lower air speed. The apparatus of this invention also provides an indicator simulating the air speed indicator of a real plane, together with means for actuating the indicator to indicate to the student an assumed air speed dependent upon the same factors as affect the indicated air speed of a plane in actual flight.

Reference is now made to Fig. 2 and Fig. 4 where there is disclosed the gear sector 581 affixed upon the stud 180 for movement with the stud whenever the fuselage 22 pitches, pivoting about the transverse axis 179, in simulation of the diving and climbing of a plane in actual flight. Gear sector 581 drives the gear 582 which is affixed upon the input shaft 583 of the Selsyn transmitter 584, this transmitter being fixedly held by the integral extension 585 of the main spindle 14. It will be appreciated that whenever the fuselage 22 is dived, the sector 581 is rotated counterclockwise, rotating gear 582 clockwise. On the other hand, whenever the fuselage is climbed, the gear 582 is rotated in the opposite direction. It will be appreciated that the rotational position of the rotor 583 of transmitter 584 relative to the housing of this transmitter will at all times be in accord with the instant pitching position of the fuselage 22. The pitch action transmitter 584 is connected by means of the cable 586 with the pitch action receiver designated generally by 587 in Fig. 20, the housing of which is 588 and the output shaft 590.

Selsyn-type transmitter 584 and Selsyn-type receiver 587 which are electrically connected by means of the cable 586 are of the type that whenever the rotor 583 of the transmitter moves through a certain number of degrees, the output shaft 590 of the receiver has a simultaneous angular movement of the same magnitude imparted thereto. The electrical connection may be made so that upon a rotation of the input shaft of the transmitter in one direction the output shaft of the receiver rotates in a selected direction, while reversal of direction of the rotation of the input shaft results in a reversal of direction of the movement of the output shaft. Inasmuch as the output shaft of the receiver is always positioned relative to its housing in accordance with the instant position of the rotor of the transmitter relative to its housing, it will be appreciated that if the input shaft and housing of the transmitter remain stationary, a rotation of the housing of the receiver will also produce a movement of the output shaft of the receiver in the same direction and through the same angle as the direction of rotation of the housing of the receiver. On the other hand, if the housing of the transmitter is rotated in a given direction, the output shaft of the receiver is rotated through a similar angle but in a direction opposite the direction of movement that it would rotate if the input shaft of the transmitter were rotated in the same direction as the housing.

All Selsyn-type transmitters disclosed hereinafter are governed by the same rules.

Figure 20:
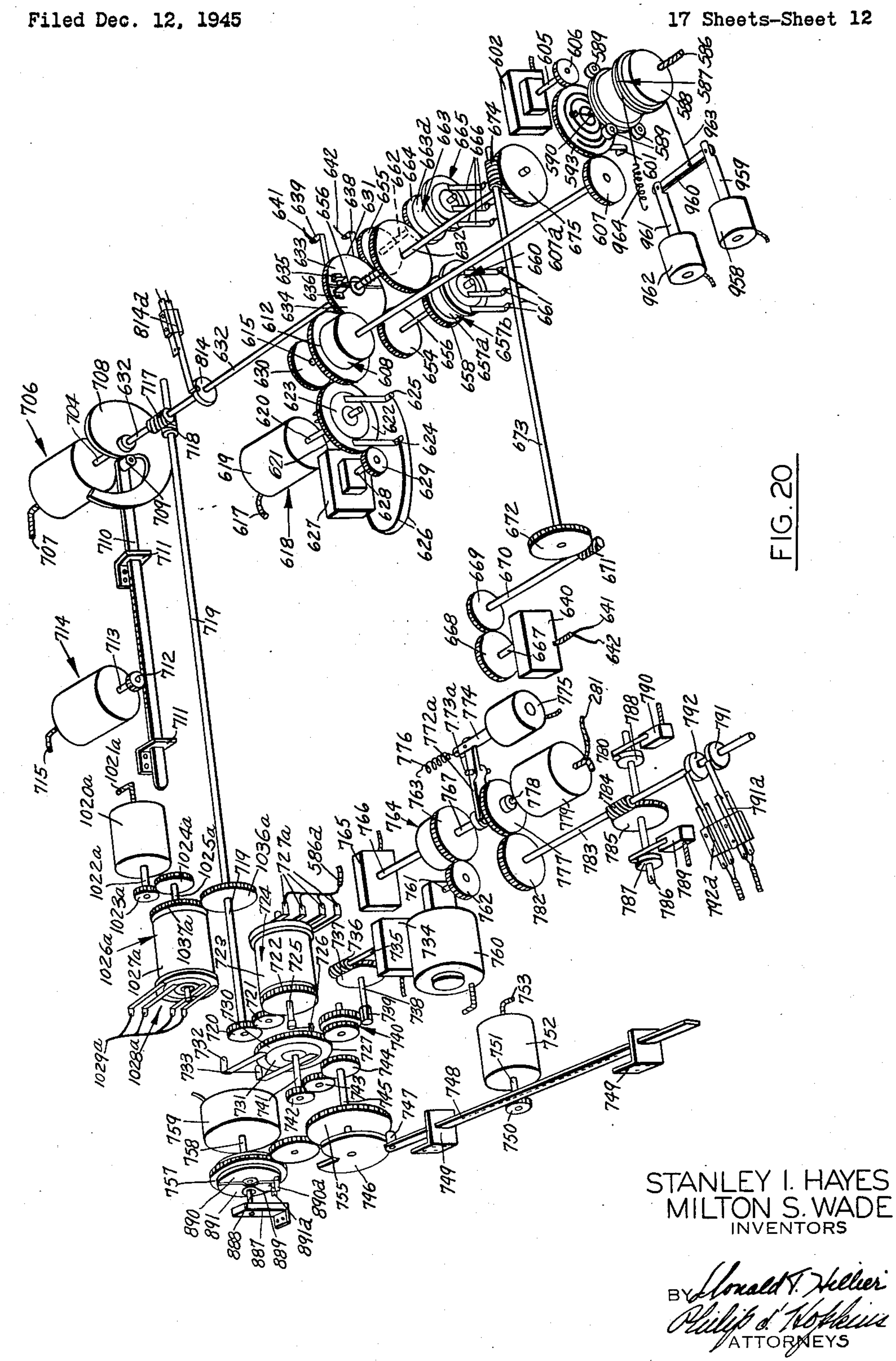
Fig. 20 is a perspective view of the flight unit.
Figures 20A, 20B, 20C, 20D, 20E, 20F, 25:
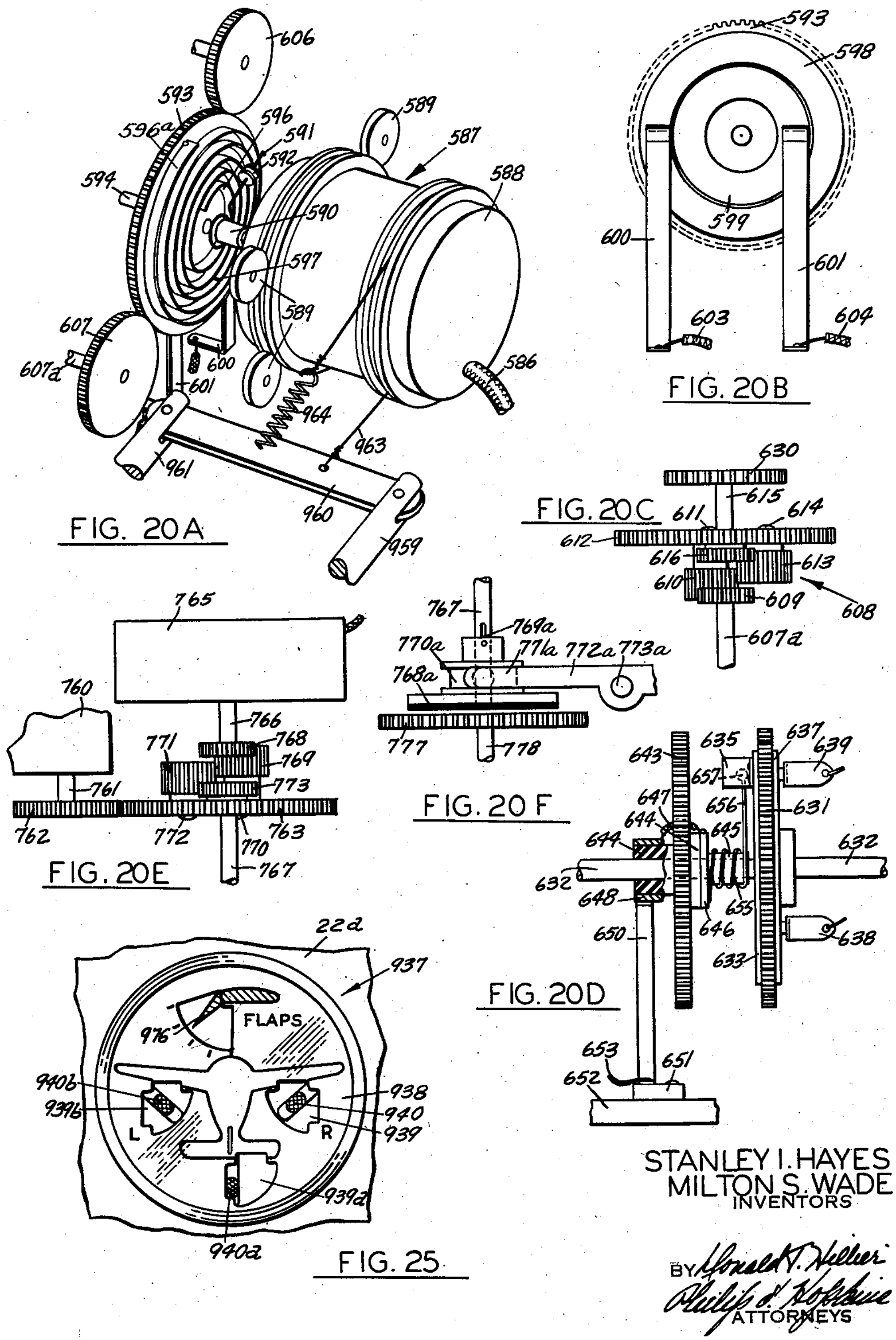
Figs. 20A, 20B, 20C, 20D, 20E and 20F are detailed views of parts of the apparatus shown in Fig. 20.
Fig. 25 is a view of the flaps and retractable landing gear indicator.

Referring to Fig. 20A, it will be seen that there is affixed upon the output shaft 590 the arm 591 carrying the roller 592. Roller 592 and arm 591 are suitably grounded. Receiver 587 is connected to transmitter 584 so that when the fuselage 22 is in the level pitching position, the output shaft 590 is in its neutral position; when fuselage 22 is dived the shaft 590 is rotated counterclockwise from its initial position through an angle proportional to the angle of dive; and when the fuselage is climbed the shaft 590 is rotated clockwise from its initial position through an angle proportional to the angle of climb.

The fiber gear 593 is freely mounted upon the rod 594 which may be fixed in a frame member, and affixed to the gear 593 are the spiral metallic members 596 and **596*a* which would form a continuous spiral except for the break 597. The roller 592 is adjusted upon the arm 591 to bear against one or both of the spiral members 596 or 596*a* at all times. It will be appreciated that roller 592 bears against both of the spiral members when it is opposite the break 597. Reference is now made to Fig. 20B which is an elevational view of the side of gear 593 opposite the spiral members. It will be seen that there are affixed upon the rear side of gear 593 two concentric and mutually insulated slip rings 598 and 599, and brush 600 engages slip ring 598 at all times, while brush 601 engages the slip ring 599 at all times. Slip ring 598 is in electrical contact with spiral 596*a* and slip ring 599 is in electrical contact with spiral 596. Brush 600 is connected to the reversible motor 602, shown in Fig. 20, through the conductor 603, while the brush 601 is connected to this motor through conductor 604. In Fig. 20 it will be seen that the output shaft of the reversible motor is designated 605, and affixed upon this shaft is the gear 606 which drives the fiber gear 593 and the previously described elements carried thereby. Gear 593 in turn drives the gear 607 which is affixed upon the rear end of the shaft 607*a***, this shaft being suitably rotatably mounted in a frame member.

It will be appreciated that the arrangement just described and shown in Figures 20, 20A and 20B comprises a reversible followup or power amplifying system similar to that shown in Fig. 6A, with the exception that the spiral contacts **596*a* and 596 are employed in Fig. 20A instead of the split contact segments 285 and 286 employed in Fig. 6A. Accordingly, whenever the roller 592 carried by the output shaft 590 of the pitch action receiver 587 in Figs. 20 and 20A engages both of the spirals 596 and 596*a*, the motor 602 is deenergized. However, when the output shaft 590 rotates counterclockwise in response to a diving of fuselage 22, roller 592 will engage only the spiral 596, and motor 602 will be energized in such a direction that the gear 606 affixed upon its output shaft rotates gear 593 counterclockwise. This running of motor 602 will continue until gear 593 has been rotated through the same angle as the output shaft 590 and roller 592 were moved counterclockwise in response to the diving of the fuselage 22. When gear 593 has been rotated through such an angle, roller 592 will again engage both of the spirals 596 and 596***a*, and motor 602 will be de-energized.

On the other hand, when the output shaft 590 of Selsyn receiver 587 and the roller 592 are rotated clockwise in response to a climbing of the fuselage, roller 592 will engage spiral 596*a* only, and motor 602 will be energized and will rotate the fiber gear 593 clockwise through an equal angle, at which time the roller 592 will engage both of the spirals 596 and 596*a*, and motor 602 will be de-energized.

It will therefore be appreciated that the input shaft 583 of the pitch action transmitter 584 shown in Fig. 2 is always positioned relative to its housing in accordance with the instant pitching position of the fuselage 22. The output shaft 590 of receiver 587 is always positioned relative to its housing 588 according to the pitch attitude of fuselage 22, and as a result of the reversible followup system, the gear 593 will be positioned from a predetermined initial position in accordance with the instant pitching attitude of the fuselage, neglecting the slight elapse of time required for the motor 602 to position the gear 593. If the fuselage is in a diving attitude, gear 593 will be positioned counterclockwise from its initial position an angular distance dependent upon the angle of dive; and if the fuselage 22 be in a climbing attitude, gear 593 will be positioned clockwise from the initial position an angular distance dependent upon the angle of climb of the fuselage.

The gear 607 and shaft 607*a* in Fig. 20 are similarly positioned with respect to their initial positions in accordance with the instant pitching attitude of fuselage 22, these elements being displaced clockwise by a diving of the fuselage and counterclockwise by a climbing of the fuselage.

Reference is now made to Fig. 20C which discloses a conventional planetary differential, the shaft 607*a* forming one of the inputs thereof. Affixed upon the end of the shaft 607*a* is the gear 609 meshing with the idler gear 610 which is rotatably mounted upon the stud 611 carried by the output gear 612. A second idler gear 613 is mounted upon the stud 614 carried by gear 612. The other input of the differential is the shaft 615, upon the inner end of which is affixed the gear 616. Gear 616 meshes with gear 613 which in turn meshes with gear 610. Gear 612 is freely mounted upon shaft 615.

Referring to Figs. 20 and 20C, it will be appreciated that whenever the shaft 607*a* is rotated clockwise in response to a diving of the fuselage, as seen in Fig. 20, the output gear 612 is similarly rotated clockwise. On the other hand, when shaft 607*a* is rotated counterclockwise in response to a climbing of the fuselage, the gear 612 is also rotated counterclockwise. It will be appreciated, therefore, that when the fuselage is in a diving position the output gear 612 is positioned clockwise from a predetermined neutral position—no other factor being considered—an angular amount dependent upon the instant angle of dive of fuselage 22, and that when the fuselage is in a climbing position it will be positioned counterclockwise from the initial position—no other factor being considered—by an angular distance dependent upon the instant climbing angle of the fuselage.

It will now be shown that gear 612 is also positioned in accordance with the instant assumed engine power output so that its position is representative of the combined factors of engine power output and fuselage attitude—which factors, when combined herein, produce the factor of instant assumed air speed.

Reference is now made to Fig. 6 where the engine power output Selsyn transmitter is designated 254, and this transmitter is connected by means of the cable 617 with the engine power receiver designated generally in Fig. 20 by 618. The housing of this receiver is designated 619 and its output shaft 620. It has previously been explained that the relative rotational positions of the housing 255 an input shaft 252 of the engine power transmitter 254 is in accordance with the instant assumed engine power. Accordingly, it will be appreciated that the shaft 620 in Fig. 20 is always rotatably positioned relative to the housing 619 in accordance with instant assumed engine power.

In Fig. 20 it will be seen thatt here is provided a fiber gear 621 having affixed thereupon two concentric and mutually insulated slip rings 622 and 623. A brush 624 bears against the slip ring 622 and a second brush 625 bears against slip ring 623. The brushes are connected to the reversible followup motor 627 through the conductors 626. Upon the other side of gear 621 are a pair of split contact segments (not shown) against which bears a contact (not shown) affixed upon the shaft 620. The segments and contact in question are identical with those shown in Fig. 6A. One of the segments is connected to the slip ring 622 and the other to the slip ring 623. The output shaft of motor 627 is designated 628 and has affixed thereupon the gear 629 which drives the fiber gear 621. Gear 621 in turn drives gear 630 which is affixed upon the shaft 615, shown in Fig. 20C and previously stated as comprising the second input of the planetary differential shown in Fig. 20C and designated generally by 608.

It will be appreciated that the followup system described above is identical with the system shown in Fig. 6A, and therefore it seems unnecessary to give a further description of the same. It is sufficient to know that the output shaft 620 of the Selsyn receiver 618 is always positioned counterclockwise from a predetermined initial point in accordance with the instant assumed engine power—the greater the assumed engine power, the farther counterclockwise the output shaft 620 is positioned. It will be appreciated that the movements of the output shaft 620 energize the reversible followup motor 627 so that the fiber gear 621 is always positioned, neglecting the period of running of motor 627, counterclockwise from a predetermined initial position, an angular distance directly proportional to the instant assumed engine power. The gear 630 and input shaft 615 of differential 608 will always be positioned clockwise from an initial predetermined position in accordance with the same factor, and also referring to Fig. 20C, it will be appreciated that the output gear 612 of differential 608 is also positioned clockwise from its predetermined initial position—neglecting the factor of fuselage attitude—by an amount directly proportional to instant assumed engine power.

Accordingly, when the fuselage is in a diving position, gear 612 is positioned clockwise through an angle dependent upon the instant diving angle and through an additional angle dependent upon the instant assumed engine power. On the other hand, when the fuselage is in a climbing position, gear 612 is positioned clockwise through an angle dependent upon the assumed engine power less an angular distance dependent upon the climbing angle of the fuselage. Inasmuch as instant assumed air speed is the combination of the factors of fuselage pitching attitude and assumed engine power output, it will be appreciated that the rotatable position of gear 612 may be taken as a measure of the instant assumed air speed of the fuselage. As either of the two controlling factors operates to cause an increase in assumed airspeed, gear 612 moves clockwise, as either operates to produce a decrease, this gear moves counterclockwise.

In Fig. 20 it will be seen that the gear 612 drives the gear 631, and accordingly the position of this gear relative to an initial position may also be taken as a measure of instant assumed air speed. However as this factor increases, gear 631 is rotated counterclockwise, and as assumed air speed decreases, gear 631 is rotated clockwise.

Reference is now made to Figs. 20 and 20D where it will be seen that the fiber gear 631 is freely mounted upon the air speed shaft 632. Affixed upon gear 631 are the two mutually insulated contact segments 633 and 634. Segment 633 carries the metallic ear 635 while segment 634 carries a similar ear 636. A pair of concentric mutually insulated slip rings are carried by the other side of gear 631, the outer slip ring being designated by 637, the inner slip ring not being shown. Each of the slip rings is electrically connected to a different one of the split contact segments 633 and 634, and brush 638 engages the outer slip ring 637 while brush 639 engages the inner slip ring. Each of the brushes 638 and 639 is connected to the air speed motor 640 by one of the conductors 641 or 642.

In Fig. 20D it will be seen that the gear 643 is affixed upon the air speed shaft 632 and pinned to this gear for rotation therewith is the insulating washer 644. Affixed upon shaft 632 is the insulator 645 which carries the brass washer 646 which is connected by means of the insulated conductor 647 which passes through gear 643 with the brass slip ring 648 mounted upon the insulator 644 carried by shaft 632. A brush 650 is carried by the insulator 651 which is affixed to the frame member 652, and is connected to the conductor 653. A spring 655 has its left end affixed to the brass washer 646 and has integral therewith the radial arm 656, upon the upper end of which is affixed the contact ball 657 positioned between the two ears 635 and 636.

Referring to Fig. 20 it will be seen that a pair of gears 654 and 655 mesh with the fiber gear 631 to be driven thereby. Gear 654 is affixed upon the end of shaft 656 which forms the rotor of the potentiometer designated generally by 657*b*. The housing of this potentiometer is designated 657*a* and may be suitably rotatably mounted in a frame member. A gear 658 meshing with the gear 643 to be driven thereby is affixed upon the housing 658 of this potentiometer. Three slip rings designated generally by 660 are affixed to the rear of this potentiometer, and three brushes 661 are arranged to engage the slip rings.

The gear 655 is affixed upon the shaft 662 which forms the rotor of the potentiometer designated generally by 663, the housing of this potentiometer being 663*a*. A gear 664 is affixed upon housing 663*a* which may be suitably rotatably mounted, and three slip rings designated generally by 665 are affixed upon the rear end of the potentiometer. Three brushes 666 are arranged to selectively engage these slip rings.

Also in Fig. 20 it will be seen that the output shaft of the air speed motor 640 is designated 667 and has affixed thereupon the gear 668 which drives the gear 669 affixed upon the end of the shaft 670. Shaft 670 has affixed upon its other end the worm 671 arranged to drive the worm gear 672 affixed upon the left end of shaft 673. The worm 674 is affixed upon the right of shaft 673 and is arranged to drive the worm gear 675 which in turn is affixed upon the rear end of the air speed shaft 632. It will be appreciated that whenever the air speed motor 640 is energized to rotate the gear 668 clockwise in Fig. 20, gear 669 is rotated counterclockwise and gear 672 is rotated clockwise resulting in a similar rotation of shaft 673 and in a counterclockwise rotation of gear 675 and of the air speed shaft 632. On the other hand when the air speed motor 640 is energized to rotate gear 668 in the opposite or counterclockwise direction, it will be appreciated that through the same system the gear 675 and air speed shaft 632 will be rotated clockwise.

Means will now be described for energizing the air speed motor 640 in response to the movements of gears 612 and gear 631, which it will be recalled are always positioned in accordance with the instant assumed air speed. It will be shown that when gear 631 is rotated counterclockwise in response to an increase in assumed air speed, the air speed motor 640 is energized to rotate the gear 675 and air speed shaft 632 counterclockwise. On the other hand it will be shown that whenever gear 631 is rotated clockwise in response to a decrease in the factor of assumed air speed, the air speed motor 640 is energized so that the gear 675 and shaft 632 are rotated clockwise.

Figure 21:
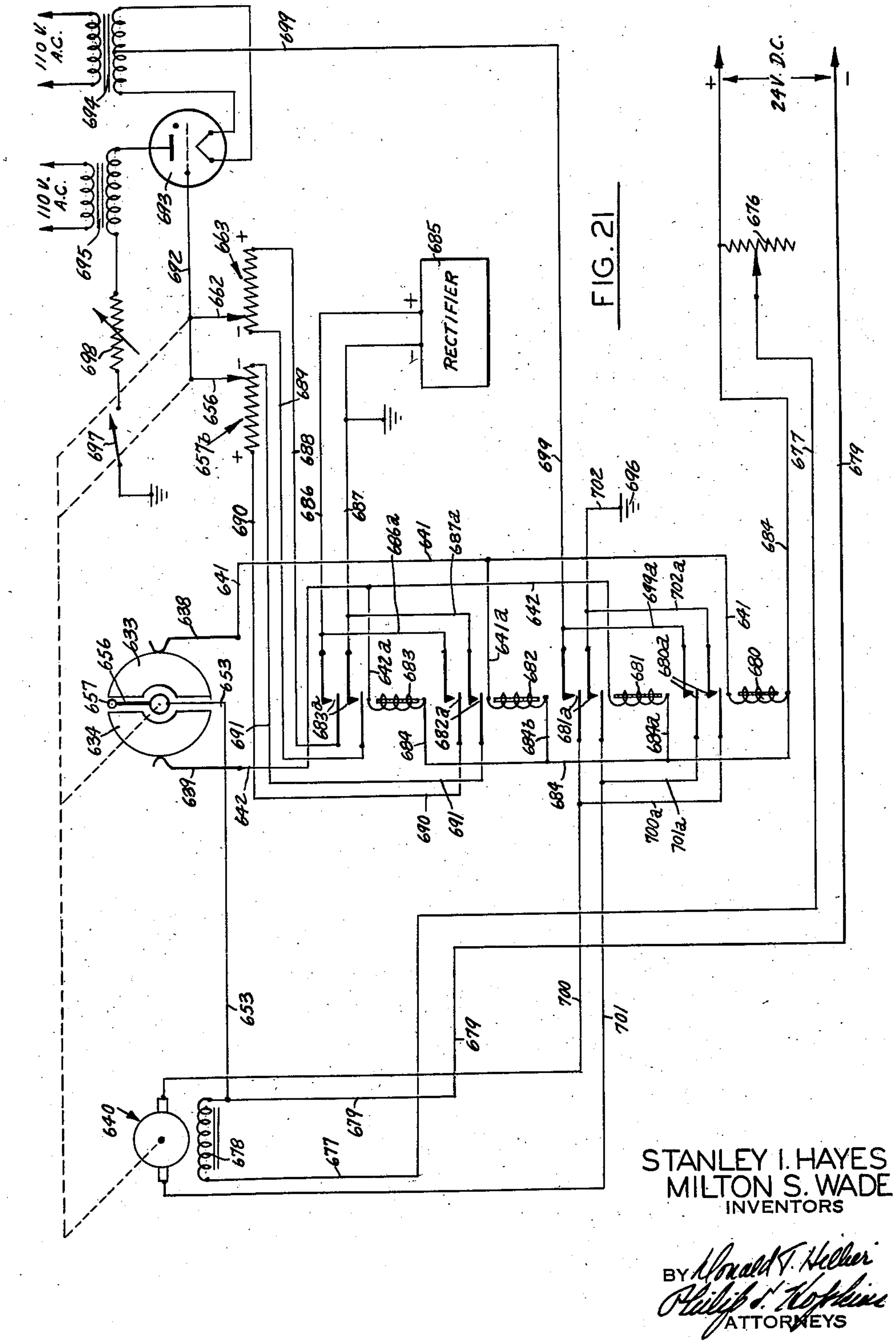
Fig. 21 is an electrical diagram of the air speed followup motor.

Reference is now made to Fig. 21 which is an electrical diagram of the circuit which controls the operation of the air speed motor 640. In Fig. 21 it will be seen that a 24 volt D. C. source is provided, and that the resistor 676 has one end connected to the positive terminal of the D. C. source and that the conductor 677 has a connection to the resistor 676 so as to impress a constant D. C. voltage across the coil 678 of the air speed motor 640 through the conductor 679 which is connected with the other side of the coil and with the negative terminal of the D. C. source. It will be seen that the conductor 653, shown in Fig. 20D to be connected to the arm 656 and contact 657, is connected to the conductor 679 which is connected to the negative terminal of the D. C. source.

Four relays 680, 681, 682 and 683 are provided, the lower end of each of these relays being connected to the positive terminal of the D. C. source through the conductor 684 and its branches 684*a* and 684*b*. Each of the relays 680, 681, 682 and 683, when energized, closes the switches 680*a*, 681*a*, 682*a*, and 683*a*, respectively. A D. C. source in the form of the rectifier 685 is provided, this rectifier being connected through the conductors 686 and 687 with the movable elements of switches 683*a* and with the movable elements of switches 682*a* through the conductors 868*a* and 687*a*. The fixed members of switches 683*a* are connected through the conductors 688 and 689 with the terminals of potentiometer 663, which is also shown in Fig. 20. At the same time the fixed elements of switches 682*a* are connected through the conductors 690 and 691 with the potentiometer 657*b*, which is also shown in Fig. 20. The rotor 656 of potentiometer 657*b* and the rotor 662 of potentiometer 663 are connected through the conductor 92 with the grid of the thyratron control tube 693.

A transformer 694 is provided to furnish the voltage for the filament of tube 693, and another transformer 695 is provided to furnish the plate voltage. The plate circuit of the thyratron control tube 693 includes the ground, the student's chock switch 697, the plate current limiting resistor 698, transformer 695, the plate and filament of tube 693, transformer 694, and the conductor 699 which connects the center of the secondary of transformer 694 with the upper switch 681*a*, conductor 700, the armature of motor 640, conductor 701 which connects the other side of the armature of motor 640 with the lower switch 681*a*, and the conductor 702 which connects with ground. It should also be noted that conductor 699 is connected through the branch conductor 699*a* and the upper switch 680*a* with the conductor 701*a* which connects with conductor 701. Also, the conductor 702 which connects with ground 696 is connected through the conductor 702*a*, the lower switch 680*a* and conductor 700*a* with conductor 700.

Considering now the apparatus shown in Figs. 20, 20D and 21, it will be appreciated that a constant voltage is impressed across the coil 678 of the air speed motor 640 at all times. Assuming that the contact 657 is not in engagement with either of the ears 635 or 636 carried by contacts 633 and 634, the entire apparatus now being considered will be at rest. However, assuming that an increase in assumed air speed occurs, it will be recalled that the gear 631 in Fig. 20 rotates counterclockwise through an angle dependent upon the magnitude of the assumed increase. Accordingly, ear 635 will engage the contact 657 and it will be appreciated that in effect contact 657 engages the segment 633 which is connected through a slip ring with the brush 638. Accordingly, in Fig. 21 the circuit comprising conductor 679, conductor 653, arm 656, contact 657, segment 633, brush 638, conductor 641, relay 680 and conductor 684 will be completed, energizing relay 680 and resulting in a closing of the switches 680*a*. At the same time the relay 682 will be energized because its upper end is connected through conductor 641*a* with conductor 641 and its lower end is connected with the other side of the D. C. source through the conductors 684*b* and 684. Accordingly, the switches 682*a* will also be closed.

At the same time, the increase in assumed air speed which resulted in a counterclockwise rotation of gear 631 will result in a clockwise rotation of gear 654 and the rotor 656 of potentiometer 657*b*, as seen in Fig. 20, and in Fig. 21 the rotor 656 may be considered as moving toward the positive and of potentiometer 657*b*. The closing of switches 682*a* as a result of the energization of relay 682 will place a voltage across the potentiometer 657*b* because rectifier 685 will be connected thereto through the conductor 686, 687, 686*a*, and 687*a*, switches 682*a* and conductors 690 and 691. The movement of rotor 656 toward the positive end of potentiometer 657*b* as a result of the increase in assumed air speed will increase the voltage upon the grid of tube 693 by means of conductor 692.

Upon the closing of the switches 680*a* the circuit including ground, chock switch 697, resistor 698, transformer 695, tube 693, transformer 694, conductors 699 and 699*a*, upper switch 680, conductors 701*a* and 701, the armature of motor 640, conductors 700 and 700*a*, lower switch 680*a*, conductors 702*a* and 702 back to ground will be completed, and motor 640 will be energized.

This energization of motor 640 will result in a clockwise rotation of the output shaft 667 and gear 668 affixed thereupon, as seen in Fig. 20. Through the gear 669, shaft 670, worm 671, gear 672, shaft 673, worm 674 and gear 675, the air speed shaft 632 will be rotated counterclockwise as seen in Fig. 20. When the gear 631 is rotated counterclockwise, the gear 654 and rotor 656 are rotated clockwise therewith, resulting in a movement of rotor 656 in Fig. 21 toward the positive end of potentiometer 657*b* a distance dependent upon the magnitude of the increase in assumed air speed. At the outset a minimum voltage is applied the grid of tube 693, but this voltage rapidly builds up to a maximum as gear 631 moves counterclockwise to its final position. Accordingly, the current through the armature of motor 640 rapidly increases to a maximum, resulting in a rapid increase in the speed of motor 640 to a maximum.

As the motor 640 continues to run, the counterclockwise rotation of the air speed shaft 632 results in a similar rotation of the gear 643 affixed upon this shaft, and the gear 658 affixed upon the housing 657*a*, and the housing 657*a* are rotated in a clockwise direction—the same direction in which the rotor 656 of this potentiometer was originally rotated. Accordingly, as motor 640 continues to run, the potentiometer rotor 656 in Fig. 21 may be considered as moving toward the negative end of potentiometer 657*b*, gradually decreasing the voltage upon the grid of thyratron 693 and resulting in a gradual decrease of the plate current of this tube. The gradual decrease in the plate current of this tube results in a gradual decrease of the current flowing through the armature of motor 640, and in a gradual slowing down of the motor.

At the same time, the gradual counterclockwise rotation of the air speed shaft 632 results in a gradual decrease in the tension upon spring 645 and motor 640 will continue to run until shaft 632 has been rotated counterclockwise through the same angle as gear 631 was initially rotated. When shaft 632 has been moved through the described angle, contact 657 will be separated from both the contacts 635 and 636 and the circuit comprising relays 680 and 682 will be broken, these relays will be de-energized, and the switches 680*a* and 682*a* will be opened, resulting in a stopping of the air speed motor 640. At this instant, the rotor 656 will be repositioned with respect to potentiometer 657.

Accordingly it will be appreciated that the shaft 632 is rotated counterclockwise in response to an increase in assumed air speed, through an angle dependent upon the magnitude of the assumed increase. The rotation of shaft 632 at first rapidly reaches a maximum rate, and this rate gradually decreases until its rotation is terminated. This rotation, it will be recalled is caused initially by an increase in assumed engine power or in a diving of fuselage 22. In the case of a real plane, when an increase in assumed engine power or a diving of the plane occurs, the air speed rate of increase rapidly reaches a maximum and then the rate of increase gradually falls off until the maximum air speed is reached. Thus, the movements of shaft 632 accurately represent the rate of increase of air speed of a real plane in response to an increase in engine power or diving of the plane.

In order to obtain any assumed air speed above zero, the chock switch 697 must be closed to remind the student that in actual aircraft the chocks must be removed before the plane can start its take-off run.

On the other hand, assuming that the air speed shaft 632 has been previously rotated counterclockwise from its initial zero position in response to an increase in assumed air speed—caused either by an increase in assumed engine power output or by a diving of fuselage 22, or both—if then an assumed decrease in assumed air speed occurs as a result of a decrease in assumed engine power output and/or a climbing of fuselage 22, it will be appreciated that the gear 612 which forms the output of differential 608 will be rotated counterclockwise in Fig. 20, and that the gear 631 will be rotated clockwise. Referring now to Fig. 21, the clockwise rotation of gear 631 through an angle dependent upon the magnitude of the assumed decrease will result in electrical contact being made between the contact 657 and the segment 634. It will be appreciated that the circuit comprising conductors 679, 653, arm 656, contact 657, segment 634, brush 639, conductor 642, relay 681, conductor 684*a*, and conductor 684 will be closed. Relay 681 will be energized and the switches 681*a* will be closed. At the same time relay 683 will be energized closing the switches 683*a* because conductor 642*a* connects with one side of relay 683 and with the conductor 642, and conductor 684 connects with the other side of relay 683. Consequently switches 683*a* will also be closed. The closing of switches 683*a* will connect the rectifier 685 with the potentiometer 663 by means of the conductors 686, 687, the switches 683*a* and the conductors 688 and 689.

At the same time, the clockwise rotation of gear 631 will result in a counterclockwise rotation of the gear 655 and rotor 662 of potentiometer 663. Accordingly, in Fig. 21, the rotor 662 may be considered as moving toward the positive end of potentiometer 663, resulting in the application of a rapidly increasing higher voltage to the grid of the thyratron control tube 693, allowing a rapidly increasing plate current to flow therethrough.

At the same time the energization of relay 681 and the resultant closing of switches 681*a* places the armature of motor 640 in the plate circuit of the tube 693. This plate circuit will include the ground, chock switch 697, resistor 698, transformer 695, tube 693, transformer 694, conductor 699, upper switch 681*a*, conductor 700, the armature of motor 640, conductor 701, lower switch 681*a*, conductor 702 and ground. Accordingly, motor 640 will be energized—in this instance in the opposite direction because the current passes through the armature in the opposite direction—and referring to Fig. 20 it will be appreciated that the gear 668 will be rotated counterclockwise. Through the previously described system of shafts and gears, the air speed shaft 632 will be rotated clockwise, as will the gear 643 affixed thereupon. The gear 664 and housing 663*a* of the potentiometer 663 will be rotated counterclockwise—in the same direction in which the rotor 662 was rotated when the decrease in assumed air speed occurred. Accordingly, the gradual rotation of the housing 663*a* of the potentiometer results in effect, in a gradual movement toward the negative end of potentiometer 663 in Fig. 21, causing a gradual lowering of the voltage upon the grid of tube 693, the plate current of this tube gradually decreases, and the speed of motor 640 similarly gradually decreases.

The clockwise rotation of the air speed shaft 632 will at the same time result in a decrease in the tension upon spring 645, and motor 640 will continue to run until the shaft 632 has been moved clockwise through the same angle as the gear 631 was moved when the decrease in assumed air speed occurred. When the shaft 632 has been moved through this angle, the contact 657 will become disengaged from the contact segment 634 and the resultant disengagement will break the circuit of the relays 681 and 683, resulting in a de-energization of these relays and a stopping of motor 640. When this point has been reached, the rotor 662 of the potentiometer 663 has been centered with respect to the housing 659 thereof. In this case, the clockwise rotation of shaft 632 rapidly reaches a maximum rate, and then this rate gradually decreases, just as does the rate of decrease of air speed of a plane in actual flight in response to a decreased engine power output or climbing of the plane.

Figure 24:
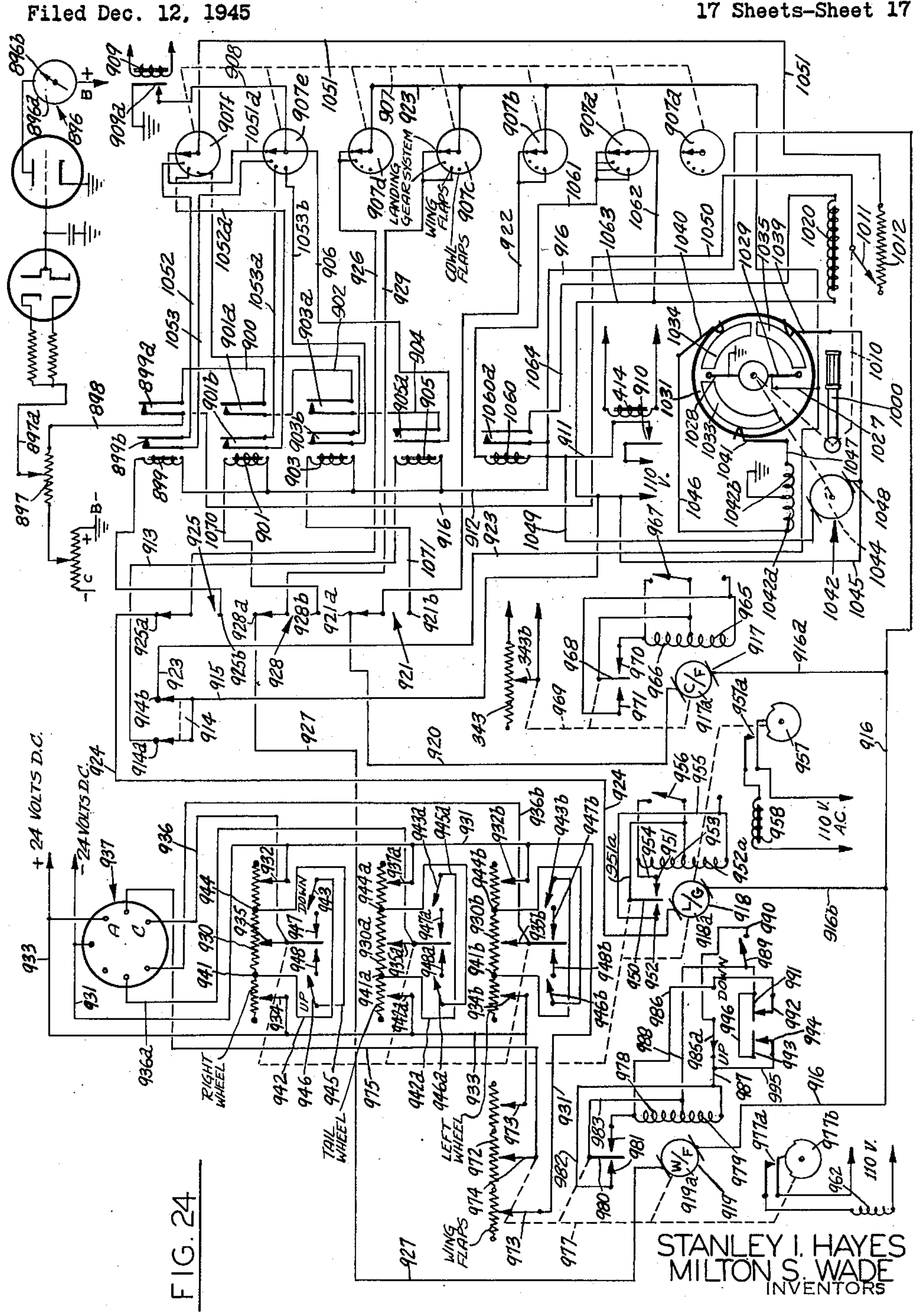
Fig. 24 is the wiring diagram of the retractable landing gear, wing flaps and cowl flaps system.

In view of the previous explanation of the apparatus shown in Figs. 20 and 24, it will be appreciated that the air speed shaft 632 is rotated counterclockwise in response to an increase in assumed air speed, and through an angle proportional to the magnitude of the assumed increase. On the other hand, this shaft is rotated clockwise in response to a decrease in assumed air speed, and through an angle proportional to the magnitude of the assumed decrease. Accordingly, the rotatable position of this shaft with respect to an initial predetermined position may be taken as a measure of the factor of instant assumed air speed. Also, whenever either of the two factors which control the factor of assumed air speed is changed, the rate of change of assumed air speed represented by the movements of shaft 632 at first rapidly reaches maximum, gradually decreasing until the final position of the shaft 632 for the newly established assumed air speed is reached.

Reference is now made to Fig. 20 where it will be seen that the shaft 704 is coupled to the air speed shaft 632 to rotate therewith, shaft 704 forming the input shaft of the Selsyn type transmitter 706 which is connected through the electrical conductor 707 with the Selsyn receiver which forms a part of the wind drift instrument incorporated in trainers of the type being considered. It will be appreciated that the shaft 704 is always positioned relative to the housing of transmitter 706 in accordance with the instant assumed air speed. By virtue of the electrical connection between the Selsyn receiver in the wind drift instrument and the transmitter 706, it will be appreciated that the factor of assumed air speed may be introduced into the wind drift instrument. The factors of fuselage heading, wind speed, and wind direction may be introduced into the wind drift instrument in the manner well understood by those skilled in the art in order that the recorder 30 will travel over the chart 31 in a direction and at a speed dependent upon the four factors which are introduced into the wind drift instrument.

Also in Fig. 20 it will be seen that the cam 708 is affixed upon the air speed shaft 632 for rotation therewith. This cam engages the roller 709 which is rotatably mounted upon the spring biased rack 710 which in turn slides in the brackets 711. A pinion 712 affixed upon the input shaft 713 of the Selsyn transmitter 714 is provided, pinion 712 being arranged to be rotated by the reciprocation of rack 710. The air speed transmitter 714 is connected by the electrical connection 715 which forms a part of the air speed indicator designated generally by 716 in Fig. 8A and mounted upon the student's instrument panel. Indicator 716 comprises a dial 716a, graduated to simulate the dial of the air speed indicator of a real plane, as well as an indicating needle 716b which is mounted upon the output shaft of the Selsyn receiver which is connected to the Selsyn transmitter 714 in Fig. 20. It will be appreciated, in Fig. 20, that the rotatable position of cam 708 determines the reciprocable position of rack 710 which in turn controls the rotational position of the input shaft 713 of the air speed transmitter 714. The position of needle 716b in Fig. 22 relative to dial 716a is controlled by the rotational position of shaft 713. The position of all of the just mentioned elements are controlled by the rotational position of the air speed shaft 632, and so the indicator 716 always indicates to the student within fuselage 22 an instant assumed air speed dependent upon the instant rotational position of shaft 632.

It will also be appreciated by those skilled in the art that an indicator like the indicator 716 may be provided upon the desk instructor's instrument panel 32 in Fig. 1 in order to indicate to the instructor at the desk the instant assumed air speed.

In the case of a plane in actual flight, the provided vertical speed indicator indicates to the pilot the instant vertical speed—whether the plane is ascending or descending, and the rate thereof. Vertical speed depends upon the combined factors of air speed and pitching attitude of the plane—an increase in air speed and a nosing up of the plane causing an increased rate of ascent or a decreased rate of descent, and a decrease in air speed and a nosing down of the plane causing a decrease in rate of ascent or an increase in rate of descent. This invention also provides a simulated vertical speed indicator whose indications are similarly responsive to the factors of assumed air speed and attitude of the fuselage.

Still referring to Fig. 20 it will be seen that the helical gear 717 is affixed upon the air speed shaft 632 for rotation therewith, and this gear drives the helical gear 718 which is affixed upon the right end of the shaft 719, shaft 719 being suitably rotatably mounted in a frame member. Upon the left end of shaft 719 is affixed the spur gear 720 which drives the spur gear 721. Gear 721 in turn drives the gear 722 which is affixed upon the housing 723 of the vertical speed differential Selsyn type receiver designated generally by 724. The housing of receiver 724 may be suitably rotatably mounted in a supporting member. The output shaft of receiver 724 is designated 725 and carries the contact 726. A plurality of slip rings (not shown) are provided upon the right end of receiver 724, rings being connected to the stator coils of receiver 724 in the conventional manner. Four brushes 727a are provided, each of these brushes engaging a different one of the slip rings, as well as being connected with the pitch attitude transmitter 584 in Fig. 2 by means of the cable 586a. It will, therefore, be appreciated that as the fuselage 22 changes its pitching attitude, the shaft 725 is rotated relative to the housing 723 so that the shaft is always rotated through an angle and in a direction dependent upon the pitching movement of the fuselage 22. Whenever the fuselage 22 is dived, the shaft 725 rotates clockwise as seen from the left through an angle dependent upon the angle of movement of fuselage 22; and whenever fuselage 22 is climbed, shaft 725 is rotated counterclockwise through a proportional angle.

At the same time it will be appreciated that shaft 719 is rotated clockwise as seen from the left in Fig. 20 with an increase in assumed air speed and is rotated counterclockwise as a result of a decrease in assumed air speed. The clockwise rotation of shaft 719 results in a clockwise rotation of gear 720, a counterclockwise rotation of gear 721, and in a clockwise rotation of the gear 722 and housing 723 of receiver 724. The clockwise rotation of housing 724 will result in a clockwise rotation of the output shaft 725 through the same angle. On the other hand, when a decrease in assumed air speed occurs, the immediately aforedescribed parts move in the opposite direction so that the housing 723 and shaft 725 rotate counterclockwise through an angle dependent upon the assumed decrease in air speed.

It will be noted that an increase in assumed air speed and a diving of fuselage 22 result in a clockwise rotation of output shaft 725, while a decrease in assumed air speed and a climbing of fuselage 22 result in a counterclockwise rotation of shaft 725. Inasmuch as in the case of an aircraft in actual flight the instant vertical speed is a result of the combined factors of instant air speed and instant pitching attitude, it will be appreciated that the position of shaft 725 relative to an initial position may be taken as a measure of the instant assumed vertical speed of the fuselage 22. As assumed vertical speed increases, shaft 725 moves clockwise, and as assumed vertical speed decreases, shaft 725 moves counterclockwise.

Figure 23:
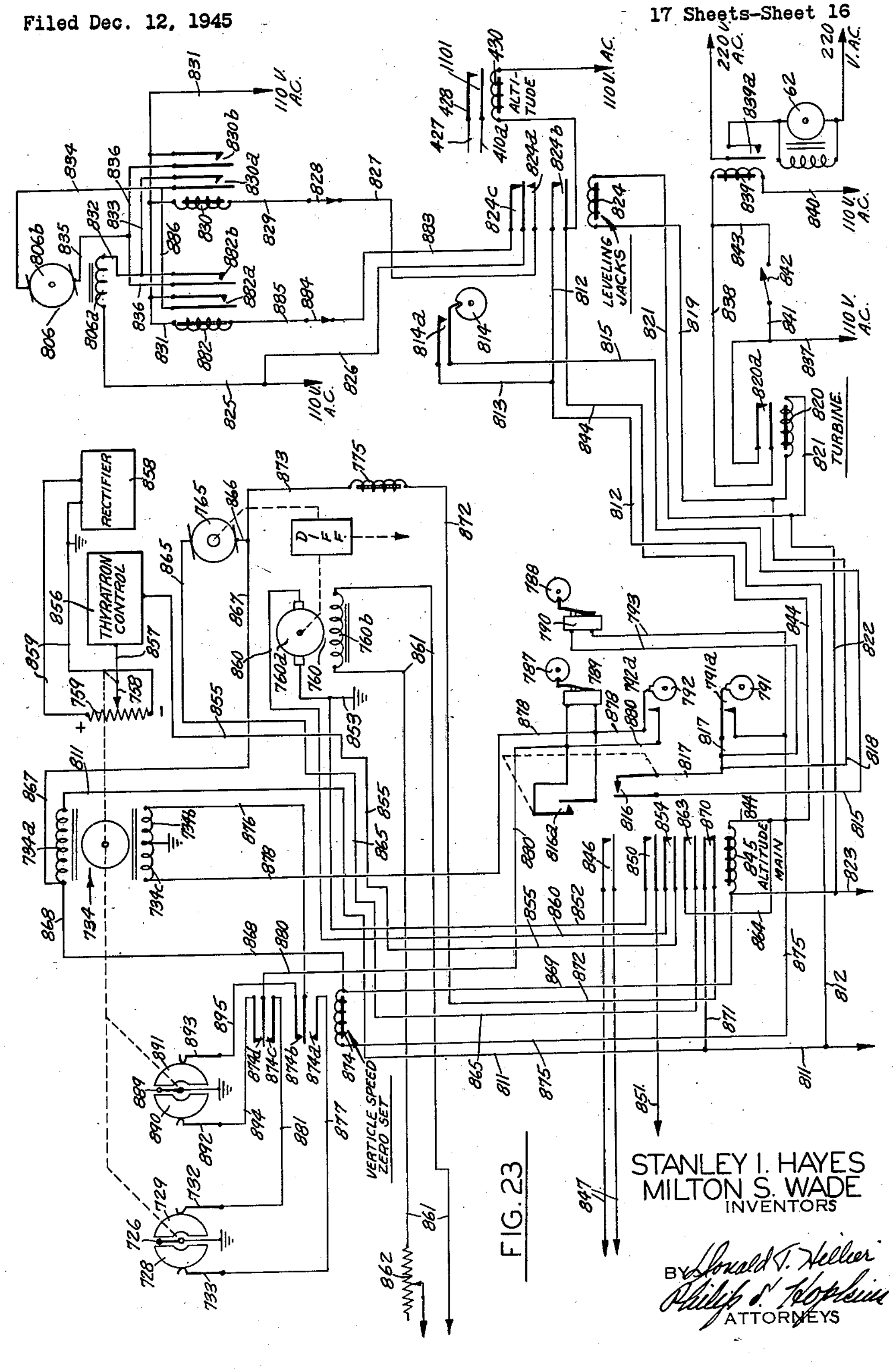
Fig. 23 is the electrical diagram of the flight unit.

In Fig. 20 it will be seen that the fiber gear 727 is provided and affixed upon the right side of this gear are two split contact segments 728 and 729, shown in Fig. 23. The contact 726 is also shown in Fig. 23, and will be seen to be grounded. The split contact segment 728 is connected to the slip ring 731 carried by the other side of this fiber gear, and brush 733 engages slip ring 731 at all times. A second slip ring 730 is affixed upon the left side of gear 727, and is engaged by brush 732. Brushes 732 and 733 are connected to the reversible vertical speed followup motor 734, shown in Fig. 20, through the circuit shown in Fig. 23. Affixed upon the output shaft 735 of the motor 734 is the worm 736 which drives the worm gear 737 affixed upon the right end of shaft 738, upon the left end of which is affixed the pinion 739 which drives the reduction gear train 740. The final gear of this train meshes with the gear 727 to position the same as well as the elements carried thereby.

The electrical circuit shown in Fig. 23 which energizes the followup motor 734 in response to movements of the contact 726 will not be explained at this point. At this time it is sufficient to state that as the rotor 725 in Fig. 20 is rotated clockwise in response to an increase in assumed vertical speed, the followup motor 734 is energized in order that it will drive through the previously described gear train the gear 727 in a clockwise direction through the same angle as the shaft 725 is rotated. On the other hand, when the output shaft 725 of the receiver 724 is rotated counterclockwise in response to a decrease in assumed vertical speed, the followup motor 734 is energized to rotate in the opposite direction, and will continue to be energized until the gear 727 is rotated counterclockwise through the same angle as the contact 726 is moved. Accordingly, the gear 727 is always finally positioned by the vertical speed followup motor 734 in accordance with the instant assumed vertical speed. If vertical speed is positive, gear 727 is positioned clockwise from its initial zero position through an angle proportional to the assumed rate of ascent. If assumed vertical speed is negative, gear 727 is always positioned counterclockwise from its initial zero position by an angular amount dependent upon the assumed rate of descent.

In Fig. 20 it will be seen that the gear 727 is affixed upon the shaft 741, upon the other end of which is affixed the gear 742, which drives the gear 743 which in turn drives the gear 744 affixed upon the right end of shaft 745. Affixed upon the left end of shaft 745 is the cam 746 which engages the roller 747 rotatably carried by the spring biased rack 748 which reciprocates in the brackets 749. A pinion 750 is affixed upon the input shaft 751 of the vertical speed transmitter 752, pinion 750 meshing with the teeth of rack 748 in order to be rotated as the rack 748 is reciprocated.

The vertical speed transmitter 752 is connected by means of the electrical connection 753 with the vertical speed indicator 754 shown to be affixed upon the student's instrument panel in Fig. 8A. This indicator comprises a dial 754*a* graduated in the same manner as the vertical speed indicator in a real plane, and a needle 754*b* is arranged for movement over dial 754*a*. The needle 754*b* is affixed upon the output shaft of the Selsyn receiver (not shown) of this instrument, as is well known to the prior art, so that its rotatable position, and hence the indicated assumed vertical speed, is always dependent upon the rotatable position of the input shaft 751 of the transmitter 752. It will be appreciated that as assumed vertical speed increases, gears 727 and 742 are rotated clockwise, gear 743 rotates counterclockwise, and gears 744 and shaft 745 as well as cam 746 are rotated clockwise. The spring bias upon the rack 748 forces this rack toward the left and the gear 750 and input shaft of transmitter 752 are rotated counterclockwise. By means of the electrical connection the needle 754*b* may be rotated clockwise, thus indicating to the student an increase in assumed vertical speed. On the other hand, when the factor of assumed vertical speed is changed so that a lesser vertical speed is produced, the aforementioned parts move in the opposite direction and the indicator 754*a* moves counterclockwise to indicate to the student a decreased vertical speed.

Still referring to Fig. 20, it will be seen that the gear 755 is affixed upon the shaft 745 and drives the idler 756 which in turn drives the fiber gear 757 affixed upon the rotor 758 of the potentiometer 759. Potentiometer 759 controls the speed of the variable speed altitude motor 760 through the circuit shown in Fig. 23, and which will be discussed in detail hereinafter. It is sufficient at this point to state that when the rotor 758 is neutrally positioned with respect to potentiometer 759, the motor 760 runs at a predetermined rate of speed. When the factor of assumed vertical speed is positive, the rotor 758 is rotated clockwise from the zero vertical speed position and the altitude motor 760 has its speed decreased by an amount proportional to the assumed rate of ascent. On the other hand, when vertical speed is negative, the rotor 758 is rotated counterclockwise, resulting in a greater speed of rotation of the armature of motor 760—the amount of its increase in speed being dependent upon the magnitude of the assumed rate of descent.

In Fig. 20 it will be seen that the output shaft of motor 760 is designated 761 and has affixed thereupon the gear 762 which drives the gear 763 of the planetary differential 764. A constant speed motor 765 is provided, the output shaft 766 of this motor forming the other input of differential 764. The output of differential 764 is in the form of the shaft 767.

Reference is now made to Fig. 20E which is a detail disclosure of the planetary differential 764. In Fig. 20E the constant speed motor 765 is shown together with its output shaft 766, and upon the outer end of this shaft is affixed the pinion 768 which meshes with the idler 769 which is rotatably mounted upon the stud 770 carried by the gear 763 which forms one of the inputs of this differential. Gear 769 meshes with the idler 771 which is rotatably mounted upon the stud 772 also carried by gear 763. The output shaft 767 of this differential is also shown, this shaft having the output gear 773 affixed thereupon, as well as having the input gear 763 freely mounted thereupon. Pinion 773 also meshes with idler 771. The variable speed altitude motor 760, its output shaft 761 and the gear 762 affixed thereupon are also shown, gear 762 meshing with the input gear 763.

The constant speed motor 765 rotates the input shaft 766 in a clockwise direction as seen in Fig. 20, and clockwise as seen from below in Fig. 20E. Disregarding the effect of the altitude motor 760, a constant counterclockwise rotation of the output shaft 767 would result. However, the altitude motor 760 is adjusted so that when assumed vertical speed is zero, its output shaft 761 and the gear 762 are rotated counterclockwise in Fig. 20 and as seen from the left in Fig. 20E at a rate which will exactly offset the clockwise rotation of the other input shaft 766, and accordingly, when assumed vertical speed is zero, the output shaft 767 remains stationary. However, when assumed vertical speed becomes positive, the altitude motor 760 is slowed down proportional to the magnitude of the positive vertical speed, and the result will be a counterclockwise rotation of shaft 767 at a rate dependent upon the assumed vertical speed—the higher the assumed vertical speed, the greater will be the rate of rotation of the output shaft 767.

On the other hand, when assumed vertical speed is negative, motor 760 is run at a higher rate of speed by an amount dependent upon the magnitude of the assumed rate of descent, and the result will be a clockwise rotation of the output shaft 767 at a rate dependent upon the rate of descent.

Accordingly, it will be appreciated that the shaft 767 remains stationary when assumed vertical speed is zero; that this shaft rotates counterclockwise at a rate dependent upon the assumed rate of ascent; and that it rotates clockwise at a rate dependent upon the assumed rate of descent.

It will be appreciated that the altitude of a plane in actual flight is a function of the successive rates of ascent or descent and of the length of time that the successive rates are maintained. In the apparatus being discussed, the factor of time is introduced by the length of time that the shaft 767 is rotated, while the factor of vertical speed is introduced by the rate and direction of rotation of the shaft 767.

Consequently, the shaft 767 is always angularly displaced from a predetermined initial setting or position in accordance with the instant assumed altitude of the trainer.

Reference is now made to Fig. 20F where the shaft 767 is shown. The driving clutch member 768a is mounted upon shaft 767 to be axially movable along this shaft as well as to rotate therewith. A conventional slot and pin arrangement 769a may accomplish this result. In the clutch member 768a is placed the groove 770a in which rides the fingers 771a of the lever 772a which is pivoted at 773a. As better seen in Fig. 20, the other end of lever 772 is pivotally attached to the core 774 of the solenoid 775. A spring 776 is provided to keep the clutch member 768 in engagement with the driven gear 777 when solenoid 775 is not energized. However, it will be appreciated that when solenoid 775 is energized, the driving connection between the altitude shaft 767a and the gear 777 is broken. Gear 777 is affixed upon the input shaft 778 of the altitude Selsyn transmitter 779. This transmitter is connected by means of the electrical connection 780 with the Selsyn receiver which forms a part of the altitude indicator designated 781 in Fig. 8A. The altimeter 781 comprises a dial 781a graduated in a manner corresponding to the corresponding instrument in a real plane, as well as a needle 781b affixed upon the output shaft of the Selsyn receiver for movement over dial 781a. The solenoid 775 is normally de-energized and consequently, it will be appreciated that the shaft 778 is always rotatably positioned with respect to its initial zero position in accordance with the instant assumed altitude. Accordingly, the needle 781b is positioned relative to the dial 781a in Fig. 8A according to the instant assumed altitude, thereby indicating to the student his instant assumed altitude. An instrument similar to the instrument 781 may be connected to the altitude transmitter 779 and placed upon the instructor's desk in Fig. 1 in order to indicate to the instructor at the desk the instant assumed altitude.

The altitude transmitter 779 in Fig. 20 is also connected by means of cable 281 with the altitude receiver 278 shown in Fig. 6A. Accordingly, the output shaft 280 of this receiver as well as roller 284 are always positioned in accordance with the factor of instant assumed altitude, as previously explained in connection with Figs. 6 and 6A.

Referring back to Fig. 20, it will be seen that the gear 777 also drives the gear 782 affixed upon the fore end of the high-speed altitude shaft 783. Shaft 783 carries the worm 784 which drives the worm gear 785 affixed upon the low-speed altitude shaft 786 which in turn carries the cams 787 and 788. Cam 787 controls switch 789 and cam 788 controls switch 790. Also shaft 783 carries the two cams 791 and 792 which respectively control switches 791a and 792a. The shaft 783 rotates clockwise in Fig. 20 through one revolution for each increase of one thousand feet of assumed altitude, and counterclockwise for each decrease of one thousand feet of assumed altitude, while the shaft 786 rotates clockwise as seen from the left through one revolution for each increase of 100,000 feet of altitude and counterclockwise for each decrease of the same amount. Accordingly, shaft 786 never rotates through more than one complete revolution.

Figures 22, 26:
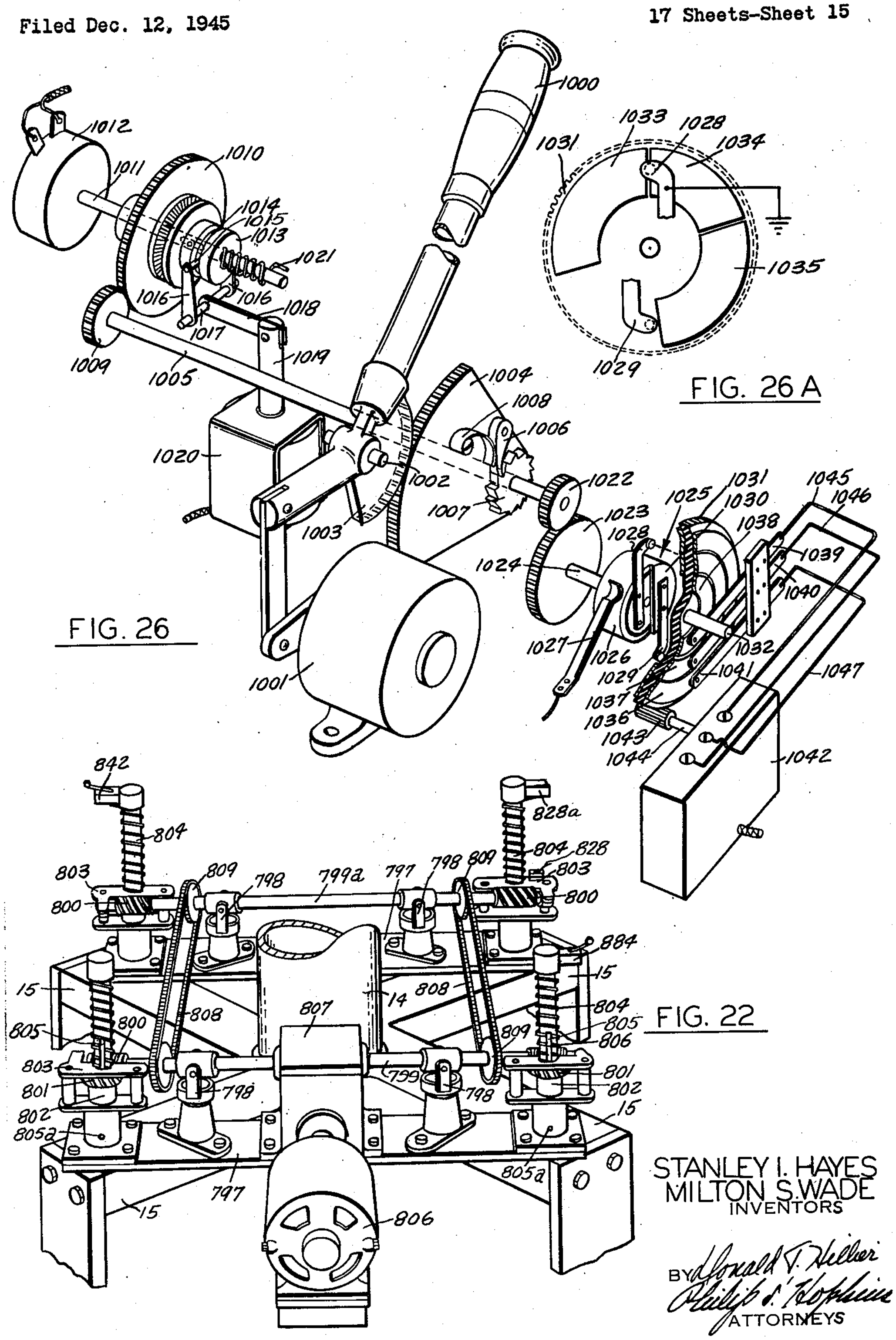
Fig. 22 is a perspective view of the levelling jack arrangement.
Fig. 26 is a mechanical view of the hydraulic hand pump simulating means.

Reference is now made to Fig. 22 where the rotatable arms 15 are shown. A pair of supporting plates 797 are carried by the arms 15 and four bearing assemblies 798 in turn are supported by these plates. A pair of shafts 799 and 799a are carried by the bearing supports and upon each end of each of these shafts is mounted a worm 800, each arranged to drive a worm gear 801 (only two shown). Each of the worm gears is rotatably mounted upon the top of one of the supporting members 802 and retained in position by means of the brackets 803 carried by members 802. The supporting members 802 in turn are affixed to the plates 797, as shown.

Four jacks 804 are provided, and one of each of these jacks passes through one of the worm gears 801. Gears 801 in turn are internally threaded so that a rotation of the worms will result in an axial movement of the jacks. A slot 805 is placed in each of the jacks and a pin 805a is provided in each of the supporting members 802 in order to prevent a rotation of the jacks 804.

A reversible motor 806 is provided and is connected through the gear box 807 to drive the shaft 799 which in turn is arranged to drive the shaft 799a by means of the chains 808 and sprockets 809.

Referring also to Fig. 2, when the jacks 804 are extended as seen in Fig. 22, the upper end of each of the jacks engages a plate 810 affixed to the bottom of the fuselage framework 27, thus retaining the fuselage in the position shown in Fig. 1. On the other hand when the jacks 804 are retracted, the fuselage is free to pitch and bank as previously explained.

Assuming that the "engine" has been started, as previously described, the student will start his takeoff run. This may be simulated by operating the engine controls shown in Fig. 5 and closing the chock switch 697 in Fig. 21, so as to gradually increase air speed as well as the engine instrument indications. When the air speed indicator 716 in Fig. 8A indicates an assumed air speed of 90 miles per hour, it is assumed that the takeoff speed has been reached.

Referring to Fig. 20, it will be seen that the cam 814 which is affixed upon the air speed shaft 632 controls the switch 814a. When the air speed shaft 632 is rotated sufficiently far counterclockwise to be in the 90 mile per hour position, the cam 814 closes the switch 814a. Referring now to Fig. 23, it will be appreciated that upon the closing of switch 814a current will flow from the 110 volt A. C. source along the conductor 811, conductor 812, conductor 813, through switch 814a, along conductors 815 and through the student-controlled hook switch 816 which must be in the "in" position before the plane can take off, to simulate the requirement in actual aircraft aboard aircraft carriers that the hook switch be in the "in" position before the takeoff is attempted. The current flows from the hook switch 816 along the conductors 817 and 818 up along conductor 819 through the leveling jack relay 824, thence along conductor 821, conductor 822 and conductor 823 to the other side of the 110 volt source.

It will therefore be appreciated that the first described effect resulting from the achievement of an assumed air speed of 90 miles per hour is the energization of the leveling jack relay 824.

The energization of the leveling jack relay 824 results in a closing of the switches 824a and 824b controlled thereby. Upon the closing of switch 824a it will be appreciated that current will flow from the 110 volt source along conductors 825 and 826 through switch 824a along the conductor 827 to the switch 828, physically located as shown in Fig. 22 and arranged to be closed when the leveling jacks 804 are up the slight amount required to displace block 828a from switch 828, Inasmuch as the leveling jacks are up under the circumstances being considered, current flows through switch 828 along conductor 829 through the relay 830 along the conductor 831 to the other side of the 110 volt A. C. source. Accordingly, relay 830 will be energized, closing the switches 830*a* and 830*b*.

Upon the closing of switches 830*a* and 830*b* by the energization of relay 830, current also flows from the 110 volt source along conductor 825 to the right through the stator winding 806*a* of the leveling jack motor 806, then along conductors 832 and 833 through the switch 830*a*. From switch 830*a* the current flows through conductor 834 to the left through the armature 806*b* of motor 806, then along conductors 835 and 836 through the switch 830*b* and along conductor 831 to the other side of the 110 volt source. The motor 806 will therefore be energized in such a direction, referring to Fig. 22, that the leveling jacks 804 will be moved downwardly away from the bottom of the fuselage 22. Motor 806 will continue to run until the switch 828 shown in Figs. 22 and 23 is opened by the leveling jacks 804 reaching their down positions. At that instant the leveling jack motor 806 will be de-energized.

Referring back to Fig. 23, inasmuch as the turbine relay 820 which controls the switch 820*a* is in parallel with the conductors 819 and 821 which energize the leveling jack relay, it will be appreciated that the turbine relay 820 will be energized at the same instant that the leveling jack relay is energized. Accordingly, switch 820*a* will be closed. The energization of the turbine relay 820 will result in a closing of the switch 820*a* controlled thereby and it will be seen that 110 volts will be impressed across the master turbine relay 839 by means of the conductor 837, switch 820*a*, conductor 838 and conductor 840. Accordingly, the master turbine relay 839 will be energized, closing the switch 839*a*, and connecting the turbine 62, also shown in Fig. 1, with the conventional 220 volt A. C. source. Accordingly, turbine 62 will be energized to supply vacuum to the main control valve assembly shown in Fig. 3 in order that the student may control the pitching and banking position of the fuselage 22 by a manipulation of the control stick 39 which, as explained in detail above, causes the bellows 18, 19, 20 and 21 shown in Fig. 1 to expand and contract to change the position of fuselage 22 about its longitudinal and transverse axes.

It will therefore be appreciated that the obtaining of an assumed air speed of 90 miles per hour causes a retraction of the leveling jack so that the fuselage may move upon its main universal joint and that at the same time the turbine is energized in order that the student may control the position of the fuselage about its lateral and longitudinal axes. Clearly, these two factors simulate very accurately the takeoff of a real airplane when the required air speed is obtained.

Parenthetically, in Fig. 23 it will be seen that the conductor 841, switch 842 and conductor 843 bypass the switch 820*a* which is controlled by the turbine relay 820. The switch 842 is physically positioned as shown in Fig. 22 and is arranged so that when the jacks 804 are in their extended positions, this switch is open. However, as soon as the jacks 804 are retracted a slight amount, switch 842 closes, and accordingly the turbine 62 will continue to run even though the turbine relay 820 be later de-energized, as will be explained.

The energization of the leveling jack relay 824 will result in a closing of the switch 824*b*, and it will be appreciated that current will flow from the 110 volt source through conductors 811, 812, through switch 824*b*, and then along conductor 844 through the altitude main relay 845 and thence along conductor 823 to the other side of the 110 volt source. Accordingly, the altitude main relay 845 is energized at the same instant as the leveling jack relay and the turbine relay are energized.

Upon the energization of the altitude main relay 845 the switch 846 is closed, and by means of the conductors 847 the lights in the cloud projectors 848 shown in Fig. 1 are turned on so that a moving cloud image will be projected upon the translucent covering 849 of the fuselage 22, thus simulating the appearance of flying through clouds. The cloud projectors 848 may be constructed in a manner known to those skilled in the prior art.

Secondly, the energization of the altitude main relay 845 closes the switch 850 and by means of the conductors 851, 852 and 853 completes the circuit of the drive motors of the recorder 30 shown in Fig. 1 so that this recorder moves over the chart 31 in the conventional manner.

Third, the energization of the altitude main relay 845 results in a closing of the switch 854. The lower contact of this switch is connected through the conductor 855 with the output terminal of the thyratron control unit 856. This control unit is identical with the thyratron control unit shown in Fig. 21, and therefore it is represented in Fig. 23 in block form. The output of the thyratron control unit 856 is regulated by the movement of the potentiometer rotor 758 relative to the housing 759, the rotor 758 being connected to the grid of the thyratron control 856 through conductor 857. A rectifier 858 places a constant D. C. potential across the potentiometer 759 by means of the conductors 859. The upper contact of switch 854 is connected through the conductor 860 with the armature 760*a* of the altitude motor 760. The stator winding 760*b* of the altitude motor 760 is supplied with a constant D. C. potential by means of the conductors 861, resistor 862 and the constant D. C. source.

Accordingly, the energization of the altitude main relay results in a closing of switch 854 and it will be appreciated that the output of the thyratron control unit 856 may pass along conductor 855 through switch 854, along conductor 860 through the armature 760*a* of the altitude motor 760 and thence along conductor 853 to ground, energizing motor 760.

The energization of the altitude main relay 845 also results in a closing of the switch 863. This switch controls the running of the synchronous motor 765, also shown in Fig. 20. Upon a closing of switch 863, one side of motor 765 is connected to the right side of the altitude main relay through the conductor 865, switch 863 and conductor 864, and the other side of motor 765 is connected to the other side of the altitude main relay through the conductors 866, 867, 868 and 869. Accordingly, the energization of the altitude main relay 845 results in an energization of the constant speed telechron motor 765.

Finally, the energization of the altitude main relay 845 results in an opening of the normally closed switch 870. Before the altitude main relay is energized, it will be appreciated that the solenoid 775 is energized through the conductor 811, conductor 871, switch 870 and conductor 872 which connects with the lower side of the solenoid, and through the conductors 873, 867, 868, 869 and 823 which connect the other side of the 110 volt source with the lower side of the solenoid.

Accordingly, referring to Fig. 20, it will be appreciated that the normal energization of the solenoid 775 disconnects the shaft 767 from the gear 777, and therefore the altitude transmitter 779 cannot be actuated. Accordingly, the altimeter 781 in Fig. 8A will indicate an altitude of zero until a 90 mile air speed is reached, at which point the altitude main relay 845 is energized. However, as soon as the altitude main relay 845 is energized, the switch 870 is opened, solenoid 775 is de-energized, and referring to Fig. 20, the de-energization of this solenoid results in a driving connection being established between the shaft 767 which is the output of the altitude differential 764 and the gear 777 which drives the rotor 778 of the Selsyn transmitter 779.

Simultaneous with the reaching of the 90 mile per hour air speed position by the cam 814 and the closing of the switch 814a, the vertical speed zero set relay 874 will be energized because this relay is in parallel with the altitude main relay through the conductor 869 on the one side, and conductors 875 and 844 on the other.

The vertical speed zero set relay 874 is one of the controls of the vertical speed followup motor 734 shown in Fig. 20, the electrical circuit of which is shown in Fig. 23 and will now be described. In Fig. 23 it will be seen that 110 volts is impressed across the primary coil 734a of this motor at all times through the conductor 811 which connects with one side of the coil, and through conductors 868, 869 and 823 which connect with the other side. One of the secondary coils of motor 734 is designated 734b, and has its left end grounded, while its right end is connected through the conductor 876, switch 874a and conductor 877 with the brush 733 which is in electrical connection with the split contact segment 728. The contact 726 is shown in Fig. 23 to be grounded, and it will be appreciated that when contact 726 engages segment 728, the coil 734b will be shorted and motor 734 will be energized to rotate its output shaft 735 seen in Fig. 20 clockwise, and through the interposed gear train will rotate the gear 727 and split contact segments 728 and 729 clockwise.

In Fig. 23 the other secondary coil of motor 734 is designated 734c, and it will be seen that its right end is grounded while its left end is connected through the conductor 878, switch 792a which is controlled by cam 792, conductor 880, switch 874c, and conductor 881 with the brush 732 which is in electrical contact with the split contact segment 729. When the cam 792 is positioned so that switch 792a is closed, if contact 726 engages segment 729 and relay 874 is energized, the coil 734c of motor 734 will be grounded through the just described circuit. Accordingly, motor 734 will be energized to rotate its output shaft 735 in Fig. 20 in the counterclockwise direction, resulting in a counterclockwise rotation of the gear 727 and the split contact segments 728 and 729 carried thereby.

Accordingly, when an assumed air speed of 90 miles per hour is attained, the leveling jacks are retracted, the turbine is started, the variable speed altitude motor 760 and the constant speed motor 765 which drive into the differential 764 are energized; the solenoid 775 is de-energized resulting in a driving connection being established between the output shaft 767 of differential 764 and the altitude transmitter 779, and also the shafts 783 and 786 in Fig. 20 will be rotated in accordance with the output of differential 764. Also, the vertical speed motor 734 will be energized in a direction dependent upon the direction of movement of contact 726.

When the take-off air speed is reached, the assumed air speed continues to increase, if the student holds fuselage 22 in the proper take-off attitude, and soon the output shaft 725 of the Selsyn receiver 724 will be rotated clockwise sufficiently far to bring contact 726 into engagement with the split contact segment 728. As previously explained, the secondary coil 734b of the vertical speed motor 734 will be shorted, and the output shaft 735 of this motor will be rotated clockwise resulting in a counterclockwise rotation of the reduction gear train 740 and a clockwise rotation of the gear 727 which carries the split contact segments 728 and 729. After the take-off, the assumed air speed will normally be continuously increasing and consequently the contact 726 will continue to move clockwise as seen in Fig. 20, counterclockwise as seen in Fig. 23, keeping the follow-up motor 734 energized so as to rotate the gear 727 and split contact segments 728 and 729 in the clockwise direction as seen in Fig. 20. This process may continue over a rather protracted length of time, and in Fig. 20 it will be appreciated that the clockwise rotation of gear 727 will result in a clockwise rotation of the gear 742, a counterclockwise rotation of gear 743, a clockwise rotation of the gears 744 and 755, as well as in a clockwise rotation of the cam 746. This movement of cam 746 will result in a movement to the left of the spring-biased rack 748 and in a turning of the input shaft 751 of the vertical speed transmitter 752 so that the vertical speed indicator 754 in Fig. 8A indicates an increasingly greater rate of ascent with an increase in assumed air speed.

Also, inasmuch as the student will normally place the trainer fuselage 22 in a slight climbing attitude, this factor will also result in a clockwise rotation of the contact 726, and through the same followup system an indication of a greater rate of ascent by the vertical speed indicator 754 will occur.

At the same time, the clockwise rotation of the gear 755 in response to the increasing assumed air speed and to the slight climbing position of the fuselage 22 will result in a counterclockwise rotation of gear 756 and in a clockwise rotation of the gear 757 and of the rotor 758 of the potentiometer 759, also shown in Fig. 23 to which reference is now made. The rotor 758 of potentiometer 759 under the circumstances being considered may be considered as moving toward the negative end of the potentiometer 759, thereby resulting in a decreasing voltage upon the grid of the thyratron control 856, and in a smaller plate current flowing from this control unit through the conductor 855, switch 854, conductor 860, armature 760a and conductor 853 to ground. Accordingly the altitude motor 760 in Fig. 20 will run at an increasingly slower speed as the assumed vertical speed is increased. As previously explained, the output shaft 767 of the differential 763 will be rotated counterclockwise as will the gear 777 and the input shaft 778 of the altitude transmitter 779, resulting in a clockwise rotation of the needle 781b of the altimeter 781 in Fig. 8A, thus indicating to the student an increasingly greater assumed altitude, dependent upon the combined functions of time and successive vertical speeds.

At the same time as the gear 777 is rotated counterclockwise, the gear 782 and shaft 783 will be rotated clockwise as seen in Fig. 20, resulting in a clockwise rotation of the cams 791 and 792. At the same time the gear 785 will rotate clockwise as seen from the left at a much slower rate than the rotation of shaft 783, and the shaft 786 and cams 787 and 788 rotate in the same direction.

Referring now to Fig. 23, the cams 791 and 792 are shown as well as the switches 791a and 792a controlled thereby. As soon as the shaft 783 in Fig. 20 has started to rotate clockwise, the switch 791a in Fig. 23 is closed. The closing of this switch then shorts the switch 814a controlled by the air speed cam 814 as well as the hook switch 816 so that regardless of the position of cam 814 and of the hook switch 816, the leveling jack relay 824, the turbine relay 820, the altitude main relay 845 and the vertical speed zero set relay 874 are continued to be energized, keeping the apparatus functioning in a manner to simulate the flight of a real plane. Cam 791 and switch 791a perform this function in the following manner: Current passes from the conductor 811 which connects with the 110 volt source along conductor 812 through the switch 824b controlled by the leveling jack relay 824 and thence along conductor 844 to the conductor 875, through the switch 791a along conductors 817 and 818 to the conductor 819, through the leveling jack relay 824 and the turbine relay 820 and then along the conductors 821 and 822 to the conductor 823 which connects with the other side of the 110 volt source. Accordingly, the switch 791a bypasses the switches 814a and 816 as soon as a few feet of assumed altitude is obtained, keeping the turbine and leveling jack relays energized. At the same time one side of the altitude main relay 845 is connected to the conductor 875 while the other side is connected to the other side of the 110 volt source so the relay 845 will continue to be energized. The vertical speed zero set relay 874 is in parallel with the altitude main relay and therefore it will continue to be energized. Accordingly, the turbine relay 820, leveling jack relay 824, altitude main relay 845 and vertical speed zero set relay 874 will all continue to be energized as soon as a few feet of assumed altitude are obtained, even though either one or both of the switches 814a or 816 is open.

Referring to Fig. 20 there is shown the cam 788 affixed upon the low speed altitude shaft 786 and controlling the switch 790. As previously explained the shaft 786 never makes a complete revolution. The cam 791 upon shaft 783, on the other hand, rotates through one revolution for each 1000 feet of assumed altitude. Accordingly, it will be appreciated that the switch 791a will be opened once for each change of 1000 feet in assumed altitude, and accordingly, it will be rendered inoperative to keep the leveling jack, turbine, altitude main and vertical speed zero set relays energized if either the hook switch 816 or the switch 814a under the control of the air speed cam 814 is opened. Accordingly, referring to Fig. 23, it will be seen that the switch 790 bypasses the switch 791a by means of the conductors 793. Cam 788 is arranged to close switch 790 between the interval of the initial closing of switch 791a and the attaining of 700 feet of assumed altitude—i. e., before enough assumed altitude could be reached to open switch 791a. Consequently, for any assumed altitude above a few feet, either the switch 791a or switch 790 is closed to by-pass the switches 814a and 816. So an opening of either of these two switches above an assumed altitude of a few feet will not affect the leveling jacks relay, the turbine relay, the altitude main relay, or the vertical speed zero set relay. Accordingly, as long as the student has a few feet of assumed altitude he may control the attitudes of fuselage 22 and the vertical speed indicator and altimeter will continue to function.

Referring again to the case of a plane in actual flight for purposes of comparison, when the plane has achieved a sufficient take-off air speed, e. g., 90 miles per hour, the air speed together with the accelerating forces which then prevail are sufficient to lift the plane off from the ground, and inasmuch as the air speed continues to increase the plane will gain altitude. However, the same aircraft in actual flight after take-off, if it were flying at a constant speed of 90 miles per hour, would lose altitude. The apparatus previously described herein is arranged so that when the air speed shaft 632 is positioned for a 90 mile per hour air speed, and the fuselage is in level flight, the output shaft 725 of the receiver 724 and contact 726 will be positioned so that the vertical speed followup motor 734 positions the gear 727, and accordingly the input shaft 758 of the potentiometer 759 and the input shaft 751 of the vertical speed transmitter 752 in such positions that the vertical speed indicator 754 will show a rate of descent, and the altimeter 781 will show a progressively decreasing altitude.

In order to avoid a decreasing vertical speed and a gradual falling off of altitude during take-off when the take-off speed of 90 miles per hour is reached, the previously described apparatus functions in the following manner. Before a certain predetermined altitude is reached, e. g., 25 feet, the cam 792 in Fig. 23 is positioned so that the switch 792a is open. Inasmuch as switch 792a is open, it will be seen that the coil 734a of the vertical speed followup motor 734 has its circuit open, and accordingly, this coil cannot be shorted by the engagement of the contact 726 and the split contact segment 729. Accordingly, the output shaft 735 of the followup motor 734, as seen in Fig. 20, is not free to rotate counterclockwise to produce a rate of descent until the predetermined altitude of 25 feet is gained. However, when the predetermined altitude is gained, the switch 792a is closed by the rotation of cam 792, and upon reaching an assumed altitude of 700 feet, cam 787 closes switch 789, so that cam 792 does not intermittently prevent contact 726 from shorting out coil 734c. One or both of the switches 792a and 789 will always be closed at any assumed altitude above 25 feet.

As soon as the predetermined altitude of 25 feet is reached, the assumed air speed is considerably higher than 90 miles per hour, and consequently the apparatus continues to operate to show an increase in air speed, a high rate of ascent, and an ever increasing altitude. However, if at any subsequent time during the "flight" of the trainer, the combined assumed air speed and pitching attitude of fuselage 22 are such as to produce a loss in rate of ascent or a gain in rate of descent, contact 726 will engage the segment 729, shorting out coil 734c of motor 734, and resulting in a rotation of its output shaft 735 counterclockwise as seen in Fig. 20. Gear 727 will be rotated counterclockwise through the same angle as was contact 726, resulting in a counterclockwise rotation of cam 746 and potentiometer rotor 758. Accordingly, the vertical speed transmitter is operated to indicate a lesser rate of ascent or a higher rate of descent, and the motor 760 has its speed increased. Shaft 767 will be properly affected, as will the altimeter transmitter 779 and altimeter 781. The same applies to the altitude shafts 783 and 786.

During the assumed flight of the trainer it will be appreciated that the engine controls shown in Fig. 5 may be selectively operated by the student in order to properly affect the engine guages as well as the power output of the engine unit shown in Fig. 6. The engine power output is combined with the fuselage attitude which may be controlled by the student to produce the factor of air speed. The factor of air speed is again combined with the factor of fuselage attitude to produce the assumed factor of vertical speed, and vertical speed is combined with time to produce the factor of assumed altitude. Accordingly, as the student "flies" the trainer, the engine instruments as well as the air speed indicator, vertical speed indicator, and altimeter react to any given factor just as they would react in the case of a plane in actual flight.

It will of course be appreciated that other instruments simulating those conventionally placed within real aircraft may be placed in the fuselage 22, all of which may be actuated as is known to the art and their indications may be relied upon by the student in the same manner as he would rely upon the indications of the corresponding instruments of a real plane. The recorder 30 shown in Fig. 1, of course, traces the assumed path of flight of the trainer in the conventional manner.

Assuming that the student in the fuselage 22 has nearly completed his practice "flight" and he wishes to "land," he will of course make the usual gliding descent. When the assumed altitude reaches the previously mentioned predetermined amount of 700 feet, the switch 790 shown in Figs. 20 and 23 will be opened by shaft 786 and cam 788, and thereafter will not by-pass the switches 814*a*, 816 and 791*a*. However, the switch 791*a* will be closed at an altitude of 700 feet, thus by-passing switches 814*a* and 816. At about an altitude of 700 feet the student will place the hook switch 816 in the "out" position, thus closing the switch 816*a* and opening switch 816. Switch 816*a* will therefore by-pass the switch 792*a* controlled by cam 792. The student continues to lose altitude until only 25 feet of assumed altitude are indicated, at which time cam 792 opens switch 792*a*, but inasmuch as switch 816*a* is closed the vertical speed motor 734 continues to operate to produce an indicated rate of descent and a loss of altitude. When only a few feet of altitude are indicated, the switch 791*a* controlled by cam 791 is opened. As previously explained, the opening of this switch, inasmuch as the hook switch 816 is in the open position, will result in a de-energization of the leveling jack relay 824, the altitude main relay 845 and the vertical speed zero set relay 874.

Considering first the effect of the de-energization of the leveling jack relay 824, referring to Fig. 23, it will be appreciated that this de-energization will result in a closing of the switch 824*c*. The relay 882 will be energized through the conductors 825 and 826, switch 824*c*, conductor 883 and switch 884, positioned as shown in Fig. 22 to be closed when the leveling jacks are not completely up, conductor 885, and conductor 831. The energization of relay 882 results in a closing of the switches 882*a* and 882*b*. The closing of the switches 882*a* and 882*b* completes the circuit from conductor 825 through the coil 806*a* along conductor 832, through switch 882*b*, along conductors 836 and 835, through the armature 806*b* of motor 806, conductors 834 and 886 through switch 882*a* and thence along conductor 831 to the other side of the 110 volt source. Accordingly, the leveling jacks motor 806 will be energized to move the leveling jacks 804 upwardly until they engage the plates 810 affixed to the subframe 27 of fuselage 22. The physical location of switch 884 is shown in Fig. 27, and as soon as the leveling jacks 804 engage the plates upon the bottom of fuselage 22, the switch 884 opens, stopping the leveling jack motor 806.

At the same instant, the switch 842 also shown in Figs. 22 and 23 is opened and the turbine 62 stops, rendering the stick control 39 and pedals 26 inoperative to produce movements of the fuselage 22.

In this manner the student realizes that the plane represented by the fuselage is assumed to have reached the ground.

The de-energization of the altitude main relay 845 results in an opening of the switch 846 and the cloud projector lights are turned off. Switch 850 is opened and the recorder 30 stops. Switch 854 is opened, stopping the altitude motor 760, and switch 863 is opened, stopping the telechron motor 765. At the same instant the switch 870 is closed, energizing the relay 775, and as seen in Fig. 20, the driving connection between shaft 767 and gear 777 will be broken, thereby preventing any change in the indicated assumed altitude, as well as a rotation of the shaft 783 and 786 and the cams mounted thereupon.

Finally, considering the effects of the de-energization of the vertical speed zero set relay 874, it will be appreciated that the switches 874*a* and 874*c* will be opened and the switches 874*b* and 874*d* will be closed. Referring now to Fig. 20, it will be seen that a fixed bracket 887 is provided, and this bracket carries the fixed rod 888 to which the fixed contact 889 is affixed. The fibre gear 757 carries a pair of split contact segments 890 and 891, each having an ear 890*a* and 891*a* arranged to be contacted by the contact 889 when the gear 757 is rotated. The split contact segments 890 and 891 as well as the fixed contact 889 are also shown in Fig. 23. A brush 892 is arranged to be in electrical contact with the split contact segment 890, and a brush 893 is similarly arranged with respect to contact 891. Conductor 894 connects brush 892 with the switch 874*d* as shown and conductor 895 connects brush 893 with switch 874*b*, as shown.

Just before the trainer reaches the altitude at which the altitude main relay 845 is de-energized, it will be appreciated that the gear 757 in Fig. 20 will normally be in the dive position, and therefore that the fixed contact 889 will be in engagement with the split contact segment 890. Accordingly, as soon as relay 874 is de-energized and switch 874*d* is closed, the coil 734*c* of the reversible followup motor 734 is shorted through the conductor 878, the hook switch 816*a*, conductor 880, switch 874*d*, conductor 894, brush 892, segment 890, and the contact 889. The reversible followup motor 734 in Fig. 20 will therefore be energized to rotate its output shaft counterclockwise, or in the dive direction, and through the provided gear train the cam 746 will be rotated counterclockwise and the gear 757 carrying the split contact segments 890 and 891 will also be rotated counterclockwise. When the segments 890 and 891 are returned to the zero vertical speed position, the contact 889 will become disengaged from the contact segment 890 and the followup motor 734 will be de-energized. At the same time the potentiometer rotor 758 and rack 748 will be placed in the zero vertical speed position and the vertical speed transmitter 752 will cause the vertical speed indicator 754 in Fig. 8A to indicate an assumed vertical speed of zero. At the same time the segment 891, brush 893, conductor 895, switch 874*b* and conductor 876 assist in accurately repositioning gear 757, rotor 758 and rack 748 by shorting out coil 734*b* and causing motor 734 to run in the climb direction to the zero vertical speed positions should the occasion require, as for example, coasting of motor 734 after the zero positions are reached.

The student having completed his flight, the engine may be shut off in the conventional manner, and all of the instruments will return to their normal dead indications.

*Landing gear, wing flaps and cowl flaps*

Aircraft of the type being simulated are provided with retractable landing gear and with wing flaps, the functions of which are so well known to those skilled in the art that they need not be discussed in detail at this time. It is well known that within the cockpit of the aircraft there is provided an instrument which indicates to the pilot the instant positions of the three landing wheels as well as of the wing flaps. Also aircraft of the type being simulated are provided with engine or cowl flaps which may be selectively opened and closed by the pilot in order to maintain the cylinder head temperature within the desired limits.

The apparatus of this invention discloses means whereby the operation of the wing flaps, retractable landing gear and cowl flaps of a real aircraft may be simulated. The apparatus in question is intended to simulate the operation of hydraulically operated wing flaps, landing gear and cowl flaps, but it will be appreciated by those skilled in the art that many parts of this simulating system may be used to simulate the operation of electrically controlled landing gear, wing flaps and cowl flaps.

Reference is now made to Fig. 24 where the electrical diagram of the simulating apparatus is shown. In Fig. 24 it will be seen that an indicator 896 is provided, this indicator including a dial 896*a*, and a needle 896*b* is mounted for movement over the dial. Dial 896*a* is calibrated in a manner simulating the calibrations of the hydraulic system pressure indicator of an actual aircraft provided with a hydraulic system for operating the landing gear, wing flaps and cowl flaps. The electronic circuit which controls the reading of indicator 896 is substantially identical with the previously described circuits for regulating the reading of the manifold pressure gauge, etc., and therefore will not be described in detail. It is sufficient to know that a potentiometer 897 is provided and the rotor 897*a* of this potentiometer is set so that under normal conditions the indicator 896 indicates an assumed hydraulic pressure of 1500 pounds per square inch. The right end of potentiometer 897 is connected to ground through the conductor 898, switch 899*a* under the control of relay 899, conductor 900, switch 901*a* under the control of relay 901, conductor 902, switch 903*a* under the control of relay 903, conductor 904, switch 905*a* under the control of relay 905, conductor 906, switch 907*e* which forms a part of the selector switch 907, conductor 908, and switch 909*a* which is under the control of relay 909. The relays 899, 901 and 903 are normally de-energized, and consequently switches 899*a*, 901*a*, and 903*a* are normally closed, while relay 905 is normally energized, as will appear shortly, closing switch 905*a*. Accordingly, when the selector switch 907 is placed in the "system" position, as the corresponding switch in a real plane is placed when the hydraulic system is properly functioning, the electronic circuit of indicator 896 is completed, and indicator 896 indicates the normal hydraulic pressure of 1500 pounds per square inch. (Relay 909, also shown in Fig. 13, is energized with the master relay 414.)

The engine pump failure relay 905 is normally energized through the switch 910 which is closed upon energization of the master relay 414, the conductors 911 and 912 which connect with the lower side of the engine pump failure relay 905, and through the conductor 913, the instructor-operated engine pump failure switch 914 which is closed when the instructor assumes that the engine pump is properly operating, and conductors 915 and 916 which connect with the other side of the 110 volt source.

Accordingly, when the engine pump is assumed to be properly working and no other difficulties are assumed to be present, the pressure indicator 896 indicates an assumed hydraulic pressure of 1500 pounds per square inch. Such is the case regardless of the position of the student's selector switch 907, because conductor 906 connects with the conductor 908 at all times.

Also in Fig. 24 it will be seen that the conductor 916 connects with the conductor 911 which connects with the 110 volt source through switch 910. Conductor 916*a* connects with conductor 916 and with the field coil winding 917*a* of the cowl flaps motor 917; conductor 916*b* connects with conductor 916 and with the field coil winding 918*a* of the landing gear motor 918; while conductor 916 connects with the field coil winding 919*a* of the wing flaps motor 919. The other side of field coil winding 917*a* of the cowl flaps motor 917 is connected through conductor 920 with the upper terminal 921*a* of the cowl flaps line break switch 921. When the instructor assumes that there is no break in the wing flaps hydraulic line, the rotor of switch 921 engages terminal 921*a*, and conductor 920 is connected with the conductor 922 which connects with the gang 907*b* of switch 907. When switch 907 is in the "system" position, as is normally the case, conductor 922 is connected through gang 907*b* with the conductor 923 which connects with the right terminal 914*b* of the instructor's engine pump failure switch 914. This switch is closed when the instructor assumes the engine pump is properly operating, and accordingly conductor 923 is connected with conductor 915 which connects with the other side of the 110 volt source. Accordingly, when the instructor assumes that the engine pump and cowl flaps line are in operating condition, 110 volts is impressed across the field coil winding 917*a* of the cowl flaps motor 917.

At the same time it will be noted that the upper side of field coil winding 918*a* of the landing gear motor 918 is connected through conductor 924 with the upper terminal 925*a* of the landing gear line break switch 925 which is under the control of the instructor. When the instructor assumes that the engine pump is properly operating, the rotor of this switch engages the terminal 925*a*, and therefore connects conductor 924 with conductor 926 which runs to the gang 907*d* of the selector switch 907. In normal operation this switch is in the "system" position as shown and connects conductor 926 with the conductor 923 which, as explained, connects with the other side of the 110 volt source. Accordingly, when the instructor assumes that the engine pump and the landing gear hydraulic line are in proper operating condition, and the switch 907 is in the "system" position, 110 volts is always impressed across the field coil winding 918*a* of the landing gear motor 918.

Also, in Fig. 24, it will be seen that in normal operation, the upper side of field coil winding 919*a* of the wing flaps motor 919 is connected through conductor 927 with the upper terminal 928*a* of the wing flaps line break switch 928. When the instructor assumes there is no break in the wing flaps line, the rotor of switch 928 contacts terminal 928*a*, connecting conductor 927 with the conductor 929 which is connected with the conductor 923 through the wing flaps bank 907*c* of switch 907 when the latter switch is in the "system" position. It has previously been shown that conductor 923 connects with the other side of the 110 volt source. Accordingly, when the system is assumed to be in perfect operation 110 volts is impressed across the field coil winding 919*a* of the wing flaps motor 919.

Reference is still made to Fig. 24 where the potentiometer 930 is designated "Right wheel." The conductor 931 is connected to the negative terminal of the 24 volt D. C. source and connects to the adjustable arm 932 which engages potentiometer 930. Also conductor 933 connects with the positive terminal of the D. C. source and connects with the adjustable arm 934 which engages the potentiometer 930. The arms 932 and 934 are used in initial adjustment to place the 24 volt voltage across the desired portion of potentiometer 930. The potentiometer rotor 935 is connected through the conductor 936 with the terminal C upon the back of the flaps and landing gear indicator 937, the front portion of which is shown in Fig. 25. Also in Fig. 24 it will be seen that the positive terminal of the D. C. source is connected to the terminal A while the negative terminal is connected to the uppermost terminal of the indicator 937. The indicator 937 is of standard aircraft type and therefore its interior construction need not be explained. In Fig. 25 it will be seen that this indicator comprises a metal disc 938 having an opening 939 and an indicating element 940 is pivoted behind the disc 938. Beneath the cutout portion 939 is the designation "R," meaning that the position of the indicating element 940 indicates to the student the instant assumed position of the right wheel.

In Fig. 24, the conductor 942 connects to the potentiometer 930 at the terminal 941, the other end of conductor 942 being connected to the switch 943 labelled "Down" which is under the control of the instructor. Switch 943 may be moved into and out of engagement with the fixed contact 947. Also the conductor 945 connects with potentiometer 930 at the terminal 944, as well as with the switch 946 labelled "Up" which is under the control of the instructor. Switch 946 may be moved into and out of engagement with the fixed contact 948.

The output shaft of the landing gear motor 918 is designated 949, and it will be seen that the potentiometer rotor 935 is mounted upon this output shaft for rotation therewith. Also mounted upon the shaft 949 is the contact 950 which will engage either or neither of the fixed contacts 951 or 952, depending upon the rotatable position of the output shaft 949. The movable contact 950 is connected through the conductor 951*a* with the common terminal of the two shading coils 952*a* and 953 of landing gear motor 918. Fixed contact 951 is connected through conductor 954 with the upper end of coil 953, while fixed contact 952 is connected through conductor 955 with the lower terminal of coil 952*a*. Accordingly, when the landing gear control switch 956 is placed in the "up" position, the coil 953 is shorted, and when placed in the "down" position, the coil 952*a* is shorted.

Assuming that the student is in the course of a "flight" in the fuselage 22, when the indicating element 940 is positioned as shown in Fig. 25 to indicate that the right wheel is assumed to be in the half retracted position, the potentiometer rotor 935 is positioned as shown in Fig. 24. If the student desires to move the right landing wheel into the "locked up" position, the student will place his landing gear control switch 956 in the "up" position, thereby shorting the shading coil 953 of the landing gear motor 918. This motor will therefore run in such a direction as to rotate the rotor 935 clockwise as seen in Fig. 24, moving the upper end of this rotor along potentiometer 930 toward the terminal 944. The movement of rotor 935 applies a progressively decreasing voltage through the conductor 936 to the terminal C of instrument 937, and referring to Fig. 25, the indicating element 940 will progressively move clockwise, thus indicating to the student that the right landing wheel is gradually being moved upwardly.

The lower end of rotor 935 at the same time moves toward fixed contact 948 and will strike this contact before the upper end of the rotor engages the terminal 944. Assuming that the instructor's antilock switch 946 is closed, the instant the lower end of rotor 935 contacts the fixed contact 948, the potentiometer rotor 935 is connected to the terminal 944 through the conductor 945, switch 946 and contact 948, so that no voltage is applied along the conductor 936 to the C terminal of indicator 937. Accordingly, the indicating element 940 in Fig. 25 will snap upwardly so that the outer end of indicator 940 is out of sight behind the disc 938, and the student will know that the right landing wheel is assumed to be in the "locked up" position.

On the other hand, should the instructor open the antilock switch 946, when the lower end of potentiometer arm 935 engages the fixed contact 948, the contact 950 which is affixed upon the output shaft 949 of motor 918 is arranged to engage the fixed contact 952. The engagement of contact 952 by contact 950 will also result in a shorting of the coil 952*a*, and inasmuch as coil 953 is shorted by the switch 956, motor 918 will stop. Accordingly, rotor 935 will not be placed in electrical contact with the contact 944, but a certain portion of the potentiometer 930 will be between these two elements. Accordingly, a slight voltage is taken off potentiometer 930 by rotor 935, and the indicating element 940 in Fig. 25 will remain completely visible to the student, and he will realize that the right wheel 939 is not locked in its "up" position.

As in the case of a plane in actual flight, the only recourse open to the student is to maneuver the fuselage, in an irregular manner, to simulate the irregular maneuvering of a plane which the pilot might cause in order to get the landing wheel to lock. If the instructor desires to indicate to the student that he has succeeded in locking the right landing wheel, the instructor merely closes the switch 946, and the indicating element 940 in Fig. 25 is snapped into the "locked up" position.

Assuming now that the student has succeeded in placing the right landing wheel in its "locked up" position, and that he desires to lower the same, as he would do before making a landing, he places the landing gear control switch 956 in the "down" position, and in so doing, the coil 952*a* is shorted, coil 953 being unshorted. Motor 918 runs in the opposite direction from that previously described above, and the potentiometer rotor 935 moves counterclockwise along potentiometer 930 toward the terminal 941. An increasingly higher voltage will be passed from the potentiometer along rotor 935 and conductor 936 to the terminal C of instrument 937. In Fig. 25 the indicating element 940 will progressively move counterclockwise, thus indicating to the student a progressive lowering of the right landing wheel.

If the instructor has his antilock switch 943 in the closed position, the lower arm of potentiometer arm 935 will contact the fixed contact 947 before the upper end thereof engages the contact 941. Accordingly, the circuit from contact 941 through conductor 942, switch 943 and contact 947 to rotor 935 will be completed, and the maximum voltage will be fed along conductor 936 to the terminal C of instrument 937. The indicating element 940 will quickly move counterclockwise so that the unpivoted end thereof is hidden behind the disc 938, thus indicating to the student that the right landing wheel is in its "locked down" position. On the other hand, should the instructor desire to simulate the failure of the right landing wheel to lock in the down position, he merely opens switch 943, preventing the maximum voltage from being passed by the rotor 935 to the instrument 937 when rotor 935 engages contact 947. At this instant, contact 950 carried by shaft 949 engages the fixed contact 951, shorting coil 953. Inasmuch as coil 952 is shorted by switch 956, motor 918 stops. Accordingly, the indicating element 940 will not have its lower end hidden by the disc 938, and the student will know that the wheel has failed to lock. In an effort to lock the wheel the student may manipulate fuselage 22, as previously explained, and if the instructor desires to indicate to the student that he has successfully accomplished his objective, by closing of the switch 943 the instructor may cause the indicating element 940 to quickly move to its most counterclockwise position, thus indicating to the student that the wheel is in its "locked down" position.

The raising of the landing gear by the student from the "locked down" position is accomplished in the same manner as when the wheels are assumed to be in an intermediate position.

In Fig. 24 it will also be noted that the potentiometer 930*a* labelled "Tail wheel" and the potentiometer 930*b* labelled "Left wheel" are also provided, together with the other elements described above as being associated with the potentiometer 930. Corresponding elements in the tail wheel and left wheel potentiometer control circuits are designated by the same number as the element of the right wheel control circuit, with the exception that the suffix "*a*" is used to designate the elements of the tail wheel circuit, and the suffix "*b*" is used to designate the elements of the left wheel circuit. The elements of the tail wheel and left wheel circuits are operated in exactly the same manner and simultaneous with the operation of the elements of the right wheel circuit, so that the tail wheel indicator 940*a* and the left wheel indicator 940*b* move at all times with the right wheel indicator 940. A detailed explanation of the tail wheel and the left wheel circuits is therefore deemed unnecessary.

It will therefore be appreciated that this invention discloses a landing gear indicator which is under the control of the student by means of controls simulating the landing gear controls of an actual aircraft. The student may place the landing gear in any desired assumed position by means of controls provided for his manipulation, and the system includes an indicator which operates in a manner to simulate the operation of the landing gear indicator in an aircraft. The instructor may simulate the failure of real landing gear to lock.

Still referring to Fig. 24 it will be seen that the cam 957 is mounted upon the shaft 949 for rotation therewith, and that the switch 957*a* is under the control of cam 957. The solenoid 958 is connected to the 110 volt source through the switch 957*a*. The cam 957 is arranged to close switch 957*a* whenever the landing gear are assumed to have reached their "down" position. Referring now to Fig. 20, the solenoid 958 is shown, and it will be seen that the core 959 of this solenoid is pivotally connected to the lever 960, the other end of which is pivotally connected to the core 961 of solenoid 962. A string 963 encircles the housing 588 of Selsyn receiver 587, the other end of this string being connected to one end of spring 964, the other end of which may be suitably anchored to a fixed part of the unit. Whenever the landing gear reach their "down" position, the solenoid 958 is energized, pulling the string 963 which is attached to housing 588 in such a manner as to rotate the housing clockwise as seen in Fig. 20. Such a rotation of this housing produces the same effect as a climbing of fuselage 22, i. e., a decrease in assumed air speed. All of the apparatus shown in Fig. 20 will properly respond to this decrease in assumed air speed caused by the lowering of the landing gear. On the other hand, when the landing gear is retracted it will be appreciated that solenoid 958 will be de-energized and spring 964 will rotate housing 588 counterclockwise, thus removing the effect of the lowered landing gear upon assumed air speed.

Considering now the effect of the student's operating the engine or cowl flaps, referring to Fig. 24, it will be seen that the motor 917 has two shading coils either of which may be selectively shorted by the student's cowl flap switch 967. The limit switch 968 which is mounted upon the output shaft 969 of the cowl flap motor 917 is arranged to contact neither or either of the fixed contacts 970 or 971 to short neither or either of the coils 966 or 965, depending upon the position of shaft 969. The potentiometer arm 343*b* which engages the potentiometer 343 is also affixed upon shaft 969 for rotation therewith. Potentiometer 343 and rotor 343*b* are shown in Fig. 9 to form a part of the cylinder head and oil temperature indicating circuits. Also shown in Fig. 9 is the potentiometer 970, the rotor of which is designated 970*a* and is under the control of the instructor. It will be appreciated that the instructor may change the position of rotor 970*a* relative to potentiometer 970 thereby affecting the indications given by the cylinder head temperature indicator 333 and the oil temperature indicator 337. If the student sees that either the indicated cylinder head or oil temperature readings are outside operating limits, he may, by means of the cowl flaps switch 967 cause the motor 917 to run in the correct direction, thereby positioning the rotor 343*b* with respect to potentiometer 343 to bring the readings back within the required limits. For example, if the cylinder head and oil temperature indications are too high, the switch 967 may be placed in the "open" position, thereby shorting coil 966, and causing motor 917 to run, moving the potentiometer arm 343*b* to the right in Figs. 9 and 24. Accordingly, the plate current in Fig. 9 will be decreased and the indicating needles 333*b* and 339 will move counterclockwise, indicating lower assumed cylinder head and oil temperatures. On the other hand, should the readings in question be too low, the switch 967 is placed in the "close" position, causing the rotor 343*b* to move in the opposite direction, resulting in an increased plate current and in a higher indicated cylinder head and oil temperature.

When the switch 967 is placed in the "open" position, the contact 968 carried by shaft 969 engages the fixed contact 971 before the rotor 343*b* reaches the limit of travel along potentiometer 343. The shorting of coil 965 will result in a stopping of motor 917. On the other hand when switch 967 is in the "close" position, the rotation of shaft 969 will result in engagement between the contacts 968 and 970, shorting coil 966 before rotor 343*b* reaches the limit of its travel.

Considering now, in Fig. 9, the function of relay 341*a* and the switch 341 controlled thereby, when the cylinder head temperature reaches a predetermined reading, e. g., 215 degrees, the current through the relay is sufficient to close the switch 341. Referring to Fig. 19, it will be seen that when switch 341 closes the circuit is completed from ground through conductor 513 and switch 341, conductors 514 and 515, through coil 516 back to ground. Coil 516 is shorted, and motor 517 is energized to rotate the cams 520, 519, and 518. Accordingly, the tachometer needle 381*b* in Fig. 10 and manifold pressure gauge needle 309 in Fig. 8, will flutter as previously described, and the loud speaker 438 will aurally indicate to the student impending engine failure.

If the student does not correct the cylinder head temperature reading by an operation of the cowl switch 967 seen in Fig. 24, and the cylinder head temperature continues to increase, when a higher predetermined cylinder head temperature is reached, e. g., 265 degrees, the current through relay 342*a* is sufficient to open the switch 342. Referring to Fig. 13, it will be seen that the opening of switch 342 will result in complete engine failure.

Accordingly, cylinder head temperature and oil temperature are controlled by the mixture, supercharger, and throttle levers as well as by the instructor, and the student must by means of the engine or cowl flaps control maintain these temperatures within proper operating limits, or engine failure will result.

Considering now the operation of the apparatus provided herein for simulating the operation and effect of the wing flaps of an actual aircraft, referring to Fig. 24 it will be seen that there is provided the potentiometer 972 connected to the 24 volt D. C. source through the conductors 931 and 933, and the adjustable contacts 973. The rotor of potentiometer 972 is designated 974 and is connected by means of conductor 975 with the terminal B of instrument 937. The position of the flaps indicating element 976 shown in Fig. 25 is controlled by the voltage transferred from potentiometer 972 to the rotor 974 and along conductor 975 to the instrument 937. Rotor 974 is mounted upon the output shaft 977 of the wing flaps motor 919.

The conductor 982 connects with the left fixed contact 981 and the lower end of coil 979, while conductor 983 connects the contact 980 which is affixed upon the output shaft 977 with the conductor 988 which connects with the upper end of coil 979 and the lower end of coil 978. The fixed right contact 981 is connected with the upper end of coil 978. It will therefore be appreciated that when contact 980 engages the left contact 981, coil 979 is shorted, and when contact 980 engages the right contact 981, coil 978 is shorted. Conductor 986 connects the upper end of coil 978 with the "down" terminal of the student's wing flap control switch 985, the movable contact of which is designated 985*a*. Conductor 987 connects the lower end of coil 979 with the "up" terminal of switch 985. At the same time conductor 988 connects the common end of the coils 978 and 979 with the instructor's wing flap electrical failure switch 989 which is connected through conductor 990 with the switch member 985*a*. The student's auxiliary wing flaps switch 991 is connected through the fixed contact 992 and conductor 985 with the "down" terminal of switch 985, and the student's second auxiliary wing flaps switch 993 is connected through the fixed contact 994 and conductor 995 with the conductor 987. Also, the movable switch members 991 and 993 are connected to one another through conductor 996.

In the operation of the wing flap simulating mechanism, when the flaps indicator 976 is positioned as shown in Fig. 25, the potentiometer rotor 974 is positioned intermediate the contacts 973 as shown in Fig. 24. Should the student desire to place the flaps in the "up" position, the movable contact 985*a* of switch 985 will be placed in engagement with the "up" contact. Assuming that the instructor has the wing flaps electric failure switch 989 closed, as will be the case when there is assumed to be no electrical failure of the system, it will be appreciated that the coil 979 will be shorted through the conductor 988, switch 989, conductor 990, switch 985 and conductor 987. An energization of motor 919 will result and a movement of potentiometer 974 to the left in Fig. 24 occurs. The running of motor 919 and gradual movement of rotor 974 will result in a decrease of voltage being applied along conductor 975 to the terminal B of indicator 937, and in Fig. 25 the flaps indicator 976 will gradually move counterclockwise, thus indicating to the student a gradual raising of the wing flaps. At the same time the rotation of shaft 977 will result in a gradual counterclockwise movement of the contact 980 in Fig. 24, and when the indicating element 976 in Fig. 25 reaches the zero position, contact 980 engages the right contact 981, thereby shorting coil 978, and resulting in a stopping of motor 919. If the student then desires or at any later time desires to simulate the lowering of the wing flaps, the switch member 985a is put upon the "down" terminal of switch 985, and coil 978 will be shorted through the conductor 986, switch 985, conductor 990, switch 989 and conductor 988, resulting in an energization of motor 919 in the opposite direction, and a movement of the rotor 974 to the right in Fig. 24. Accordingly, the voltage applied to the indicator 937 will gradually increase, resulting in a gradual counterclockwise movement of the flaps indicator 976 in Fig. 25, thus indicating to the student a gradual lowering of the wing flaps. At the same time the movable contact 980 will be moved clockwise in Fig. 24, and when the flaps indicator 976 reaches the 100% or completely down position, contact 980 will engage the right contact 981, resulting in a shorting of coil 979 and in a stopping of motor 919.

Still referring to Fig. 24, it will be seen that the cam 997b is mounted upon the output shaft 977 of the wing flaps motor 919, and that this cam controls the switch 977a which in turn controls the energization of the solenoid 962. Cam 997b is adjusted so that when the wing flaps indicator element 976 reaches the completely "down" position, switch 977a is closed energizing solenoid 962. Referring to Fig. 20, it will be seen that when solenoid 962 is energized, the core 961 is moved to the left, resulting in a pulling upon string 963, and in a clockwise rotation of housing 588 of the Selsyn receiver 587. Such a rotation of housing 588 will, as previously explained, result in a decrease in indicated assumed air speed as well as affecting the operation of the apparatus shown in Fig. 20 which is dependent upon assumed air speed.

It will be appreciated that as soon as the wing flaps are raised, the cam 997b opens the switch 977a, resulting in a de-energization of solenoid 962, and referring to Fig. 20, the spring 964 will rotate the housing 588 counterclockwise to its original position.

Referring now back to Fig. 24, should the instructor desire to simulate failure in the electrical portion of the flaps system of the aircraft being simulated, he merely opens the switch 989. It will then be seen that the student can not operate the wing flaps by merely placing the switch 985a into the desired position. If the student desires to move the wing flaps up, he closes the switch 993, and the coil 979 will be shorted through the conductors 988 and 996, switch 993, contact 994 and conductors 995 and 987, resulting in a rotation of motor 919 such as to produce an indication of the raising of the wing flaps. On the other hand, if the instructor has the switch 989 open, and the student desires to move the wing flaps into the "down" position, the student must close the auxiliary wing flaps switch 991, and coil 978 will be shorted through the conductor 988, switch 991, contact 992, and conductor 986, resulting in an indication of a raising of the wing flaps.

The apparatus shown in Figs. 24, 25 and 26 is also operable by the student in a manner similar to the manner in which he would operate the various controls of the hydraulic wing flaps, cowl flaps and landing gear systems in a real aircraft when failure of the hydraulic system to operate the landing gear, wing flaps and cowl flaps in the usual manner occurs. These failures are ordinarily in the form of a failure of the engine pump which provides the pressure to operate the hydraulic systems, or a failure in the hydraulic lines leading to the landing gear actuating mechanism, the wing flap actuating mechanism, or cowl flap actuating mechanism.

First, there will be disclosed means for simulating engine pump failure and the method in which the student may overcome this failure in order to position the landing gear, wing flaps or cowl flaps in the desired manner. In actual aircraft, when the engine pump fails, the pressure within the hydraulic lines is released, and the pressure indicator shows a pressure of zero. When the selector control is in the "system" position, if the pilot attempts to operate either the wing flaps, landing gear or cowl flaps in the previously described manner, the indicators will not show a change in position of these elements. The pilot will successively place the selector switch in the "landing gear," "wing flaps," and "cowl flaps" positions in an effort to ascertain whether the difficulty lies in any one of the three main lines. The pressure indicator will indicate a pressure of zero in all instances and accordingly the pilot will draw the conclusion that it is the engine pump which has failed because it would be unusual for all of the other three lines to fail at the same time.

If then the pilot desires to change the position of the landing gear, the wing flaps or the cowl flaps, he must place the selector switch in the corresponding position and by means of a hand pump, gradually build up the pressure within the line in question, this building up of pressure not only producing a gradual increase in the indication given by the pressure indicator, but also gradually changing the position of the elements being moved.

The apparatus disclosed herein simulates such operations in the following manner: Referring to Fig. 24, when the instructor desires to produce an engine pump failure, he merely opens the engine pump failure switch 914. The circuit of the engine pump failure relay 905 which comprises the conductors 911, 912, relay 905, conductor 913, switch 914, and conductor 915 will be opened. The de-energization of the relay 905 will result in an opening of switch 905a, and inasmuch as this switch is in the control circuit of the pressure indicator 896, the indicating circuit is changed from potentiometer 897 to conductor 1050, through potentiometer 1012, to conductor 1051, through bank 907f to conductor 1051a, through bank 907e and conductor 908 and switch 909a to ground. Inasmuch as the full value of potentiometer 1012 will be in the circuit, the indicated pressure given by indicator 896 will be zero.

Also the opening of the instructor's engine pump failure switch 914 will break the circuits of the field coils of the cowl flaps motor 917, the landing gear motor 918 and the wing flaps motor 919. Accordingly, should the student operate the engine flaps control 967, the landing gear control 956, or the wing flaps control 985, it will be appreciated that neither of these three motors will run and accordingly, no change in the position of the indicators shown in Fig. 25 will result.

Also a repositioning of the selector switch 907 from the "system" position to the "landing gear," "wing flaps," or "cowl flaps" position will not render operative either of the motors 917, 918 or 919 because the opening of the engine pump failure switch 914 breaks the field coil circuit of each of these motors.

At all times during this switching process, the pressure indicator 896 continues to indicate a pressure of zero pounds, and therefore the student knows that the failure is one common to the entire system and that the probable cause is an engine pump failure.

Accordingly, the student realizes that if he wants to reposition the cowl flaps, landing gear or wing flaps he must do so by means of the hydraulic hand pump which is also provided.

Referring to Fig. 26, it will be seen that there is provided a hand pump 1000, the movements of which are resisted by the shock absorber 1001. The hand pump is pivotally mounted upon the fixed rod 1002 and drives the sector 1003 which in turn drives the sector 1004, this latter sector being freely mounted upon the rotatable shaft 1005. The sector 1004 carries a dog 1006 which is arranged to engage the ratchet 1007 affixed upon shaft 1005. Spring 1008 carried by the sector 1004 maintains the dog 1006 in position to engage the ratchet. A gear 1009 is affixed upon the left end of shaft 1005 and drives the gear 1010 which is freely mounted upon the rotatably mounted shaft 1011, this last shaft forming the rotor of potentiometer 1012. A clutch member 1013 is slidably mounted upon shaft 1011, and has a groove 1014 in which lie a pair of ears 1015 (only one shown) carried by the upper ends of the arms 1016, the lower ends of which are fixed to the rod 1017. Arm 1018 has one end affixed to the rod 1017 which may be suitably rotatably mounted in brackets (not shown), and the right end of this arm is pivotally attached to the upper end of the core 1019 of the solenoid 1020. A torsion spring 1021 encircles shaft 1011 and is arranged with one end affixed to this shaft and its other end affixed to a suitable frame member in order to place a counterclockwise bias upon shaft 1011.

Affixed upon the right end of shaft 1005 is the gear 1022, driving the gear 1023 which is affixed upon the shaft 1024 which carries the assembly designated generally by 1025. Assembly 1025 includes the slip ring 1026 against which bears the brush 1027, one side of which is connected with the 110 volt source in a manner which will become later apparent. The assembly 1025 also includes the contact 1028 which is insulated from the slip ring 1026, contact 1028 being suitably grounded, as shown in Fig. 26A. The contact 1029 is carried by the metallic segment 1030 which in turn engages the slip ring 1026. Accordingly, contact 1029 is always connected to one side of the 110 volt source. The fibre gear 1031 is provided, being rotatably mounted upon the rod 1032 which is carried by a suitable frame member. Upon the side of gear 1031 adjacent the contacts 1028 and 1029 are the three arcuate contact segments 1033, 1034 and 1035, these segments being mutually insulated from one another and positioned as shown in Fig. 28A. Upon the other side of gear 1031 are the three slip rings 1036, 1037 and 1038, connected respectively to the segments 1033, 1034 and 1035. Three brushes 1039, 1040 and 1041 are provided, engaging respectively the slip rings 1038, 1037 and 1036. The reversible followup motor 1042 has a pinion 1043 affixed upon its output shaft 1044, pinion 1043 engaging the fibre gear 1031 in order to position the gear and all elements carried thereby. It will be noted that the brushes 1039, 1040 and 1041 are connected to motor 1042 through the respective conductors 1045, 1046 and 1047.

Referring to Fig. 24, it will be seen that normally contact 1028 engages both of the segments 1033 and 1034, and when such is the case both of the coils 1042*a* and 1042*b* of motor 1042 are shorted. Coil 1042*a* is shorted through the circuit comprising ground, contact 1028, segment 1034, brush 1040, conductor 1046, coil 1042*a* and ground, while coil 1042*b* is shorted through the circuit comprising ground, contact 1028, segment 1033, brush 1041, conductor 1047, coil 1042*b* and ground.

Referring now to Fig. 24, it will be seen that the conductor 1045 connects with the 110 volt source through conductor 912, and that the conductor 1048 connects one side of the field coil winding of motor 1042 with conductor 1045. The other side of the field coil of this motor is connected through the conductor 1049 with the conductor 911 which connects with the other side of the 110 volt source. Accordingly, 110 volts is impressed across the armature of motor 1042 at all times.

Accordingly, when the student finds that the engine pump has failed and that he wishes to, let us assume, lower the landing gear prior to making a "landing" in the trainer, the student must place his landing gear control switch 956 in the "down" position. The student then pulls back on the hand pump 1000 and then presses the same forward. The clockwise rotation of the hand pump, through sector 1003, sector 1004, and the ratchet arrangement will result in a counterclockwise rotation of the shaft 1005 and in a clockwise rotation of the shaft 1024. The contacts 1028 and 1029 move clockwise as seen in Fig. 26—counterclockwise as seen in Fig. 24. It will be appreciated that the movements of shafts 1005 and 1024 are of slight angular value because of the ratchet arrangement. The counterclockwise rotation in Fig. 24 of the contact 1029 brings this contact into engagement with the split contact segment 1035. Current will then flow from the 110 volt source through the conductors 912 and 1045 to the brush 1039, through the contact 1035 and contact 1029, along brush 1027 to the right along conductor 923 and up to the rotor of the bank 907*d* of the selector switch 907. Inasmuch as switch 907 is in the "landing gear" position, current will flow along conductor 926 through the instructor-controlled landing gear line break switch 925, which will be closed because the instructure assumes that there is no break in the landing gear line. Current then travels along conductor 924 to the upper side of the field coil winding 918*a* of the landing gear motor 918. The lower side of this motor is always connected to the other side of the 110 volt source in the usual manner. Accordingly, the landing gear motor 918 will be energized and this motor will run in the previously described manner to move the landing gear indicator elements 940, 940*a* and 940*b* toward the "down" position.

At the same instant that the contact 1029 moves counterclockwise to engage the split contact segment 1035 to energize the landing gear motor 918, the grounded contact 1028 will also move counterclockwise through an equal angle to move out of engagement with segment 1034 but will remain in engagement with segment 1033. Accordingly, the circuit comprising coil 1042*a* of the reversible followup motor 1042 will be opened. Motor 1042 will therefore start to run at the same instant that the landing gear motor 918 starts to run. Motor 1042 will be energized in such a direction that its output shaft 1044 and the pinion 1043 affixed thereupon rotate the gear 1031 clockwise as seen in Fig. 26—counterclockwise as seen in Fig. 24. Accordingly, the split contact segments 1033, 1034 and 1035 will be rotated counterclockwise in Fig. 24, and in an instant the segment 1035 will become disengaged from the contact 1029 and the segment 1034 will become engaged with the contact 1028. Accordingly, the circuit to the landing gear motor 918 will be broken and the downward movement of the landing gear indicators 940, 940a and 940b in Fig. 25 will stop. Also, the reengagement of contact 1028 with segment 1034 will stop motor 1042. However, the student will continue to successively reciprocate the hydraulic pump simulating lever 1000 and with each stroke the contact 1029 will engage the segment 1035 and contact 1028 will move out of engagement with segment 1034, energizing the landing gear motor 918 and the followup motor 1042 for successive short intervals of time. Accordingly, as the student continues to reciprocate lever 1000, the landing gear indicators in Fig. 25 will gradually move toward the "down" position.

At the same time that the motor 1042 runs in response to the reciprocating of the handle 1000, it will be appreciated that the rotor 1011 of potentiometer 1012 will be moved clockwise in Fig. 26—counterclockwise in Fig. 24. In Fig. 24 it will be seen that the circuit of the hydraulic pressure indicator 896 will be completed through the potentiometer 897, conductor 898, switch 899a, conductor 1050, rotor 1011, potentiometer 1012, conductor 1051, bank 907f of switch 907, conductor 1052, switch 899b, conductor 1053, bank 907e of switch 907, conductor 908 and switch 909a. As the potentiometer 1011 moves counterclockwise in Fig. 24 by the successive reciprocation of handle 1000, the resistance of the circuit of indicator 896 is successively decreased, allowing a larger current to flow therethrough, causing the indicating needle 896b to move clockwise, thus indicating to the student a higher assumed hydraulic pressure in the landing gear line.

The gradual moving downwardly of the landing gear indicators and the gradual increase in indicated pressure of the indicator 896 accurately simulates the responses in a real plane to the operation of the hydraulic hand pump, made necessary by a failure of the engine pump.

Assuming that the student has succeeded in lowering the landing gear previous to his coming in for a "landing" and that he now wants to lower the wing flaps, as is normally the case, the selector switch 907 is moved from the "landing gear" position to the "wing flaps" position. In Fig. 24 as the rotor of the bank 907a moves from the "landing gear" terminal to the "wing flaps" terminal, there will be a moment when this rotor contacts neither of these two terminals. Accordingly, the normally closed circuit comprising conductor 911, relay 1060, conductor 1061, bank 907a, conductor 1062, conductor 1063, and conductor 912 will be momentarily broken and the relay 1060 will be de-energized. The normally open switch 1060a under the control of relay 1060 will be momentarily closed and the circuit comprising conductor 911, switch 1060a, conductor 1064, solenoid 1020, conductor 1063 and conductor 912 will be closed, resulting in an energization of the solenoid 1020.

Referring to Fig. 26, when solenoid 1020 is energized the core 1019 moves downwardly, pulling the link 1018, rod 1017, arms 1016 and the clutch member 1013 to the right, disengaging clutch member 1013 from gear 1010. Accordingly, spring 1021 will rotate the shaft 1011 which forms the rotor of potentiometer 1012 counterclockwise—to the left in Fig. 24—placing the entire potentiometer 1012 in the circuit of the hydraulic pressure indicator 896, and the indicated pressure returns to zero. This accurately simulates the corresponding functioning of the pressure gauge in a real plane when, having lowered the landing gear by means of the hydraulic hand pump, the pilot switches the selector switch from "landing gear" to "wing flaps," in order that the wing flaps may then be manually lowered.

Inasmuch as the student desires to lower the wing flaps, the student's wing flap control switch 985 is placed in the "down" position, and the hand pump 1000 is reciprocated as explained before. The rotor 919a of the wing flaps motor 919 is intermittently connected to the 110 volt source through the conductor 927, switch 928, conductor 929, bank 907c of switch 907, conductor 923, brush 1027, contact 1029, segment 1035, brush 1039, conductor 1045 and conductor 912. Accordingly, the wing flaps motor 919 will be intermittently energized to properly move indicator 976, and the followup motor 1042 will intermittently operate as previously explained in connection with the landing gear system. Also potentiometer rotor 1011 will move along potentiometer 1012 to gradually decrease the resistance in the circuit regulating indicator 896, this circuit including potentiometer 897, conductor 898, conductor 1050, rotor 1011, potentiometer 1012, conductor 1051, bank 907f, conductor 1052a, the normally closed switch 901b, conductor 1053a, bank 907E, conductor 908 and switch 909. The current in this circuit will gradually increase, and the indicator 898 will gradually indicate a higher assumed hydraulic pressure in the wing flaps line.

Should the student then desire to "open" the cowl flaps, switch 907 is moved from the "wing flaps" position to the "cowl flaps" position, and in so doing relay 1060 is momentarily de-energized, switch 1060a momentarily closes, solenoid 1020 is momentarily energized, and as previously explained the rotor 1011 of potentiometer 1012 is positioned to place the full resistance value of potentiometer 1012 in the circuit of indicator 896, and this indicator shows an assumed hydraulic pressure of zero. The cowl flaps switch 967 is then placed in the "open" position to control the direction of rotation of the cowl flaps motor 917. The upper side of field coil winding 917a of the cowl flaps motor 917 is then connected to the 110 volt source through conductor 920, switch 921, conductor 922, bank 907b, conductor 923, brush 1027, contact 1029, contact segment 1035, brush 1039, conductor 1045 and conductor 912. Accordingly, the reciprocation of the hand pump 1000 will cause intermittent running of the cowl flaps motor 917 and rotor 343b is moved with respect to potentiometer to increase the resistance of this potentiometer causing the cylinder head temperature indicator 333 and oil temperature indicator 337 in Fig. 9 to indicate lower assumed temperatures. At the same time, the decreasing resistance of potentiometer 1012 increases the plate current through indicator 896, the control tubes and resistors, potentiometer 897, conductors 898 and 1050, potentiometer 1012, conductor 1051, bank 907f, conductor 1052b, switch 903b, conductor 1053b, bank 907e, conductor 908 and switch 909a, and indicator 896a shows a gradual assumed increase in hydraulic pressure within the cowl flaps hydraulic line.

At any time thereafter, should the student change the position of selector switch 907, the relay 1060 will be momentarily de-energized, switch 1060a will be momentarily closed, solenoid 1020 is momentarily energized, and the full value of potentiometer 1012 is placed in the circuit of indicator 896, resulting in an indicated assumed hydraulic pressure of zero.

On the other hand, should the student find that the engine pump has failed and that he desires to raise the landing gear or wing flaps, or close the cowl flaps, the selector switch 907 is placed in the proper position. When manually raising the landing gear, switch 956 is placed in the "up" position; when raising the wing flaps, switch 985 is placed in the "up" position; and when closing the cowl flaps, switch 967 is placed in the "close" position. The hand pump 1000 is reciprocated and all of the apparatus in Fig. 24 operates in the same manner as previously described with the exception that the direction of rotation of the motors 918, 919, or 917 is reversed, resulting in an indication of the landing gear being raised, the wing flaps being raised, or the cylinder head and oil temperature increasing, as the case may be.

The instructor, instead of desiring to simulate the effects of engine pump failure upon the hydraulic system, may decide to simulate the effect of a break in the landing gear line, the wing flap line, or the cowl flap line. Assuming that the selector switch 907 is in the "system" position and the apparatus is functioning so as to indicate to the student that he has the required hydraulic pressure, and the instructor decides to simulate the effects of a break in the hydraulic landing gear line, the switch 925 which is the landing gear line break switch is moved to contact the terminal 925b. Accordingly, the circuit comprising conductor 911, conductor 912, relay 899, switch 925, conductor 926, bank 907d, conductor 923, switch 914, and conductors 915 and 912 will be closed, energizing relay 899 and opening the switches 899b and 899a.

The energizing of relay 899 and the opening of switches 899a and 899b results in an opening of the circuit comprising indicator 896 and the indicated assumed hydraulic pressure will return to zero. If the student were then to try to operate the landing gear with the selector switch 907 in either the "system" or "landing gear" position, he would not obtain the desired normal result because the removal of switch 925 from the terminal 925a breaks the circuit to the upper side of field coil winding 918a of the landing gear motor 918. The hand pump 1000 is also ineffective to operate the landing gear because of the position of switch 925. Accordingly, when the instructor produces a simulated break in the landing gear line, the pressure indicator 896 indicates an assumed pressure of zero and there is no manner in which the student may operate the simulated landing gear. This accurately simulates the case of the plane in actual flight when a break in the landing gear line occurs.

However, should the student attempt to operate the wing flaps, he may do so even though a break in the landing gear line has occurred. As in the case of a plane in actual flight, he merely places the selector switch 907 in the "wing flaps" position, and in so doing, the connection between conductors 926 and 923 by the bank 907d is broken, resulting in a de-energization of relay 899 and a closing of switches 899a and 899b. Thereupon the indicator 896 will properly indicate an assumed pressure of 1500 pounds per square inch and the bank 907c of the selector switch 907 connects the upper side of field coil winding 919a with the 110 volt source through conductors 927, switch 928, conductor 929, bank 907c, conductor 923, switch 914, conductor 915 and conductor 912. Accordingly, the wing flaps system is not affected by a break in the landing gear line.

Also, a break in the landing gear line does not affect the cowl flaps system because the upper side of field coil winding 917a is connected to the 110 volt source through conductor 920, switch 921, conductor 922, bank 907b, conductor 923, switch 914, and conductors 915 and 912, assuming that the selector switch 907 is in the "cowl flaps" position.

Also should the instructor desire to simulate a break in the hydraulic line associated with the wing flaps, the switch 928 is placed in contact with the contact 928b. The relay 901 is energized through conductors 911 and 912, relay 901, conductor 1070, switch 928, conductor 929, bank 907c, conductor 923, switch 914, and conductor 915. Accordingly, the wing flaps relay 901 is energized, opening the switches 901a and 901b resulting in a breaking of the circuit of indicator 896, and so this indicator 896 indicates an assumed pressure of zero. Inasmuch as switch 928 is removed from the terminal 928a, the upper side of the wing flaps motor field coil winding 919a will be disconnected from the 110 volt source, and the student will not be able to operate the wing flaps system in any manner. Again, this simulates the case in a real aircraft where a break in the wing flaps line renders inoperative not only the normal wing flaps controls but also the hydraulic hand pump.

However, under the circumstances of a simulated break in the wing flap line, the student can still operate the landing gear and the cowl flaps. Should he desire to operate the landing gear, the selector switch 907 is placed in the "landing gear" position and in so doing the conductor 929 is disconnected from the conductor 923 by the bank 907c of switch 907, and the wing flaps relay 901 is de-energized resulting in a closing of switch 901a. Accordingly, the indicator 896 again indicates the normal pressure, and it will be appreciated that the landing gear may be operated in the normal manner. Insofar as operation of the cowl flaps is concerned, in the presence of a break in the wing flaps line, the placing of selector switch 907 in the "cowl flaps" position, also results in a de-energization of the wing flaps relay 901 because conductor 929 is disconnected from conductor 903. The connections to the cowl flaps field coil winding 917a are made as in the normal operating procedure, and the student is free to operate the cowl flaps as previously described.

Finally, should the instructor decide to simulate a break in the cowl flaps line, the switch 921 is moved into engagement with the contact 921b and the cowl flaps relay 903 is energized through the conductors 911 and 912, cowl flaps relay 903, conductor 1071, switch 921, conductor 922, bank 907b, conductor 923, switch 914 and conductors 915 and 912. The energization of the cowl flaps relay 903 results in an opening of switch 903a, and the circuit of the pressure indicator 896 is broken, resulting in an indication of zero pounds. Under these circumstances the student cannot operate the cowl flaps in any manner, as is the case of a plane in actual flight under corresponding circumstances. However, the student is free to selectively operate the wing flaps or landing gear by placing the selector switch 907 in the "wing flaps" or "landing gear" position.

It will be appreciated in view of the foregoing disclosure that this invention discloses means whereby the normal operation of the landing gear, wing flaps and cowl flaps of a real aircraft may be simulated, whereby the student may receive valuable training in the actual operation of the corresponding mechanism in a real airplane. Means are not only provided to simulate the normal operation of the landing gear, wing flaps and cowl flaps, but means are also provided whereby in the event of an assumed engine pump failure, the student may operate a simulated hydraulic hand pump in the same manner that he would do in a real plane in which the engine pump has failed, the operation of the simulated hand pump producing results corresponding to the results which would occur in a plane in actual flight in response to the operation of the hydraulic hand pump therein. Also means are provided whereby a break in the landing gear line, the wing flap line, or the cowl flap line of a real plane may be simulated, and in the event of an assumed failure in any one of the three lines, the associated system may not be operated, but the other two systems may be operated.

*Restarting engine by windmilling*

In the case of an aircraft in actual flight, if the engine fails as a result of fuel exhaustion, by switching to another tank which is supplied with gasoline, the pilot may start the engine by windmilling—that is, he does not have to go through the complete starting system because the slipstream effect on the propeller causes the engine to turn over. Also, if failure results because of a too-high cylinder head temperature, or other causes, the pilot may start the engine by windmilling. However, the pilot may start the engine by windmilling only in the event the plane is in flight, i. e., above zero altitude.

The following apparatus may be used by the student in order to "start" the "engine" of the trainer by windmilling: Referring to Fig. 13, whenever the fuel failure switch 411 and switch 541 are opened, as previously explained, or, cylinder head temperature switch 342 or instructor's failure switch 413 is opened, engine failure results because the right side of master relay 414 is disconnected from the 110 volt source. However, it will be noticed, referring to Fig. 23, that whenever the assumed altitude is above zero, and the levelling jack relay 824 is energized closing switch 824b, the starting system altitude relay 430 is energized, closing switch 428. Referring to Fig. 13 it will be seen that the left side of master relay 414 is always connected to the upper side of the 110 volt source, when the assumed altitude is above zero, through the conductors 410 and 410a, switch 428, conductor 427, switch 426 which is closed when the mixture lever is in an advanced position, and conductor 425. Accordingly, if engine failure results because of a fuel failure, a too high cylinder head temperature, or by an opening of the instructor's switch 413, the "engine" of the trainer will be automatically restarted, without going through the entire starting procedure, as soon as the student properly switches to a different fuel tank, properly corrects cylinder head temperature, or the instructor closes his failure switch 413, provided the mixture lever is sufficiently far advanced. Accordingly, the apparatus accurately simulates the restarting of an engine in flight by windmilling.

*Vertical hunting effect*

Referring again to the case of an airplane in actual flight, as is well known to those skilled in the art, a change in air speed of the plane or a change in the pitching attitude of the plane produces a hunting effect, i. e., the plane successively assumes climbing and diving attitudes of diminishing amplitude. Also, the indicated air speed successively increases and decreases according to the pitching attitude of the plane. This invention also discloses means for simulating the vertical hunting of a plane in actual flight.

Referring to Fig. 20 it will be seen that the Selsyn receiver 1020a is connected to the pitch action transmitter 584 in Fig. 2 by means of cable 1021a, and that the output shaft 1022a of this receiver has affixed thereupon the gear 1023a which drives gear 1024a affixed upon the input shaft 1025a of Selsyn transmitter designated generally 1026a, the housing of which is 1027a, this housing being suitably rotatably mounted. The transmitter 1026a is connected through the slip rings and brushes 1028a and the cable 1029a with the receiver 1030a shown in Fig. 3C. The receiver 1030a and motor unit 182 comprises a reversible followup system identical with that shown in Fig. 6A, and its detailed nature need not, therefore, be described. The output shaft of unit 182 is designated 183 and has affixed thereupon the gear 184 which drives gear 185 affixed upon the outer end of screw 186 which travels in nut 187 affixed upon the plate 99, as previously described.

Referring back to Fig. 20, gear 1036a is affixed upon the shaft 719 and drives the gear 1037a affixed upon the housing 1027a of Selsyn transmitter 1026a.

Assuming first that an increase in assumed air speed occurs, the shaft 719 is rotated and through gears 1036a and 1037a the housing 1027a of transmitter 1026a is rotated in such a direction that the units 1030a and 182 in Fig. 3C are actuated to move the plate 99 and entire valve section 65 to the front in Fig. 3. Accordingly, atmosphere will be admitted to the forward pitching bellows 18 and vacuum to the rear bellows 19, causing the nose of the trainer to rise. As the nose of the trainer rises the pitch action transmitter 584 in Fig. 2 will actuate the receiver 1020a in Fig. 20 resulting in a rotation of the input shaft 1025a of transmitter 1026a. Transmitter 1026a then tends to reverse the operation of the units 1030a and 182 in Fig. 3C, to lessen the movement of the plate 99 and section 65.

At the same time the raising of the nose of fuselage 22 will operate the pitch receiver 587 in Fig. 20 to introduce the effect of a lower assumed air speed, and the original direction of rotation of shaft 719 is reversed, also tending to reverse the initial direction of output of unit 182 in Fig. 3C.

The combined operations of Selsyn receiver 1020a and of Selsyn receiver 587 are sufficient to overcome the original rotation of shaft 719, and so the original direction of output of unit 182 is reversed, plate 99 moves to the rear of its neutral position, admitting vacuum to the front pitching bellows and atmosphere to the rear pitching bellows, causing fuselage 22 to assume a diving position.

The diving of fuselage 22 will reverse the operation of Selsyn receivers 587 and 1020a, and so the unit 182 in Fig. 3C will be again reversed, resulting in a climbing of fuselage 22.

Each successive oscillation of fuselage 22 will be of lesser magnitude because of the fact that the factor of pitch attitude introduced into Selsyn receivers 587 and 1020a overrides the effect of air speed introduced by shaft 719.

A decrease in assumed air speed similarly will cause a hunting effect through the operation of the just considered mechanism in the same manner, the only difference being that the first phase of the hunting is a nosing down of the fuselage.

Inasmuch as during the hunting process the shaft 632 is rotated first in one direction and then in the other by the operation of the pitch attitude receiver 587, it will be appreciated that the air speed indicator 716 in Fig. 8A will indicate successively increasing and decreasing assumed air speeds, finally indicating a constant air speed when the hunting stops.

*Conclusion*

In view of the above disclosure of this invention it will be appreciated that this invention discloses highly useful and novel apparatus for use in the instruction, upon the ground, of aviation pilots. It will be apparent to those skilled in the art that many parts of this invention may be used in conjunction with other types of grounded aviation trainers, and also, that many changes may be made from the disclosed nature of this invention without departing from the substance thereof, as covered by the following claims.

We claim:

1. In a grounded aviation trainer of the type comprising a fuselage tiltably mounted upon a pivot for movements relative to a non-tiltable member, the combination of holding means interconnecting said fuselage and said non-tiltable member and operative to prevent tilting of said fuselage under predetermined conditions, an air speed indicator in said fuselage simulating the air speed indicator of a real plane, an air speed system in said trainer connected to said indicator for actuating said indicator to indicate assumed air speeds, and means interconnecting said air speed system and said holding means for rendering said holding means inoperative thereby allowing a tilting of said fuselage when said indicator indicates a predetermined value.

2. In a grounded aviation trainer of the type comprising a fuselage tiltably mounted upon a pivot for movements relative to a non-tiltable member, the combination of holding means interconnecting said fuselage and said non-tiltable member and operative to prevent tilting of said fuselage under predetermined conditions, an air speed indicator in said fuselage simulating the air speed indicator of a real plane, an air speed system in said trainer connected to said indicator for actuating said indicator to indicate assumed air speeds, a second indicator in said fuselage simulating the altimeter of a real plane, an altitude system in said trainer for actuating said second indicator to indicate assumed altitudes, means interconnecting said air speed system and said holding means for initially rendering said holding means inoperative to allow a tilting of said fuselage when said first indicator first indicates a predetermined value, and means interconnecting said altitude system and said holding means for subsequently rendering said holding means operative to prevent a tilting of said fuselage when said second indicator thereafter indicates a predetermined value, regardless of the reading of said first indicator.

3. In a grounded aviation trainer of the type comprising a fuselage tiltably mounted upon a pivot for movements relative to a non-tiltable member, the combination of a plurality of extensible supporting members held by said non-tiltable member and arranged to engage the fuselage to prevent tilting thereof when extended, an indicator in said fuselage simulating the air speed indicator of a real plane, an air speed system in said trainer connected to said indicator for actuating said indicator to indicate assumed air speeds, and means interconnecting said air speed system and said extensible members for disengaging said extensible members from said fuselage when said indicator indicates a predetermined value.

4. In a grounded aviation trainer of the type comprising a fuselage tiltably mounted upon a pivot for movements relative to a non-tiltable member, the combination of a plurality of extensible supporting members held by said non-tiltable member and arranged to engage the fuselage to prevent tilting thereof when extended, an indicator in said fuselage simulating the air speed indicator of a real plane, an air speed system in said trainer connected to said indicator for actuating said indicator to indicate assumed air speeds, a second indicator in said fuselage simulating the altimeter of a real plane, an altitude system in said trainer connected to said second indicator for actuating said second indicator to indicate assumed altitudes, means interconnecting said air speed system and said extensible members for initially disengaging said extensible members from said fuselage when said first indicator first indicates a predetermined value, and means interconnecting said altitude system and said extensible members for subsequently reengaging said extensible members with said fuselage when said second indicator thereafter indicates a predetermined value, regardless of the reading of said first indicator.

5. In a grounded aviation trainer of the type comprising a fuselage tiltably mounted upon a pivot for movements relative to a non-tiltable member, the combination of tilting means operable under predetermined circumstances by a manually movable control for tilting said fuselage, holding means interconnecting said fuselage and said non-tiltable member for holding said fuselage relative to said non-tiltable member, under predetermined conditions, to prevent a tilting of said fuselage, an air speed indicator in said fuselage, an air speed system in the trainer connected to said indicator for actuating said indicator to indicate assumed air speeds, means interconnecting said air speed system and said holding means for operating said holding means to permit a tilting of said fuselage when said indicator indicates a predetermined value, and means interconnecting said air speed system and said tilting means for rendering operative said tilting means when said indicator indicates the mentioned predetermined value.

STANLEY I. HAYES.
MILTON S. WADE.

(References on following page)

REFERENCES CITED

The following references are of record in the file of this patent:

UNITED STATES PATENTS

| Number | Name | Date |
|---|---|---|
| 1,723,168 | Heuss | Aug. 6, 1929 |
| 2,099,857 | Link | Nov. 23, 1937 |
| 2,218,546 | Muller | Oct. 22, 1940 |
| 2,243,973 | Mills | June 3, 1941 |
| 2,357,304 | Balsamo | Sept. 5, 1944 |
| 2,358,018 | Lowkrantz | Sept. 12, 1944 |
| 2,360,346 | Holloman et al. | Oct. 17, 1944 |
| 2,360,882 | Marsh | Oct. 24, 1944 |
| 2,362,486 | Holbert | Nov. 14, 1944 |
| 2,366,603 | Dehmel | Jan. 2, 1945 |
| 2,417,554 | Jones | Mar. 18, 1947 |
| 2,424,312 | Haynes | July 22, 1947 |